US012795457B2

(12) United States Patent
Wei et al.

(10) Patent No.: US 12,795,457 B2
(45) Date of Patent: Nov. 10, 2026

(54) TECHNIQUES FOR INTER-USER EQUIPMENT MULTIPLEXING IN HALF-DUPLEX FREQUENCY DIVISION DUPLEX OPERATION

(71) Applicant: QUALCOMM INCORPORATED, San Diego, CA (US)

(72) Inventors: Chao Wei, Beijing (CN); Jing Lei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 522 days.

(21) Appl. No.: 18/255,281

(22) PCT Filed: Jan. 15, 2021

(86) PCT No.: PCT/CN2021/072065
§ 371 (c)(1),
(2) Date: May 31, 2023

(87) PCT Pub. No.: WO2022/151326
PCT Pub. Date: Jul. 21, 2022

(65) Prior Publication Data
US 2024/0031875 A1 Jan. 25, 2024

(51) Int. Cl.
*H04W 28/26* (2009.01)
*H04L 5/16* (2006.01)
(Continued)

(52) U.S. Cl.
CPC ............... *H04W 28/26* (2013.01); *H04L 5/16* (2013.01); *H04W 72/0446* (2013.01); *H04W 72/0453* (2013.01); *H04W 72/563* (2023.01)

(58) Field of Classification Search
CPC ............. H04W 28/26; H04W 72/0446; H04W 72/0453; H04W 72/563; H04W 72/23;
(Continued)

(56) References Cited

U.S. PATENT DOCUMENTS 11,026,225 B2 * 6/2021 Li ......................... H04L 5/0064
11,076,418 B2 * 7/2021 Li ......................... H04L 1/1854
(Continued)

FOREIGN PATENT DOCUMENTS

CN 110999487 A 4/2020
CN 111954308 A * 11/2020 ............ H04W 72/21
(Continued)

OTHER PUBLICATIONS

Supplementary Partial European Search Report—EP21918534—Search Authority—The Hague—Sep. 5, 2024 (2102046EP).
(Continued)

*Primary Examiner* — Jay P Patel
(74) *Attorney, Agent, or Firm* — Holland & Hart LLP / Qualcomm

(57) ABSTRACT

Methods, systems, and devices for wireless communications are described. In some systems, a base station may transmit a downlink pre-emption indication (DLPI) or an uplink cancellation indication (ULCI) to a user equipment (UE) to indicate that a subset of resources of a scheduled downlink or uplink data transmission have been pre-empted or canceled. As such, the UE may either empty a buffer at the UE associated with the subset of resources or refrain from transmitting over the subset of resources based on receiving the DLPI or the ULCI, respectively. In some aspects of the present disclosure, the UE and the base station may support one or more inter-UE multiplexing schemes to increase a likelihood for the UE to receive the DLPI or the ULCI or to otherwise avoid collisions with communications between the base station and one or more other UEs.

22 Claims, 24 Drawing Sheets

600

(51) Int. Cl.
*H04W 72/0446* (2023.01)
*H04W 72/0453* (2023.01)
*H04W 72/563* (2023.01)

(58) Field of Classification Search
CPC ...... H04W 72/569; H04L 5/16; H04L 5/0048; H04L 5/0053; H04L 5/0064; H04L 5/0094
See application file for complete search history.

(56) References Cited

U.S. PATENT DOCUMENTS

| | | | | |
|---|---|---|---|---|
| 11,317,411 | B2 * | 4/2022 | Bagheri | H04L 5/0053 |
| 11,419,123 | B2 * | 8/2022 | Fakoorian | H04W 72/0453 |
| 11,452,167 | B2 * | 9/2022 | Yang | H04W 72/0446 |
| 11,576,228 | B2 * | 2/2023 | Yang | H04L 1/1614 |
| 11,805,528 | B2 * | 10/2023 | Hosseini | H04W 72/23 |
| 11,825,468 | B2 * | 11/2023 | Hosseini | H04L 5/0053 |
| 11,849,448 | B2 * | 12/2023 | Li | H04W 72/23 |
| 12,004,182 | B2 * | 6/2024 | Oteri | H04L 1/0026 |
| 12,426,073 | B2 * | 9/2025 | Yang | H04L 5/0053 |
| 12,532,327 | B2 * | 1/2026 | Khoshnevisan | H04W 72/23 |
| 2018/0083758 | A1 * | 3/2018 | Islam | H04L 27/2602 |
| 2018/0191470 | A1 | 7/2018 | Manolakos et al. | |
| 2018/0367263 | A1 | 12/2018 | Ying et al. | |
| 2019/0200374 | A1 | 6/2019 | Li et al. | |
| 2019/0349998 | A1 | 11/2019 | Bhattad et al. | |
| 2020/0077470 | A1 * | 3/2020 | Xiong | H04L 1/1845 |
| 2020/0267713 | A1 * | 8/2020 | Bagheri | H04L 5/0044 |
| 2020/0304249 | A1 | 9/2020 | Olivella et al. | |
| 2020/0351897 | A1 * | 11/2020 | Fakoorian | H04L 5/0096 |
| 2020/0359447 | A1 | 11/2020 | Yang et al. | |
| 2021/0352695 | A1 * | 11/2021 | Li | H04W 72/1273 |
| 2022/0078823 | A1 * | 3/2022 | Li | H04W 72/1268 |
| 2022/0361217 | A1 * | 11/2022 | Oteri | H04W 72/21 |
| 2023/0217459 | A1 * | 7/2023 | Khoshnevisan | H04W 72/23 370/329 |

FOREIGN PATENT DOCUMENTS

| | | | | | |
|---|---|---|---|---|---|
| CN | 113748740 | A | * | 12/2021 | H04W 72/543 |
| CN | 114175825 | B | * | 2/2025 | H04W 28/26 |
| EP | 3694280 | B1 | * | 6/2026 | |
| WO | WO-2019103797 | A1 | | 5/2019 | |
| WO | WO-2020112737 | | | 6/2020 | |
| WO | WO-2020194258 | A1 | | 10/2020 | |

OTHER PUBLICATIONS

International Search Report and Written Opinion—PCT/CN2021/072065—ISA/EPO—Oct. 22, 2021 (2102046WO1).

Supplementary European Search Report—EP21918534—Search Authority—The Hague—Jan. 29, 2025 (2102046EP).

VIVO: "Multiplexing Data with Different Transmission Durations", 3GPP TSG RAN WG1 Meeting 90bis, R1-1717502, Oct. 13, 2017, 10 Pages, XP093161094, Prague, CZ, chapters 2.1 on p. 3, 2.3 on p. 5, figure 1.

* cited by examiner

TECHNIQUES FOR INTER-USER EQUIPMENT MULTIPLEXING IN HALF-DUPLEX FREQUENCY DIVISION DUPLEX OPERATION

CROSS REFERENCE

The present application is a 371 national stage filing of International PCT Application No. PCT/CN2021/072065 by WEI et al. entitled "TECHNIQUES FOR INTER-USER EQUIPMENT MULTIPLEXING IN HALF-DUPLEX FREQUENCY DIVISION DUPLEX OPERATION," filed Jan. 15, 2021, which is assigned to the assignee hereof, and which is expressly incorporated by reference in its entirety herein.

TECHNICAL FIELD

The following relates to wireless communications, including techniques for inter-user equipment (UE) multiplexing in half-duplex frequency division duplex (FDD) operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may pre-empt resources from a downlink transmission to a UE or cancel resources from an uplink transmission from the UE. In some cases, however, the UE may fail to receive signaling indicating such a pre-emption or cancellation of resources, which may result in lower decoding probability and lower system performance.

SUMMARY

The described techniques relate to improved methods, systems, devices, and apparatuses that support techniques for inter-user equipment (UE) multiplexing in half-duplex frequency division duplex (FDD) operation. Generally, the described techniques support efficient multiplexing of resources usable for different types of communication. For example, the present disclosure provides various techniques for avoiding a collision between two different types of communication, such as enhanced mobile broadband (eMBB) and ultra-reliable low-latency communication (URLLC), involving a half-duplex FDD UE.

A method for wireless communication at a first UE is described. The method may include receiving, from a base station, a resource reservation indicating a set of reserved resources that are reserved for communications between the base station and one or more other UEs, the first UE operating in a half-duplex FDD mode, receiving, from the base station, downlink control information (DCI) scheduling a data transmission with the base station over a set of resources that at least partially overlaps in time with the set of reserved resources, identifying that a priority level of the data transmission is less than a threshold priority level, and communicating with the base station via the data transmission over a subset of resources of the set of resources based on the resource reservation and identifying that the priority level of the data transmission is less than the threshold priority level, the subset of resources being resources that are rate-matched around the set of reserved resources.

An apparatus for wireless communication at a first UE is described. The apparatus may include at least one processor, memory coupled with the at least one processor, and instructions stored in the memory. The instructions may be executable by the at least one processor to cause the apparatus to receive, from a base station, a resource reservation indicating a set of reserved resources that are reserved for communications between the base station and one or more other UEs, the first UE operating in a half-duplex FDD mode, receive, from the base station, DCI scheduling a data transmission with the base station over a set of resources that at least partially overlaps in time with the set of reserved resources, identify that a priority level of the data transmission is less than a threshold priority level, and communicate with the base station via the data transmission over a subset of resources of the set of resources based on the resource reservation and identifying that the priority level of the data transmission is less than the threshold priority level, the subset of resources being resources that are rate-matched around the set of reserved resources.

Another apparatus for wireless communication at a first UE is described. The apparatus may include means for receiving, from a base station, a resource reservation indicating a set of reserved resources that are reserved for communications between the base station and one or more other UEs, the first UE operating in a half-duplex FDD mode, means for receiving, from the base station, DCI scheduling a data transmission with the base station over a set of resources that at least partially overlaps in time with the set of reserved resources, means for identifying that a priority level of the data transmission is less than a threshold priority level, and means for communicating with the base station via the data transmission over a subset of resources of the set of resources based on the resource reservation and identifying that the priority level of the data transmission is less than the threshold priority level, the subset of resources being resources that are rate-matched around the set of reserved resources.

A non-transitory computer-readable medium storing code for wireless communication at a first UE is described. The code may include instructions executable by at least one processor to receive, from a base station, a resource reservation indicating a set of reserved resources that are reserved for communications between the base station and one or more other UEs, the first UE operating in a half-duplex FDD mode, receive, from the base station, DCI scheduling a data transmission with the base station over a set of resources that at least partially overlaps in time with the set of reserved resources, identify that a priority level of the data transmission is less than a threshold priority level, and communicate with the base station via the data transmission over a subset of resources of the set of resources based on the resource reservation and identifying that the priority level of the data transmission is less than the threshold priority level, the subset of resources being resources that are rate-matched around the set of reserved resources.

In some examples of the method, apparatuses, and non-transitory computer-readable medium described herein, receiving the resource reservation indicating the set of reserved resources may include operations, features, means, or instructions for receiving an indication of the set of reserved resources via radio resource control (RRC) signaling.

In some examples of the method, apparatuses, and non-transitory computer-readable medium described herein, receiving the DCI scheduling the data transmission may include operations, features, means, or instructions for receiving an indication that enables the set of reserved resources for the data transmission, where communicating with the base station via the data transmission over the subset of resources may be based on receiving the indication that enables the set of reserved resources for the data transmission.

In some examples of the method, apparatuses, and non-transitory computer-readable medium described herein, the set of reserved resources may be periodically configured.

In some examples of the method, apparatuses, and non-transitory computer-readable medium described herein, receiving the resource reservation indicating the set of reserved resources may include operations, features, means, or instructions for receiving a bitmap including a quantity of bits equal to a product of a first quantity of units in a time domain and a second quantity of units in a frequency domain, the bitmap indicating a time and frequency resource allocation of the set of reserved resources.

Some examples of the method, apparatuses, and non-transitory computer-readable medium described herein may further include operations, features, means, or instructions for receiving, from the base station, control signaling scheduling a transmission of a sounding reference signal (SRS) over a second set of resources that at least partially overlaps in time with the set of reserved resources and dropping the transmission of the SRS based on the second set of resources at least partially overlapping in time with the set of reserved resources.

In some examples of the method, apparatuses, and non-transitory computer-readable medium described herein, the data transmission includes an uplink data transmission or a downlink data transmission.

A method for wireless communication at a UE is described. The method may include receiving, from a base station, control signaling indicating a set of reserved resources that are reserved for communication, by the base station, of a downlink control transmission that includes either a downlink pre-emption indication (DLPI) or an uplink cancellation indication (ULCI), the UE operating in a half-duplex FDD mode, receiving, from the base station, DCI scheduling an uplink data transmission over a set of resources that at least partially overlaps in time with the set of reserved resources, transmitting at least a portion of the uplink data transmission over the set of resources, and switching from transmission of at least the portion of the uplink data transmission to monitoring for the downlink control transmission over the set of reserved resources based on receiving the control signaling indicating the set of reserved resources.

An apparatus for wireless communication at a UE is described. The apparatus may include at least one processor, memory coupled with the at least one processor, and instructions stored in the memory. The instructions may be executable by the at least one processor to cause the apparatus to receive, from a base station, control signaling indicating a set of reserved resources that are reserved for communication, by the base station, of a downlink control transmission that includes either a DLPI or an ULCI, the UE operating in a half-duplex FDD mode, receive, from the base station, DCI scheduling an uplink data transmission over a set of resources that at least partially overlaps in time with the set of reserved resources, transmit at least a portion of the uplink data transmission over the set of resources, and switch from transmission of at least the portion of the uplink data transmission to monitoring for the downlink control transmission over the set of reserved resources based on receiving the control signaling indicating the set of reserved resources.

Another apparatus for wireless communication at a UE is described. The apparatus may include means for receiving, from a base station, control signaling indicating a set of reserved resources that are reserved for communication, by the base station, of a downlink control transmission that includes either a DLPI or an ULCI, the UE operating in a half-duplex FDD mode, means for receiving, from the base station, DCI scheduling an uplink data transmission over a set of resources that at least partially overlaps in time with the set of reserved resources, means for transmitting at least a portion of the uplink data transmission over the set of resources, and means for switching from transmission of at least the portion of the uplink data transmission to monitoring for the downlink control transmission over the set of reserved resources based on receiving the control signaling indicating the set of reserved resources.

A non-transitory computer-readable medium storing code for wireless communication at a UE is described. The code may include instructions executable by at least one processor to receive, from a base station, control signaling indicating a set of reserved resources that are reserved for communication, by the base station, of a downlink control transmission that includes either a DLPI or an ULCI, the UE operating in a half-duplex FDD mode, receive, from the base station, DCI scheduling an uplink data transmission over a set of resources that at least partially overlaps in time with the set of reserved resources, transmit at least a portion of the uplink data transmission over the set of resources, and switch from transmission of at least the portion of the uplink data transmission to monitoring for the downlink control transmission over the set of reserved resources based on receiving the control signaling indicating the set of reserved resources.

In some examples of the method, apparatuses, and non-transitory computer-readable medium described herein, receiving the control signaling indicating the set of reserved resources may include operations, features, means, or instructions for receiving an indication of the set of reserved resources via RRC signaling, where the set of reserved resources may be semi-persistently configured.

Some examples of the method, apparatuses, and non-transitory computer-readable medium described herein may further include operations, features, means, or instructions for receiving, from the base station, second control signaling scheduling an SRS over a second set of resources that at least partially overlaps in time with the set of reserved resources and refraining from transmitting the SRS in a time domain overlap between the second set of resources and the set of reserved resources.

Some examples of the method, apparatuses, and non-transitory computer-readable medium described herein may further include operations, features, means, or instructions for identifying that a priority level of the uplink data transmission may be less than a threshold priority level, where switching from the transmission of at least the portion of the uplink data transmission to the monitoring for the downlink control transmission over the set of reserved resources may be based on identifying that the priority level of the uplink data transmission may be less than the threshold priority level.

Some examples of the method, apparatuses, and non-transitory computer-readable medium described herein may further include operations, features, means, or instructions for receiving the downlink control transmission that includes either the DLPI or the ULCI based on switching from the transmission of at least the portion of the uplink data transmission to the monitoring for the downlink control transmission over the set of reserved resources and switching from the monitoring for the downlink control transmission over the set of reserved resources to transmitting at least a second portion of the uplink data transmission based on receiving the downlink control transmission.

A method for wireless communication at a UE is described. The method may include receiving, from a base station, a first downlink data transmission over a set of resources in a first time period, the UE operating in a half-duplex FDD mode, receiving, from the base station, a second downlink data transmission in a second time period that is after the first time period, the second downlink data transmission including a DLPI referring to a subset of resources of the set of resources, and emptying a hybrid automatic repeat request (HARQ) buffer associated with the subset of resources based on the DLPI.

An apparatus for wireless communication at a UE is described. The apparatus may include at least one processor, memory coupled with the at least one processor, and instructions stored in the memory. The instructions may be executable by the at least one processor to cause the apparatus to receive, from a base station, a first downlink data transmission over a set of resources in a first time period, the UE operating in a half-duplex FDD mode, receive, from the base station, a second downlink data transmission in a second time period that is after the first time period, the second downlink data transmission including a DLPI referring to a subset of resources of the set of resources, and empty a HARQ buffer associated with the subset of resources based on the DLPI.

Another apparatus for wireless communication at a UE is described. The apparatus may include means for receiving, from a base station, a first downlink data transmission over a set of resources in a first time period, the UE operating in a half-duplex FDD mode, means for receiving, from the base station, a second downlink data transmission in a second time period that is after the first time period, the second downlink data transmission including a DLPI referring to a subset of resources of the set of resources, and means for emptying a HARQ buffer associated with the subset of resources based on the DLPI.

A non-transitory computer-readable medium storing code for wireless communication at a UE is described. The code may include instructions executable by at least one processor to receive, from a base station, a first downlink data transmission over a set of resources in a first time period, the UE operating in a half-duplex FDD mode, receive, from the base station, a second downlink data transmission in a second time period that is after the first time period, the second downlink data transmission including a DLPI referring to a subset of resources of the set of resources, and empty a HARQ buffer associated with the subset of resources based on the DLPI.

In some examples of the method, apparatuses, and non-transitory computer-readable medium described herein, the DLPI may be multiplexed with data of the second downlink data transmission and the method, apparatuses, and non-transitory computer-readable medium may include further operations, features, means, or instructions for decoding the DLPI separately from the data of the second downlink data transmission.

In some examples of the method, apparatuses, and non-transitory computer-readable medium described herein, the DLPI includes quadrature phase shift keying (QPSK).

Some examples of the method, apparatuses, and non-transitory computer-readable medium described herein may further include operations, features, means, or instructions for transmitting, to the base station, an uplink transmission in a third time period that at least partially overlaps in time with a monitoring occasion for DCI including an instance of the DLPI, where receiving the second downlink data transmission including the DLPI may be based on transmitting the uplink transmission in the third time period that at least partially overlaps in time with the monitoring occasion for the DCI including the instance of the DLPI.

Some examples of the method, apparatuses, and non-transitory computer-readable medium described herein may further include operations, features, means, or instructions for receiving, from the base station, DCI scheduling the second downlink data transmission, where the DCI includes an indication of a presence of the DLPI in the second downlink data transmission, where receiving the second downlink data transmission including the DLPI may be based on receiving the indication of the presence of the DLPI in the second downlink data transmission.

A method for wireless communication at a base station is described. The method may include transmitting, to a first UE, a resource reservation indicating a set of reserved resources that are reserved for communications between the base station and one or more other UEs, transmitting, to the first UE, DCI scheduling a data transmission with the base station over a set of resources that at least partially overlaps in time with the set of reserved resources, identifying that a priority level of the data transmission is less than a threshold priority level, and communicating with the first UE via the data transmission over a subset of resources of the set of resources based on the resource reservation and identifying that the priority level of the data transmission is less than the threshold priority level, the subset of resources being resources that are rate-matched around the set of reserved resources.

An apparatus for wireless communication at a base station is described. The apparatus may include at least one processor, memory coupled with the at least one processor, and instructions stored in the memory. The instructions may be executable by the at least one processor to cause the apparatus to transmit, to a first UE, a resource reservation indicating a set of reserved resources that are reserved for communications between the base station and one or more other UEs, transmit, to the first UE, DCI scheduling a data transmission with the base station over a set of resources that at least partially overlaps in time with the set of reserved resources, identify that a priority level of the data transmission is less than a threshold priority level, and communicate with the first UE via the data transmission over a subset of resources of the set of resources based on the resource reservation and identifying that the priority level of the data transmission is less than the threshold priority level, the subset of resources being resources that are rate-matched around the set of reserved resources.

Another apparatus for wireless communication at a base station is described. The apparatus may include means for transmitting, to a first UE, a resource reservation indicating a set of reserved resources that are reserved for communications between the base station and one or more other UEs, means for transmitting, to the first UE, DCI scheduling a data transmission with the base station over a set of resources that at least partially overlaps in time with the set of reserved resources, means for identifying that a priority level of the data transmission is less than a threshold priority level, and means for communicating with the first UE via the data transmission over a subset of resources of the set of resources based on the resource reservation and identifying that the priority level of the data transmission is less than the threshold priority level, the subset of resources being resources that are rate-matched around the set of reserved resources.

A non-transitory computer-readable medium storing code for wireless communication at a base station is described. The code may include instructions executable by at least one processor to transmit, to a first UE, a resource reservation indicating a set of reserved resources that are reserved for communications between the base station and one or more other UEs, transmit, to the first UE, DCI scheduling a data transmission with the base station over a set of resources that at least partially overlaps in time with the set of reserved resources, identify that a priority level of the data transmission is less than a threshold priority level, and communicate with the first UE via the data transmission over a subset of resources of the set of resources based on the resource reservation and identifying that the priority level of the data transmission is less than the threshold priority level, the subset of resources being resources that are rate-matched around the set of reserved resources.

In some examples of the method, apparatuses, and non-transitory computer-readable medium described herein, transmitting the resource reservation indicating the set of reserved resources may include operations, features, means, or instructions for transmitting an indication of the set of reserved resources via RRC signaling.

In some examples of the method, apparatuses, and non-transitory computer-readable medium described herein, transmitting the DCI scheduling the data transmission may include operations, features, means, or instructions for transmitting an indication that enables the set of reserved resources for the data transmission, where communicating with the first UE via the data transmission over the subset of resources may be based on transmitting the indication that enables the set of reserved resources for the data transmission.

In some examples of the method, apparatuses, and non-transitory computer-readable medium described herein, the set of reserved resources may be periodically configured.

In some examples of the method, apparatuses, and non-transitory computer-readable medium described herein, transmitting the resource reservation indicating the set of reserved resources may include operations, features, means, or instructions for transmitting a bitmap including a quantity of bits equal to a product of a first quantity of units in a time domain and a second quantity of units in a frequency domain, the bitmap indicating a time and frequency resource allocation of the set of reserved resources.

Some examples of the method, apparatuses, and non-transitory computer-readable medium described herein may further include operations, features, means, or instructions for transmitting, to a second UE of the one or more other UEs, second DCI scheduling an uplink data transmission with the second UE over the set of reserved resources and receiving, from the second UE, the uplink data transmission over the set of reserved resources based on transmitting the second DCI scheduling the uplink data transmission and the resource reservation.

In some examples of the method, apparatuses, and non-transitory computer-readable medium described herein, the data transmission includes an uplink data transmission or a downlink transmission.

A method for wireless communication at a base station is described. The method may include transmitting, to a UE, control signaling indicating a set of reserved resources that are reserved for communication, by the base station, of a downlink control transmission that includes either a DLPI or an ULCI, transmitting, to the UE, DCI scheduling an uplink data transmission over a set of resources that at least partially overlaps in time with the set of reserved resources, receiving, from the UE, at least a portion of the uplink data transmission over the set of resources, and switching from reception of at least the portion of the uplink data transmission to transmitting the downlink control transmission over the set of reserved resources based on transmitting the control signaling indicating the set of reserved resources.

An apparatus for wireless communication at a base station is described. The apparatus may include at least one processor, memory coupled with the at least one processor, and instructions stored in the memory. The instructions may be executable by the at least one processor to cause the apparatus to transmit, to a UE, control signaling indicating a set of reserved resources that are reserved for communication, by the base station, of a downlink control transmission that includes either a DLPI or an ULCI, transmit, to the UE, DCI scheduling an uplink data transmission over a set of resources that at least partially overlaps in time with the set of reserved resources, receive, from the UE, at least a portion of the uplink data transmission over the set of resources, and switch from reception of at least the portion of the uplink data transmission to transmitting the downlink control transmission over the set of reserved resources based on transmitting the control signaling indicating the set of reserved resources.

Another apparatus for wireless communication at a base station is described. The apparatus may include means for transmitting, to a UE, control signaling indicating a set of reserved resources that are reserved for communication, by the base station, of a downlink control transmission that includes either a DLPI or an ULCI, means for transmitting, to the UE, DCI scheduling an uplink data transmission over a set of resources that at least partially overlaps in time with the set of reserved resources, means for receiving, from the UE, at least a portion of the uplink data transmission over the set of resources, and means for switching from reception of at least the portion of the uplink data transmission to transmitting the downlink control transmission over the set of reserved resources based on transmitting the control signaling indicating the set of reserved resources.

A non-transitory computer-readable medium storing code for wireless communication at a base station is described. The code may include instructions executable by at least one processor to transmit, to a UE, control signaling indicating a set of reserved resources that are reserved for communication, by the base station, of a downlink control transmission that includes either a DLPI or an ULCI, transmit, to the UE, DCI scheduling an uplink data transmission over a set of resources that at least partially overlaps in time with the set of reserved resources, receive, from the UE, at least a portion of the uplink data transmission over the set of resources, and switch from reception of at least the portion of the uplink data transmission to transmitting the downlink control transmission over the set of reserved resources based on transmitting the control signaling indicating the set of reserved resources.

In some examples of the method, apparatuses, and non-transitory computer-readable medium described herein, transmitting the control signaling indicating the set of reserved resources may include operations, features, means, or instructions for transmitting an indication of the set of reserved resources via RRC signaling, where the set of reserved resources may be semi-persistently configured.

Some examples of the method, apparatuses, and non-transitory computer-readable medium described herein may further include operations, features, means, or instructions for identifying that a priority level of the uplink data transmission may be less than a threshold priority level, where switching from the from the reception of the uplink data transmission to the transmitting of the downlink control transmission over the set of reserved resources may be based on identifying that the priority level of the uplink data transmission may be less than the threshold priority level.

Some examples of the method, apparatuses, and non-transitory computer-readable medium described herein may further include operations, features, means, or instructions for transmitting the downlink control transmission that includes either the DLPI or the ULCI based on switching from the reception of the uplink data transmission to the transmitting of the downlink control transmission over the set of reserved resources and switching from the transmitting of the downlink control transmission over the set of reserved resources to receiving, from the UE, at least a second portion of the uplink data transmission based on transmitting the downlink control transmission.

A method for wireless communication at a base station is described. The method may include transmitting, to a UE, a first downlink data transmission over a set of resources in a first time period and transmitting, to the UE, a second downlink data transmission in a second time period that is after the first time period, the second downlink data transmission including a DLPI referring to a subset of resources of the set of resources.

An apparatus for wireless communication at a base station is described. The apparatus may include at least one processor, memory coupled with the at least one processor, and instructions stored in the memory. The instructions may be executable by the at least one processor to cause the apparatus to transmit, to a UE, a first downlink data transmission over a set of resources in a first time period and transmit, to the UE, a second downlink data transmission in a second time period that is after the first time period, the second downlink data transmission including a DLPI referring to a subset of resources of the set of resources.

Another apparatus for wireless communication at a base station is described. The apparatus may include means for transmitting, to a UE, a first downlink data transmission over a set of resources in a first time period and means for transmitting, to the UE, a second downlink data transmission in a second time period that is after the first time period, the second downlink data transmission including a DLPI referring to a subset of resources of the set of resources.

A non-transitory computer-readable medium storing code for wireless communication at a base station is described. The code may include instructions executable by at least one processor to transmit, to a UE, a first downlink data transmission over a set of resources in a first time period and transmit, to the UE, a second downlink data transmission in a second time period that is after the first time period, the second downlink data transmission including a DLPI referring to a subset of resources of the set of resources.

Some examples of the method, apparatuses, and non-transitory computer-readable medium described herein may further include operations, features, means, or instructions for multiplexing the DLPI with data of the second downlink data transmission and encoding the DLPI separately from the data of the second downlink data transmission.

In some examples of the method, apparatuses, and non-transitory computer-readable medium described herein, multiplexing the DLPI may include operations, features, means, or instructions for multiplexing the DLPI based on QPSK.

Some examples of the method, apparatuses, and non-transitory computer-readable medium described herein may further include operations, features, means, or instructions for receiving, from the UE, an uplink data transmission over a second set of resources in a third time period that at least partially overlaps in time with a monitoring occasion for DCI including an instance of the DLPI, where transmitting the second downlink data transmission including the DLPI may be based on receiving the uplink data transmission in the third time period that at least partially overlaps in time with the monitoring occasion for the DCI including the instance of the DLPI.

Some examples of the method, apparatuses, and non-transitory computer-readable medium described herein may further include operations, features, means, or instructions for transmitting, to the UE, the DCI including the instance of the DLPI over a third set of resources that at least partially overlaps with the second set of resources in the third time period, where the DLPI in the second downlink data transmission includes a retransmission of the DLPI.

Some examples of the method, apparatuses, and non-transitory computer-readable medium described herein may further include operations, features, means, or instructions for transmitting, to the UE, DCI scheduling the second downlink data transmission, where the DCI includes an indication of a presence of the DLPI in the second downlink data transmission, where transmitting the second downlink data transmission including the DLPI may be based on transmitting the indication of the presence of the DLPI in the second downlink data transmission.

DETAILED DESCRIPTION

Figure 1:
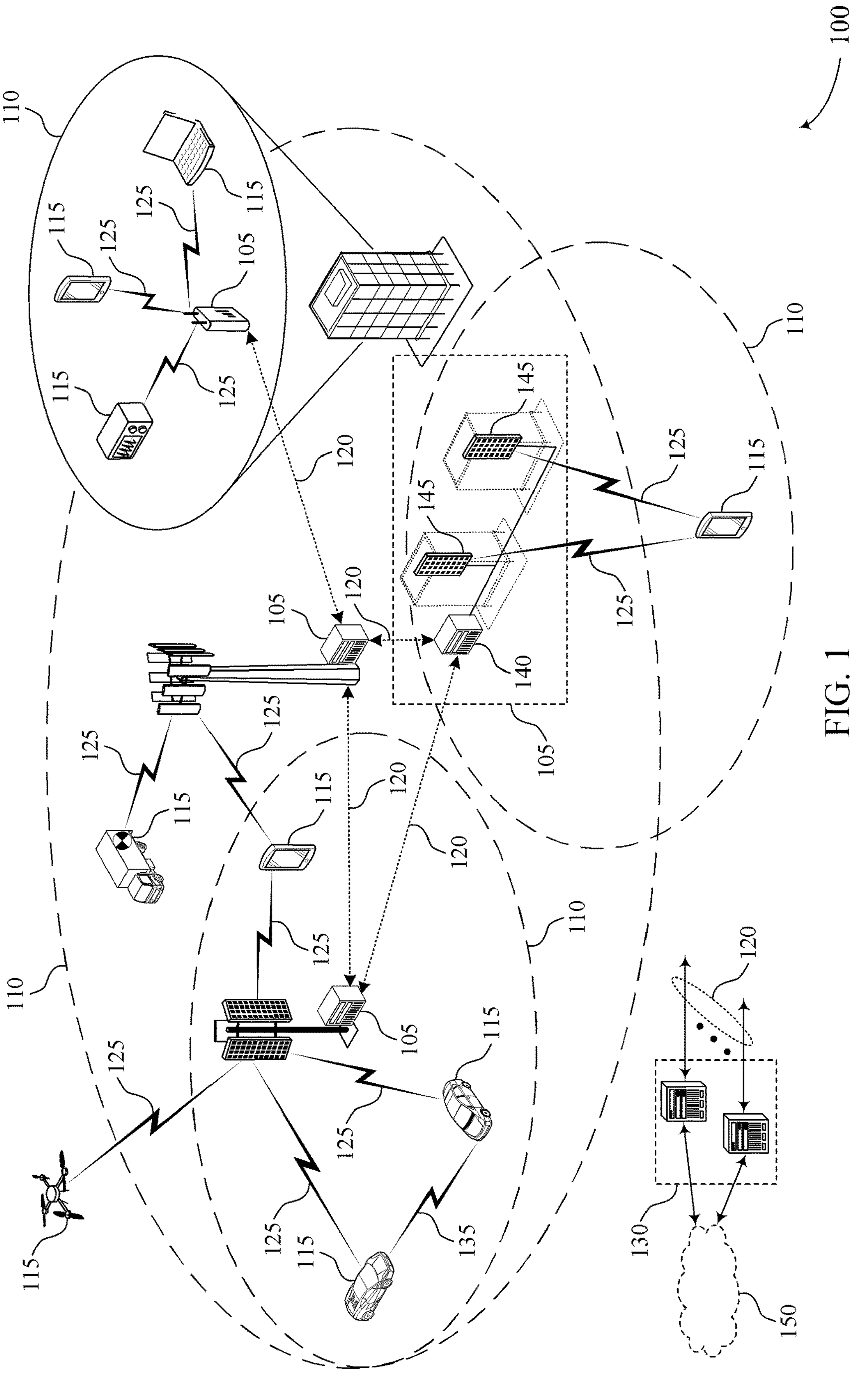
FIGS. 1 and 2 illustrate examples of wireless communications systems that support techniques for inter-user equipment (UE) multiplexing in half-duplex frequency division duplex (FDD) operation in accordance with aspects of the present disclosure.

In some wireless communications systems, a user equipment (UE) may communicate with a base station in a half-duplex frequency division duplex (FDD) communication mode. As such, the UE may transmit or receive signaling to or from the base station such that uplink and downlink communication avoid overlapping in time. For example, if the UE is transmitting to the base station via the uplink, the UE may be unable to simultaneously receive from the base station via the downlink. The base station may schedule communications between the UE and the base station in accordance with the half-duplex FDD operation of the UE, but, in some cases, may be unable to tailor uplink transmissions from the UE to avoid overlapping in time with group-common downlink control information (DCI) without degrading the uplink performance and throughput of the UE. For example, UEs may monitor for group-common DCI over monitoring occasions that are slot based or mini-slot based, which may result in severe uplink scheduling restrictions at the UE if the UE is restricted from transmitting over such monitoring occasions. As such, in some cases, the UE may be unable to receive a downlink pre-emption indication (DLPI) or an uplink cancellation indication (ULCI) from the base station (which may be included in group-common DCI), which may result in an increase in the likelihood for decoding errors or collisions and, in turn, lower decoding probabilities and lower system performance.

In some implementations of the present disclosure, the UE and the base station may support one or more inter-UE multiplexing schemes to increase the likelihood of the UE to successfully receive group-common DCI including a DLPI or a ULCI or to otherwise avoid collisions between communications between the base station and the UE and communications between the base station and one or more other UEs. In some aspects, for example, the base station may transmit a resource reservation to the UE indicating a set of reserved resources over which the UE may refrain from transmitting or receiving a data transmission to or from the base station depending on a priority level of the data transmission. For example, if the UE is scheduled to transmit or receive a relatively lower priority data transmission (such as an enhanced mobile broadband (eMBB) data transmission) over a set of resources that at least partially overlaps in time with the reserved resources, the UE may transmit or receive the data transmission over a subset of the set of resources that are rate-matched around the reserved resources. As such, the base station may schedule relatively higher priority transmissions (such as ultra-reliable low-latency communication (URLLC) data transmissions) between the base station and one or more other UEs over the reserved resources without experiencing a collision with the relatively lower priority level data transmission.

In some other aspects, the base station may transmit control signaling indicating a set of reserved resources that are reserved for transmission, from the base station, of DCI that includes either a DLPI or a ULCI. In such aspects, if an uplink data transmission is scheduled from the UE over resources that at least partially overlap in time with the set of reserved resources, the UE may switch from the uplink data transmission to monitoring for the DCI including the DLPI or the ULCI over the set of reserved resources. As such, the UE may experience a greater likelihood of receiving the DLPI or the ULCI.

In some other aspects, the base station may support a retransmission of a DLPI in a downlink data transmission to increase the likelihood that the UE successfully receives the DLPI. For example, the base station may transmit a first instance of the DLPI in DCI using a group-common physical downlink control channel (PDCCH) during a first time period, but the UE may be scheduled for an uplink data transmission during the first time period such that the UE may be unable to receive the DCI including the first instance of the DLPI. In such aspects, the base station may include, in a scheduling DCI, an indication that a second instance (or a retransmission) of the DLPI may be carried by a downlink data transmission in a second time period. As such, the base station may transmit the downlink data transmission including the second instance of the DLPI to the UE during the second time period, increasing the likelihood that the UE is able to successfully receive the second instance of the DLPI.

Particular aspects of the subject matter described in this disclosure can be implemented to realize one or more of the following potential advantages. For example, the described techniques may be implemented to reduce the likelihood of a collision between various transmissions or may increase the likelihood that the UE, operating in a half-duplex FDD mode, is able to successfully receive a DLPI or a ULCI. In examples in which the UE experiences an increase in the likelihood that the UE is able to successfully receive a DLPI or a ULCI, the UE may likewise have a greater likelihood for identifying which resources are pre-empted or canceled. As such, the UE may experience improved decoding probability (if a DLPI is received) or support improved system performance as a result of greater coordination between devices and prioritizing lower-latency communication types (if a ULCI is received prioritizing URLLC). Further, in examples in which the described techniques are implemented to reduce the likelihood of collisions between various transmissions, communications between the UE and the base station may experience less interference. As such, the UE and the base station may experience increased throughput and capacity and higher reliability, as well as improved overall system performance and coordination.

Aspects of the disclosure are initially described in the context of wireless communications systems. Additionally, aspects of the disclosure are illustrated by and described with reference to a communication timeline, multiplexing schemes, and process flows. Aspects of the disclosure are further illustrated by and described with reference to apparatus diagrams, system diagrams, and flowcharts that relate to techniques for inter-UE multiplexing in half-duplex FDD operation.

FIG. 1 illustrates an example of a wireless communications system 100 that supports techniques for inter-UE multiplexing in half-duplex FDD operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. Components within a wireless communication system may be coupled (for example, operatively, communicatively, functionally, electronically, or electrically) to each other.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs

115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may communicate with a base station 105 in a half-duplex FDD communication mode. As such, the UE 115 may transmit or receive signaling to or from the base station 105 such that uplink and downlink communication avoid overlapping in time. For example, if the UE 115 is transmitting to the base station 105 via the uplink, the UE 115 may be unable to simultaneously receive from the base station 105 via the downlink. The base station 105 may schedule communications between the UE 115 and the base station 105 in accordance with the half-duplex FDD operation of the UE 115, but may be unable to tailor uplink transmissions from the UE 115 to avoid overlapping in time with group-common DCI without degrading the uplink performance and throughput of the UE 115. For example, UEs 115 may monitor for group-common DCI over monitoring occasions that are slot based or mini-slot based, which may result in severe uplink scheduling restrictions at the UE 115 if the UE 115 is restricted from uplink transmissions for an entire duration of such monitoring occasions. As such, in some cases, the UE 115 may be unable to efficiently receive a DLPI or a ULCI from the base station 105 (which may be included in group-common DCI), which may result in lower decoding probabilities and lower system performance based on an increase in the likelihood for decoding errors or collisions.

In some implementations of the present disclosure, the UE 115, which may function as or be an example of an eMBB UE 115, and the base station 105 may support one or more inter-UE multiplexing schemes to increase the likelihood of the UE 115 to successfully receive group-common DCI including a DLPI or a ULCI or to otherwise avoid collisions between communications within the wireless communications system 100. The present disclosure provides various inter-UE multiplexing schemes, as illustrated by and described with reference to FIGS. 4 through 6, that may be implemented by the UE 115 and the base station 105 to increase decoding probabilities of eMBB communication or increase URLLC performance while also maintaining uplink throughput from the UE 115 to the base station 105.

Figure 2:
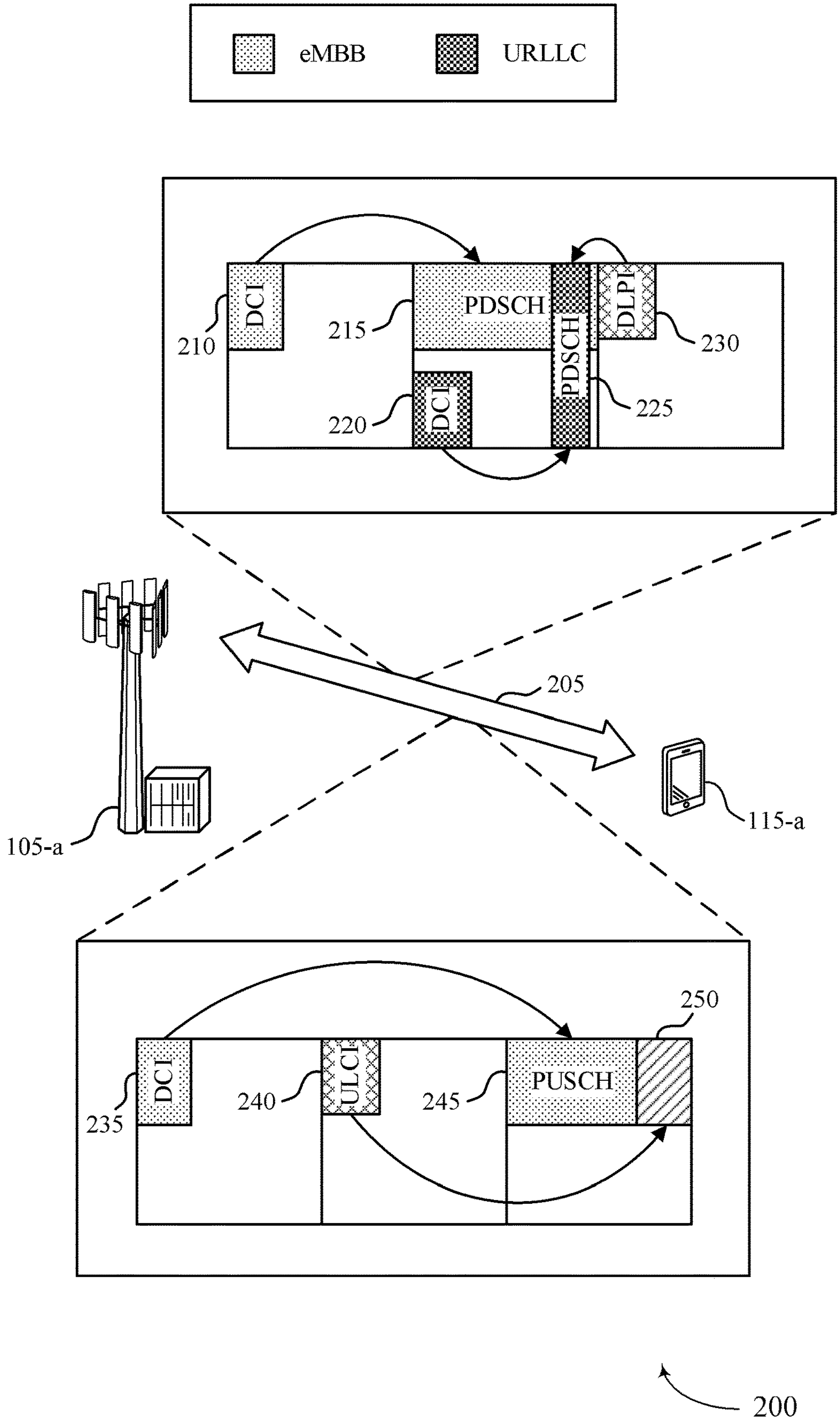

FIG. 2 illustrates an example of a wireless communications system 200 that supports techniques for inter-UE multiplexing in half-duplex FDD operation in accordance with aspects of the present disclosure. The wireless communications system 200 may implement or be implemented to realize aspects of the wireless communications system 100. For example, the wireless communications system 200 may illustrate communication between a UE 115-*a* and a base station 105-*a* via a communication link 205, which may be examples of corresponding devices as described here, including with reference to FIG. 1. In some examples, the UE 115-*a* (which may be an example of a reduced capability (RedCap) device) and the base station 105-*a* may support various inter-UE multiplexing configurations to increase decoding probabilities and system performance while maintaining uplink throughput from the UE 115-*a* to the base station 105-*a*.

In some aspects, the UE 115-*a* and the base station 105-*a* may support a first type of communications, such as eMBB. In such aspects, the UE 115-*a* may be equivalently referred to as an eMBB UE 115-*a* and the UE 115-*a* and the base station 105-*a* may accordingly communicate via eMBB. The base station 105-*a* may also support other communication types with other UEs 115, including URLLC. For example, although FIG. 2 shows the base station 105-*a* and the UE 115-*a*, the base station 105-*a* may additionally communicate with one or more other UEs 115, such as a second UE 115, via URLLC. In some cases, eMBB may be associated with relatively larger traffic levels and relatively higher mobility and URLLC may be associated relatively higher reliability and relatively lower latency. As such, the base station 105-*a* may prioritize URLLC transmissions over eMBB transmissions to satisfy the relatively stricter latency timelines associated with URLLC.

In some cases, the base station 105-*a* may re-purpose resources for a URLLC transmission that were previously allocated for an eMBB transmission between the UE 115-*a* and the base station 105-*a*. For example, the base station 105-*a* may transmit DCI 210 to the UE 115-*a* scheduling a physical downlink shared channel (PDSCH) transmission 215 over a first set of resources and may transmit DCI 220 to the second UE 115 (a URLLC UE 115) scheduling a PDSCH transmission 225 (e.g., a URLLC PDSCH) over a second set of resources that at least partially overlap the first set of resources in time and frequency. To inform the UE 115-*a* that some resources of the PDSCH transmission 215 are re-purposed for the PDSCH transmission 225, the base station 105-*a* may transmit a DLPI 230 to the UE 115-*a* that refers to the resources of the PDSCH transmission 215 that are re-purposed for the PDSCH transmission 225. As such, the UE 115-*a* may receive the DLPI 230 and the UE 115-*a* may flush or otherwise empty a HARQ buffer at the UE 115-*a* associated with the resources that are re-purposed for the PDSCH transmission 225, which may be equivalently referred to as punctured resources. The UE 115-*a*, based on emptying the HARQ buffer associated with the punctured resources, may experience increased eMBB decoding probability. In some aspects, the base station 105-*a* may transmit the DLPI 230 to the UE 115-*a* via a group-common DCI.

The base station 105-*a* may similarly re-purpose resources that are initially allocated for an uplink transmission from the UE 115-*a*. For example, the base station 105-*a* may transmit DCI 235 to the UE 115-*a* scheduling a physical uplink shared channel (PUSCH) transmission 245 over a first set of resources and may re-purpose a subset of the first set of resources (e.g., canceled resources 250) for another transmission, which may be a URLLC uplink or downlink transmission or otherwise have a higher priority than the PUSCH transmission 245, such that the PUSCH transmission 245 avoids interfering with the other transmission. To inform the UE 115-*a* of the canceled resources 250, the base station 105-*a* may transmit a ULCI 240 referring to the canceled resources 250 that are re-purposed for the other transmission. As such, the UE 115-*a* may suspend the scheduled PUSCH transmission 245 to free the canceled resources 250 for the other transmission. Further, although described in the context of a PUSCH transmission 245, the UE 115-*a* may similarly suspend a sounding reference signal (SRS) transmission based on the ULCI 240. In some aspects, the base station 105-*a* may also transmit the ULCI 240 to the UE 115-*a* via a group-common DCI.

In some examples, the UE 115-*a* may function as or be an example of a half-duplex FDD UE 115 and may alternatively (e.g., not simultaneously) transmit or receive signaling to or from the base station 105-*a*. In other words, the UE 115-*a* may either transmit or receive signaling to or from the base station 105-*a* and may be unable to simultaneously transmit and receive signaling to and from the base station 105-*a*. For example, if the UE 115-*a* is transmitting via the uplink at the same time as the base station 105-*a* transmits to the UE 115-*a* via the downlink, the UE 115-*a* may be unable to receive the downlink transmission from the base station 105-*a*. Additional details relating to such half-duplex FDD operation are described herein, including with reference to FIG. 3.

As such, if the base station 105-*a* transmits a group-common DCI including the DLPI 230 or the ULCI 240 while the UE 115-*a* is transmitting via the uplink, the UE 115-*a* may fail to receive the DLPI 230 or the ULCI 240, which may result in decreased decoding probability or lower URLLC performance and reliability. For example, if an active uplink BWP of the UE 115-*a* (communicating in a half-duplex FDD operation) and a full-duplex FDD UE 115 at least partially overlap, the PUSCH transmission 245 may interfere with a URLLC transmission from the full-duplex FDD UE 115 if the UE 115-*a* fails to receive the ULCI 240, which may potentially degrade URLLC performance and reliability. Similarly, the UE 115-*a* may be unaware of which part (e.g., which resources) of the PDSCH transmission 215 are pre-empted by the PDSCH transmission 225 if the UE 115-*a* misses the group-common DCI including the DLPI 230. As such, the performance of the UE 115-*a* may be degraded as the UE 115-*a* may fail to empty or flush the HARQ buffer associated with the punctured resources.

To avoid a missing of the DLPI 230 or the ULCI 240 at the UE 115-*a*, the base station 105-*a* may apply a scheduling restriction on the UE 115-*a* and avoid scheduling uplink transmissions from the UE 115-*a* during a PDCCH monitoring occasion for the DCI including the DLPI 230 or the ULCI 240. In some cases, however, such a scheduling restriction on the UE 115-*a* may degrade the performance and uplink throughput of the UE 115-*a*. For example, monitoring occasions for the DLPI 230 or the ULCI 240 may be slot based or mini-slot based such that the UE 115-*a* may be restricted from transmitting via the uplink for the entirety of the slot or mini-slot over which the UE 115-*a* may monitor for the DLPI 230 or the ULCI 240.

In some implementations of the present disclosure, the UE 115-*a* and the base station 105-*a* may employ one or more inter-UE multiplexing schemes to maintain the performance and uplink throughput of the UE 115-*a* while increasing the likelihood for the UE 115-*a* to receive the DLPI 230 or the ULCI 240 or to otherwise avoid interfering with a URLLC transmission (if the UE 115-*a* is scheduled for an at least partially canceled PUSCH transmission 245) or adversely impacting the decoding performance of the UE 115-*a* (if the UE 115-*a* is scheduled for an at least partially pre-empted PDSCH transmission 215). Additional details relating to various inter-UE multiplexing schemes are described herein, including with reference to FIGS. 4 through 6.

Figure 3:
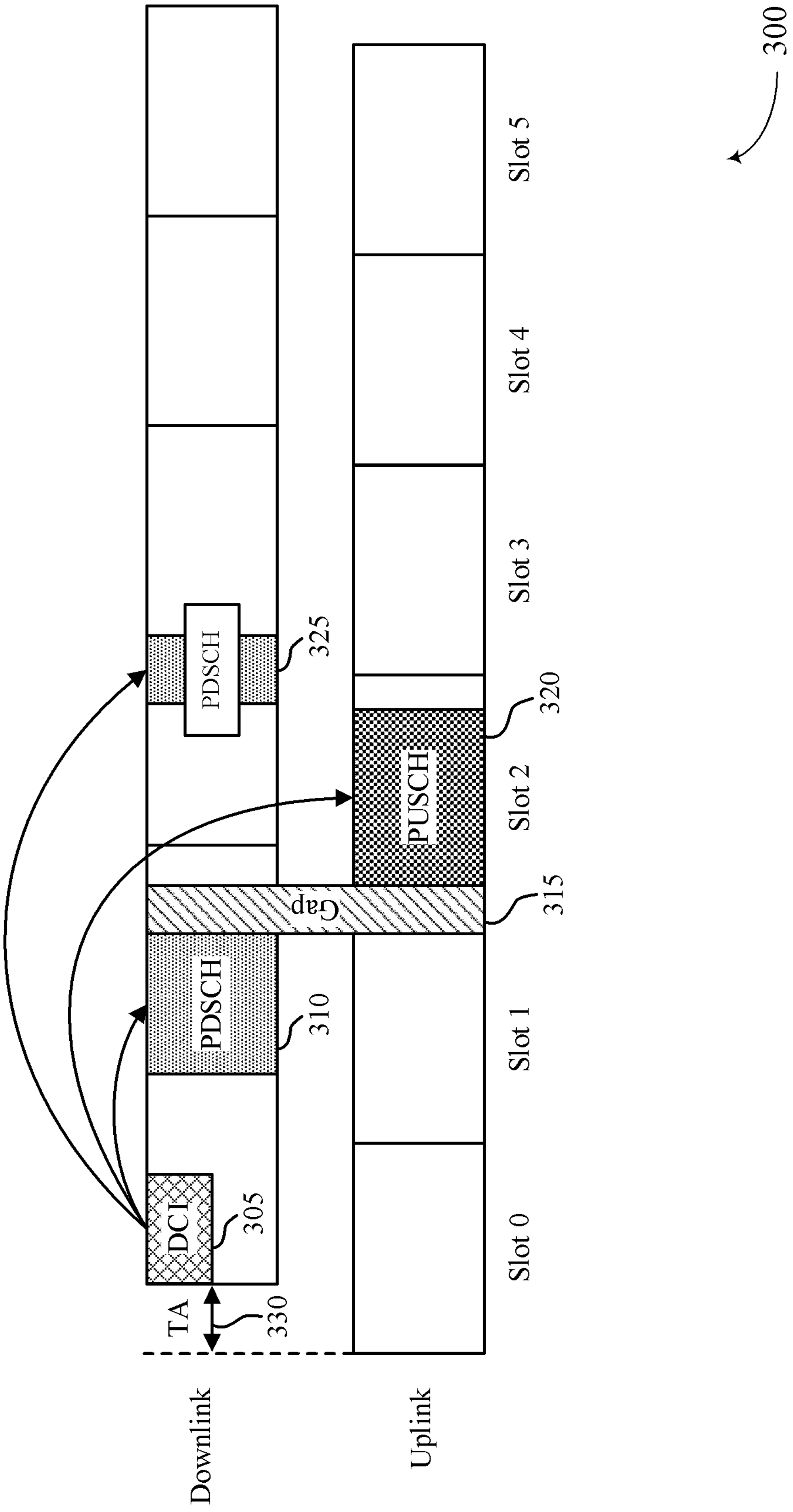
FIG. 3 illustrates an example of a communication timeline that supports techniques for inter-UE multiplexing in half-duplex FDD operation in accordance with aspects of the present disclosure.

FIG. 3 illustrates an example of a communication timeline 300 that supports techniques for inter-UE multiplexing in half-duplex FDD operation in accordance with aspects of the present disclosure. The communication timeline 300 may implement or be implemented to realize aspects of the wireless communications system 100 or the wireless communications system 200. For example, the communication timeline 300 may illustrate communication between a UE 115 and a base station 105, which may be examples of corresponding devices described herein, including with reference to FIGS. 1 and 2.

As illustrated by the communication timeline 300, the base station 105 may transmit a DCI 305 to the UE 115 via the downlink in a first downlink slot (e.g., a downlink slot 0). The DCI 305 may schedule data transmissions between the UE 115 and the base station 105, including a PDSCH transmission 310 from the base station 105 to the UE 115, a PUSCH transmission 320 from the UE 115 to the base station 105, and a PDSCH transmission 325 from the base station 105 to the UE 115. In some aspects, the UE 115 and the base station 105 may experience a timing advance (TA) 330, which may refer to a time offset between a start of a downlink slot and a corresponding uplink slot. For instance, the uplink slot 0 may be offset by the TA 330 from the downlink slot 0. In some cases, the TA 330 may be equivalently referred to as an uplink TA 330.

In some examples, the UE 115 may support half-duplex FDD operation or may be an example of a RedCap device. In such examples, the half-duplex FDD operation may allow or otherwise enable the UE 115 to receive and transmit on different frequencies at different times (e.g., not at the same time). For example, the UE 115 and the base station 105 may communicate via the downlink over a first radio frequency band and may communicate via the uplink over a second radio frequency band. In some aspects, the UE 115 may employ a switch (to switch between monitoring the downlink and transmitting via the uplink) in place of a duplexer (which may be employed to support full-duplex operation) to reduce cost associated with the UE 115. In such aspects, the UE 115 may refrain from monitoring the downlink (e.g., for a PDCCH transmission, such as the DCI 305) if the UE 115 is transmitting or during a switching gap (such as a gap 315).

The UE 115 may support various types of half-duplex FDD operation. For example, in a first type of half-duplex FDD operation, which may be equivalently referred to as Type A half-duplex FDD, the UE 115 may employ separate oscillators for downlink communication (such as for the PDSCH transmission 310 and the PDSCH transmission 325) and uplink communication (such as for the PUSCH transmission 320). In such examples of Type A half-duplex FDD, the base station 105 and the UE 115 may use the gap 315 before the PUSCH transmission 320 to separate the PDSCH transmission 310 from the PUSCH transmission 320 in time. Such a gap 315 in time may allow or otherwise enable the UE 115 to switch from a receiving oscillator or receiver chain to a transmitting oscillator or transmitting chain. Additionally, in Type A half-duplex FDD, a gap or separation in time between the PUSCH transmission 320 and the PDSCH transmission 325 (e.g., a downlink transmission subsequent to the PUSCH transmission 320) may be incorporated in the uplink TA 330 based on a decision of the base station 105.

Alternatively, in a second type of half-duplex FDD operation, which may be equivalently referred to as Type B half-duplex FDD, the UE 115 may employ a single oscillator for uplink communication and downlink communication. In such examples of Type B half-duplex FDD, the UE 115 and the base station 105 may employ a relatively longer (in terms of time duration) gap between uplink communication and downlink communication. For example, a separation in time between the PUSCH transmission 320 and the PDSCH transmission 325 may be relatively longer in Type B half-duplex FDD than in Type A half-duplex FDD.

Figure 4:
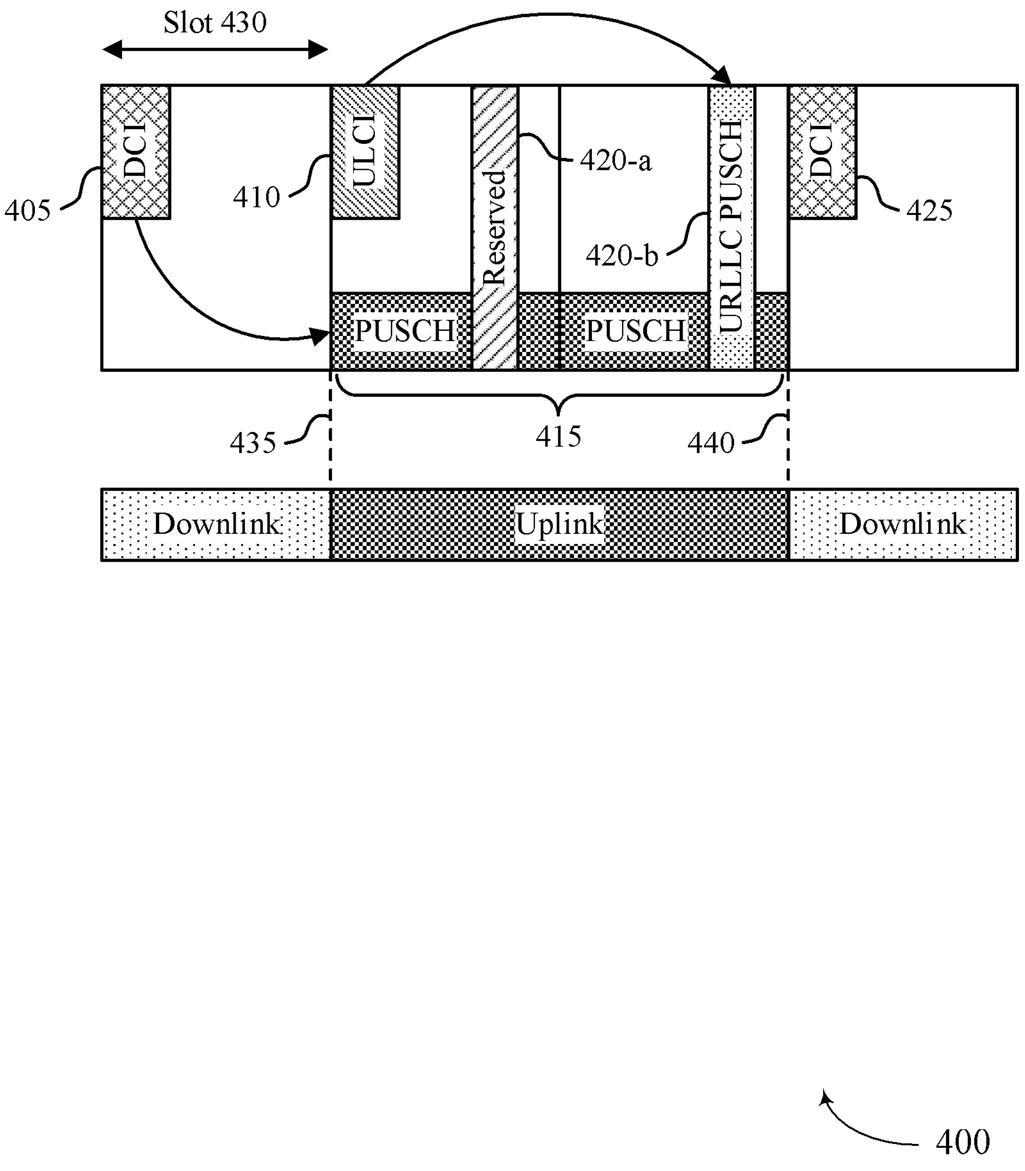
FIGS. 4 through 6 illustrate examples of inter-UE multiplexing schemes that support techniques for inter-UE multiplexing in half-duplex FDD operation in accordance with aspects of the present disclosure.

FIG. 4 illustrates an example of an inter-UE multiplexing scheme 400 that supports techniques for inter-UE multiplexing in half-duplex FDD operation in accordance with aspects of the present disclosure. The inter-UE multiplexing scheme 400 may implement or be implemented to realize aspects of the wireless communications system 100 or the wireless communications system 200. For example, the inter-UE multiplexing scheme 400 may illustrate communication between a base station 105 and a first UE 115 (which may function as or be an example of a RedCap UE 115, a half-duplex FDD UE 115, or an eMBB UE 115, or a combination thereof), which may be examples of corresponding devices as described herein, including with reference to FIGS. 1 and 2. In some examples, the first UE 115 and the base station 105 may support the inter-UE multiplexing scheme 400 to reduce a likelihood for the first UE 115 to interfere with other (higher priority) communications between the base station 105 and one or more other UEs 115.

For example, in some implementations of the present disclosure, the base station 105 may configure the first UE 115 with reserved resources 420 around which the first UE 115 may rate-match PDSCH transmissions or PUSCH transmissions. Such reserved resources 420 may include a set of physical resource blocks or symbols, or any other set of time or frequency resources (or both). In some examples, the base station 105 may reserve the reserved resources 420 for other higher priority transmissions between the base station and one or more other UEs 115. Such higher priority transmissions may include URLLC transmissions, eMBB transmissions, or another RedCap UE transmission.

The base station 105 may configure the first UE 115 with the reserved resources 420 based on transmitting a resource reservation to the first UE 115. In some aspects, the base station 105 may transmit the resource reservation via RRC signaling or via a combination of RRC signaling and DCI. In examples in which the base station 105 transmits the resource reservation via a combination of RRC signaling and DCI, the base station 105 may configure the reserved resources 420 via the RRC signaling and may dynamically enable or disable (e.g., activate or deactivate) the reserved resources 420 for a transmission scheduled by the DCI.

In some examples, the resource reservation (e.g., the part of the resource reservation configuring the reserved resources 420, such as the RRC signaling component of the resource reservation in examples in which the resource reservation is a combination of RRC signaling and DCI) may have a format similar to a resource indication carried by a DLPI or a ULCI. For example, the resource reservation may include an N*M bitmap corresponding to a time-frequency region partitioned with M time domain parts (e.g., M time domain units) and N frequency domain parts (e.g., N frequency domain units). As such, each time domain part and each frequency domain part may be indicated by 1-bit of the total N*M bits bitmap.

In some cases, the base station 105 may configure the reserved resources 420 periodically or as periodic resources such that the reserved resources 420 may occur periodically (e.g., in each slot 430). For example, the reserved resources 420 may include reserved resources 420-*a* in a second slot 430 and reserved resources 420-*b* in a third slot 430. Additionally, in some implementations, the base station 105 may configure whether the reserved resources 420 are for transmissions having or otherwise associated with a relatively lower priority level or for all transmissions (regardless of a priority level of the scheduled transmission). For example, the base station 105 may configure the reserved resources 420 to be reserved from transmissions having a priority level lower than a threshold priority level (such as PUSCH transmissions 415 having a priority level index of 0). Alternatively, the base station 105 may configure the reserved resources 420 to be reserved from all transmissions (such as PUSCH transmissions 415 having either a priority level index of 0 or 1).

The first UE 115 and the base station 105, based on the resource reservation, may communicate in a manner to avoid communicating over the reserved resources 420. For example, the base station 105 may transmit a DCI 405 to the first UE 115 in a first slot 430 scheduling a PUSCH transmission 415 over a set of resources in a second slot 430 and a third slot 430. In some examples, such as in examples in which the base station 105 conveys the resource reservation via a combination of RRC signaling and the DCI 405, the DCI 405 may indicate whether the reserved resources 420 are enabled or activated for the PUSCH transmission 415. In the context of the inter-UE multiplexing scheme 400, the reserved resources 420 may be enabled or activated for the PUSCH transmission 415. As such, the first UE 115 may switch from monitoring the downlink to transmitting the PUSCH transmission 415 to the base station 105 at 435 and may rate-match around the reserved resources 420-*a* and the reserved resources 420-*b* (if the PUSCH transmission 415 is associated with a priority level index lower than a threshold priority level index, if configured).

Accordingly, in some implementations, the first UE 115 may transmit the PUSCH transmission 415 over a subset of the set of resources for which the PUSCH transmission 415 was scheduled (such that the subset of the set of resources incudes the set of resources allocated by the DCI 405 rate-matched around the reserved resources 420) and the base station 105 may schedule any higher priority transmissions over the reserved resources 420. For example, the base station 105 may schedule a URLLC PUSCH transmission from a second UE 115 over the reserved resources 420-*b* in the third slot 430. The base station 105 may additionally transmit a ULCI 410 to the first UE 115 in the second slot 430 to inform the first UE 115 of the URLLC PUSCH transmission that is allocated resources that were initially allocated to the PUSCH transmission 415. The first UE 115 (in half-duplex FDD operation) may be unable to receive the ULCI 410, however, and may be unaware of the URLLC PUSCH transmission. Nonetheless, the first UE 115 may refrain from transmitting over the reserved resources 420-*b* based on the resource reservation and may thus avoid interfering with the URLLC PUSCH transmission from the second UE 115. The first UE 115, after transmitting the PUSCH transmission 415, may switch from uplink operation to downlink operation at 440 and monitor for a DCI 425 in a fourth slot 430.

Further, although illustrated by and described with reference to the PUSCH transmission 415, the first UE 115 may equivalently rate-match a PDSCH transmission around the reserved resources 420 based on the resource reservation. For example, based on the resource reservation indicating the reserved resources 420, the base station 105 may refrain from transmitting a PDSCH transmission over the reserved resources 420 and the first UE 115 may likewise refrain from monitoring for (and constructing a HARQ buffer for) the PDSCH transmission over the reserved resources 420. Further, in addition or as an alternative to the PUSCH transmission 415, the first UE 115 may be scheduled to transmit one or more SRSs. In such examples in which the first UE 115 is scheduled to transmit one or more SRSs, the first UE 115 may drop one or more SRS transmissions if the resources over which the UE 115 is scheduled to transmit the SRS at least partially overlap or collide with the reserved resources 420.

Figure 5:
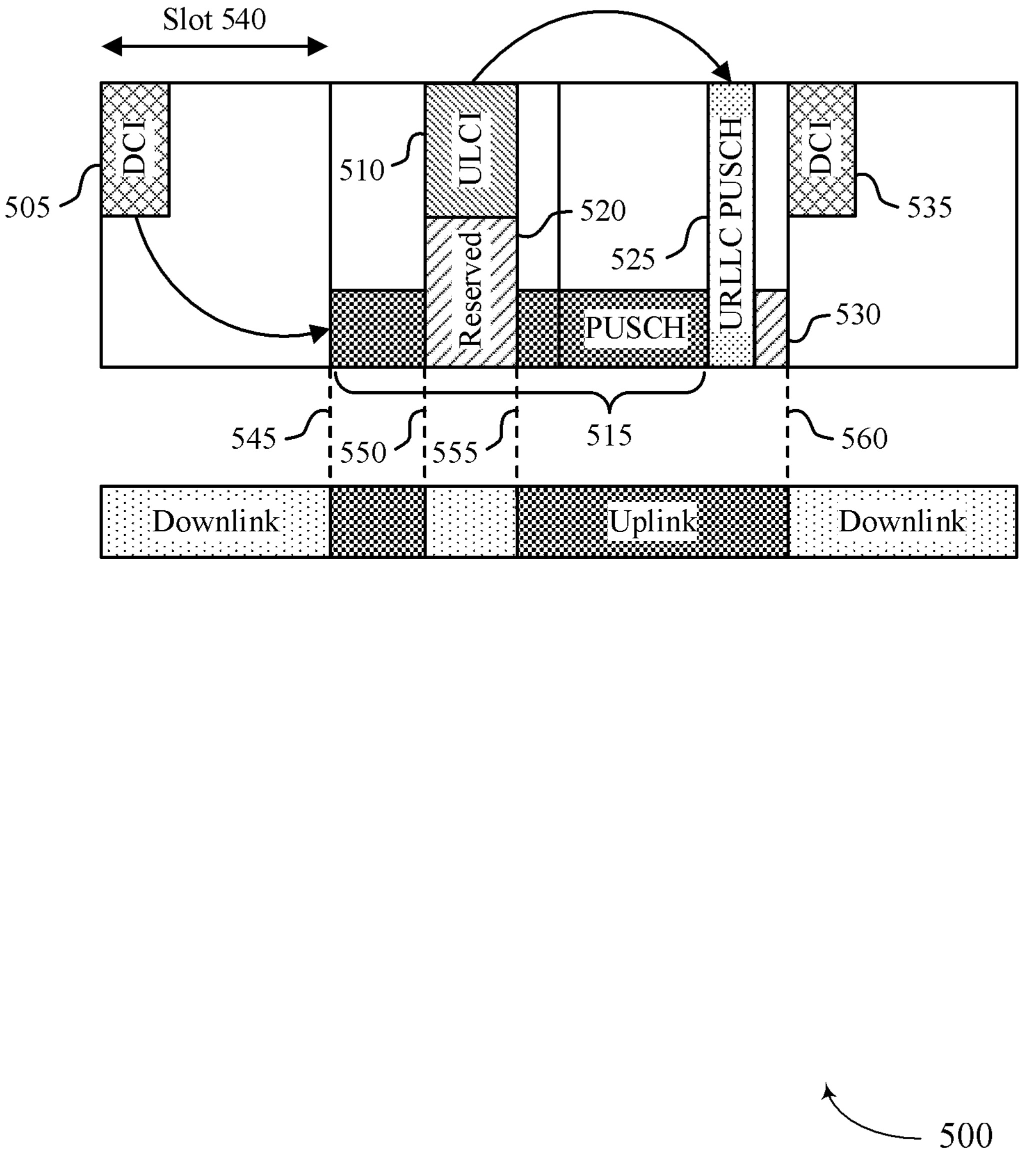

FIG. 5 illustrates an example of an inter-UE multiplexing scheme 500 that supports techniques for inter-UE multiplexing in half-duplex FDD operation in accordance with aspects of the present disclosure. The inter-UE multiplexing scheme 500 may implement or be implemented to realize aspects of the wireless communications system 100 or the wireless communications system 200. For example, the inter-UE multiplexing scheme 500 may illustrate communication between a base station 105 and a first UE 115 (which may function as or be an example of a RedCap UE 115, a half-duplex FDD UE 115, or an eMBB UE 115, or a combination thereof), which may be examples of corresponding devices described herein, including with reference to FIGS. 1 and 2. In some examples, the first UE 115 and the base station 105 may support the inter-UE multiplexing scheme 500 to increase a likelihood for the first UE 115 to successfully receive a DLPI or a ULCI from the base station 105.

For example, in some implementations of the present disclosure, the base station 105 may configure the first UE 115 with reserved resources 520 over which the first UE 115 may monitor for a downlink control transmission, such as DCI, including a DLPI or a ULCI (such as a ULCI 510). For instance, if the first UE 115 is scheduled to transmit an uplink transmission in resources that at least partially overlap with the reserved resources 520, the first UE 115 may switch from transmitting the uplink transmission via the uplink to monitoring the downlink for a DLPI or a ULCI. In other words, the first UE 115 may prioritize the reception of the PDCCH transmission carrying a DLPI or a ULCI over a scheduled uplink transmission if collisions between the uplink transmission and the PDCCH occur. Such reserved resources 520 may include a set of physical resource blocks or symbols, or any other set of time or frequency resources (or both).

In some examples, the base station 105 may transmit control signaling to the first UE 115 indicating the UE 115 to switch to the downlink for PDCCH monitoring over the reserved resources 520. In some aspects, the base station 105 may transmit the control signaling (e.g., the "switch to downlink" configuration) via RRC signaling and may configure the reserved resources 520 semi-persistently (e.g., such that the reserved resources 520 may be configured as semi-persistent resources).

Additionally, in some implementations, the base station 105 may configure whether the reserved resources 520 are for uplink transmissions having or otherwise associated with a relatively lower priority level or for all uplink transmissions (regardless of priority level of the scheduled uplink transmission). For example, the base station 105 may configure the reserved resources 520 to be reserved from uplink transmissions having a priority level lower than a threshold priority level (such as an uplink transmission having a priority level index of 0). Alternatively, the base station 105 may configure the reserved resources 520 to be reserved from uplink transmissions having various priority levels (such as either a priority level index of 0 or 1). In some cases, however, the reserved resources 520 may not apply to some uplink transmissions, such as uplink transmissions associated with a random access procedure (e.g., including a physical random access channel (PRACH) transmission, a message 3 (Msg3) transmission, or a message A (MsgA) transmission). As such, the first UE 115 may refrain from interrupting or postponing a PRACH transmission, a Msg3 transmission, or a MsgA transmission even if resources allocated for any of such transmissions at least partially overlap with the reserved resources 520.

The first UE 115 and the base station 105 may communicate in accordance with the control signaling indicating the switch to downlink monitoring for the reserved resources 520. For example, the base station 105 may transmit a DCI 505 to the first UE 115 in a first slot 540 scheduling a PUSCH transmission 515 over a first set of resources in a second slot 540 and a third slot 540. As such, the first UE 115 may switch from monitoring the downlink in the first slot 540 to transmitting the scheduled PUSCH transmission 515 in the second slot 540 at 545. Between 545 and 550, the first UE 115 may transmit at least a portion of the PUSCH transmission 515 and, at 550, the reserved resources 520 may at least partially overlap in time with the first set of resources that were allocated for the PUSCH transmission 515 by the DCI 505. As such, the first UE 115 may switch from transmitting the PUSCH transmission 515 to monitoring the downlink for the ULCI 510. Such a switching may include a puncturing or a postponement of at least a portion of the PUSCH transmission 515.

In some aspects, the ULCI 510 may indicate that some resources that were initially allocated to the PUSCH transmission 515 by the DCI 505 are reserved for a URLLC PUSCH transmission 525 from a second UE 115. At 555, based on receiving the ULCI 510, the first UE 115 may cancel any resources 530 from the PUSCH transmission 515 that are canceled by the ULCI 510 (e.g., for the URLLC PUSCH transmission 525). At 560, the first UE 115, after transmitting the PUSCH transmission 515, may switch from uplink operation to monitoring over the downlink for a DCI 535.

Further, although illustrated by and described with reference to the PUSCH transmission 515, the first UE 115 may equivalently switch from transmitting one or more SRSs to monitoring the downlink for a DLPI or a ULCI. For example, the first UE 115 may refrain from transmitting an SRS scheduled for a symbol period at least partially overlapping with a symbol period of the reserved resources 520. As such, the first UE 115 may prioritize the reception of a PDCCH transmission carrying a DLPI or a ULCI over either a scheduled PUSCH transmission or a scheduled SRS transmission if collisions between the PDCCH transmission and the PUSCH or SRS transmission occur.

Figure 6:
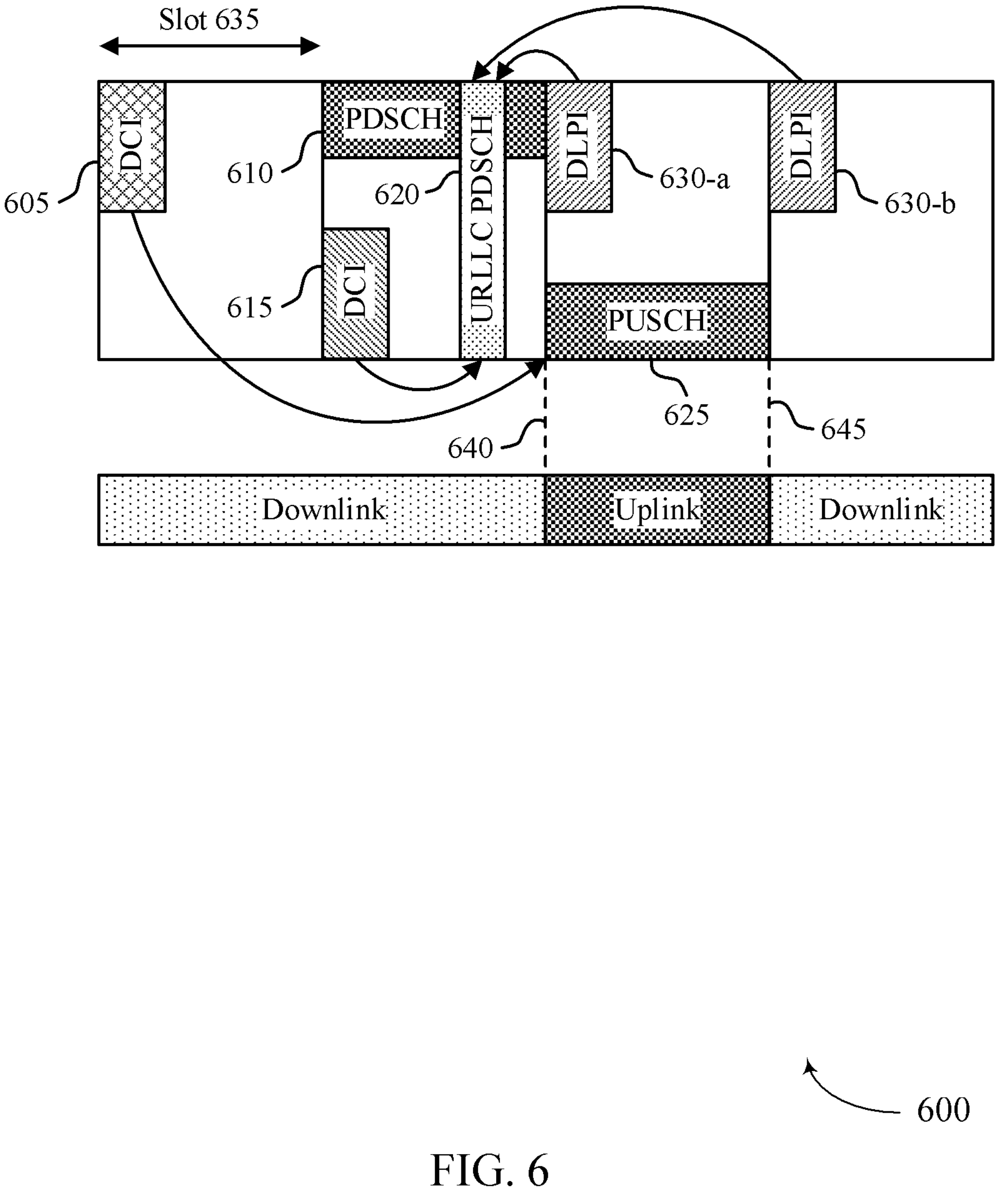

FIG. 6 illustrates an example of an inter-UE multiplexing scheme 600 that supports techniques for inter-UE multiplexing in half-duplex FDD operation in accordance with aspects of the present disclosure. The inter-UE multiplexing scheme 600 may implement or be implemented to realize aspects of the wireless communications system 100 or the wireless communications system 200. For example, the inter-UE multiplexing scheme 600 may illustrate communication between a base station 105 and a first UE 115 (which may function as or be an example of a RedCap UE 115, a half-duplex FDD UE 115, or an eMBB UE 115, or a combination thereof), which may be examples of corresponding devices described herein, including with reference to FIGS. 1 and 2. In some examples, the first UE 115 and the base station 105 may support a retransmission of a DLPI 630 from the base station 105 to increase a likelihood for the first UE 115 to successfully receive the DLPI 630.

For example, in some implementations of the present disclosure, the base station 105 may transmit a retransmission of the DLPI 630 in a downlink data transmission such that the first UE 115 may still receive the DLPI 630 even if the first UE 115 was in uplink operation when an initial instance of the DLPI 630 was transmitted via a PDCCH transmission (e.g., a group-common DCI). In some examples, for instance, the base station 105 may transmit a DCI 605 to the first UE 115 in a first slot 635 scheduling a PUSCH transmission 625 over a first set of resources in a third slot 635. In a second slot 635 intermediate to the first slot 635 and the third slot 635, base station 105 may additionally transmit a PDSCH transmission 610 to the first UE 115 over a second set of resources but may re-purpose at least a portion of the second set of resources allocated for the PDSCH transmission 610 for a URLLC PDSCH transmission 620 for a second UE 115 via a DCI 615 sent to the second UE 115.

To inform the first UE 115 that some resources of the second set of resources that were initially allocated for the PDSCH transmission 610 are re-purposed for the URLLC PDSCH transmission 620, the base station 105 may transmit a DLPI 630-*a* (e.g., an initial or a first instance of the DLPI) to the first UE 115 via group-common DCI in the third slot 635. The first UE 115, however, may have switched from monitoring the downlink to receive the PDSCH transmission 610 to transmitting the scheduled PUSCH transmission 625 at 640, however, which may be prior to the transmission of the DLPI 630-*a* from the base station 105. As such, the first UE 115 (in half-duplex FDD operation) may be unable to receive the DLPI 630-*a* and may (incorrectly) assume that the PDSCH transmission 610 was received over the complete second set of resources, which may adversely affect a decoding probability of the first UE 115 for decoding the PDSCH transmission 610.

To avoid such adverse impact on the decoding probability of the first UE 115, the base station 105 may transmit another downlink data transmission to the first UE 115 including a DLPI 630-*b* (e.g., a retransmission or a second instance of the DLPI 630). Accordingly, the first UE 115 may switch from uplink operation to monitoring the downlink at 645 and may receive the downlink data transmission including the DLPI 630-*b*. As such, the first UE 115 may identify that some resources of the second set of resources over which the first UE 115 monitored for the PDSCH transmission 610 are re-purposed or pre-empted for the URLLC PDSCH transmission 620 and may empty or flush a HARQ buffer at the first UE 115 associated with the re-purposed or pre-empted resources, which may improve the decoding probability of the first UE 115 to successfully decode the PDSCH transmission 610.

In some examples, the base station 105 may multiplex the DLPI 630-*b* with a retransmission of the pre-empted PDSCH transmission 610 (e.g., a portion of the PDSCH transmission 610 that was dropped or postponed to allow for the URLLC PDSCH transmission 620). In some other examples, the base station 105 may multiplex the DLPI 630-*b* with another PDSCH transmission to the first UE 115. Additional details relating to such a multiplexing of the DLPI 630-*b* with a downlink data transmission (either a retransmission of the pre-empted PDSCH transmission 610 or another PDSCH transmission) are described herein, including with reference to FIG. 7. Alternatively, in some examples, the base station 105 may transmit the DLPI 630-*b* to the first UE 115 via a MAC control element (MAC-CE). In such examples in which the first UE 115 receives the DLPI 630-*b* via a MAC-CE, the first UE 115 may additionally receive a configuration of a monitoring occasion for the MAC-CE including the DLPI 630-*b*.

Figure 7:
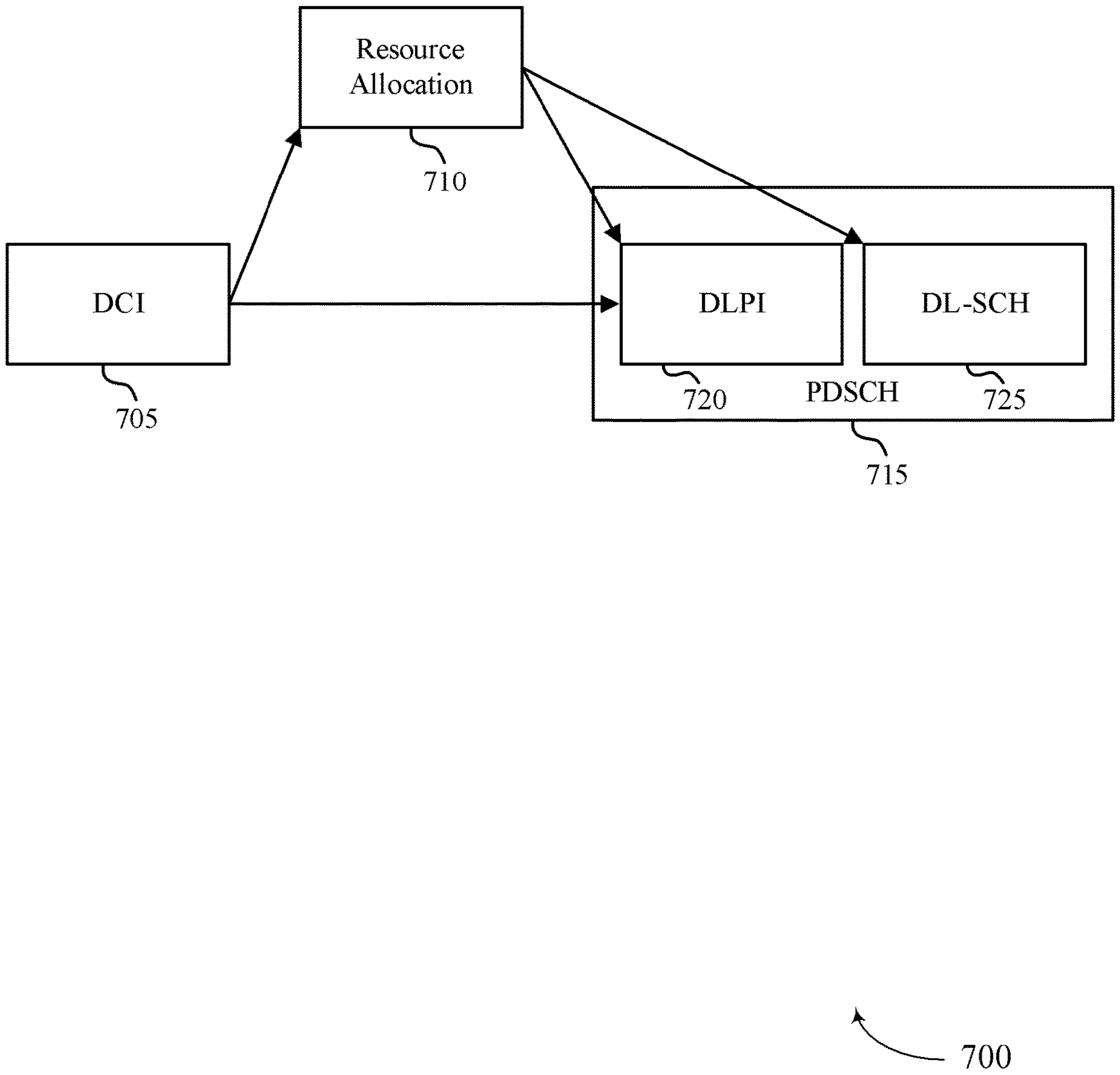
FIG. 7 illustrates an example of a multiplexing scheme that supports techniques for inter-UE multiplexing in half-duplex FDD operation in accordance with aspects of the present disclosure.

FIG. 7 illustrates an example of a multiplexing scheme 700 that supports techniques for inter-UE multiplexing in half-duplex FDD operation in accordance with aspects of the present disclosure. The multiplexing scheme 700 may implement or be implemented to realize aspects of the wireless communications system 100 or the wireless communications system 200. For example, the multiplexing scheme 700 may illustrate communication between a base station 105 and a UE 115 (which may function as or be an example of a RedCap UE 115, a half-duplex FDD UE 115, or an eMBB UE 115, or a combination thereof), which may be examples of corresponding devices described herein, including with reference to FIGS. 1 and 2. In some examples, the base station 105 may transmit a DLPI 720 (e.g., a retransmission of a previously transmitted DLPI 720) to the UE 115 in a downlink data transmission to increase a likelihood for the UE 115 to successfully receive the DLPI 720.

For example, the base station 105 may transmit an initial or first instance of the DLPI 720 via a downlink control transmission, such as group-common DCI, and the UE 115 may fail to receive the first instance of the DLPI 720 because the UE 115 may be transmitting via the uplink and unable to simultaneously monitor the downlink. In some aspects, the DLPI 720 may refer to a subset of resources of a resource allocation 710 scheduled by a DCI 705 over which the UE 115 may monitor for a first downlink data transmission. In some examples, the DCI 705 may additionally schedule the PDSCH transmission 715 and may include an indication of the presence of the DLPI 720 in the PDSCH transmission 715. As such, the UE 115 may avoid blind decoding to receive the retransmission of the DLPI 720 in the PDSCH transmission 715.

The base station 105 may multiplex the DLPI 720 and downlink-shared channel (DL-SCH) data 725 of the PDSCH transmission 715. In other words, for example, the base station 105 may multiplex the retransmission of the DLPI 720 with the DL-SCH data 725 on the PDSCH carrying the PDSCH transmission 715. In some aspects, the base station 105 may transmit the DLPI 720 via a quadrature phase shift keying (QPSK) irrespective of the modulation order for the DL-SCH data 725. Additionally, the base station 105 may scramble and encode the retransmission of the DLPI 720 separately from the DL-SCH data 725. Likewise, the UE 115 may receive the DLPI 720 and the DL-SCH data 725 multiplexed with each and may descramble and decode the DLPI 720 and the DL-SCH data 725 separately from each other.

Figure 8:
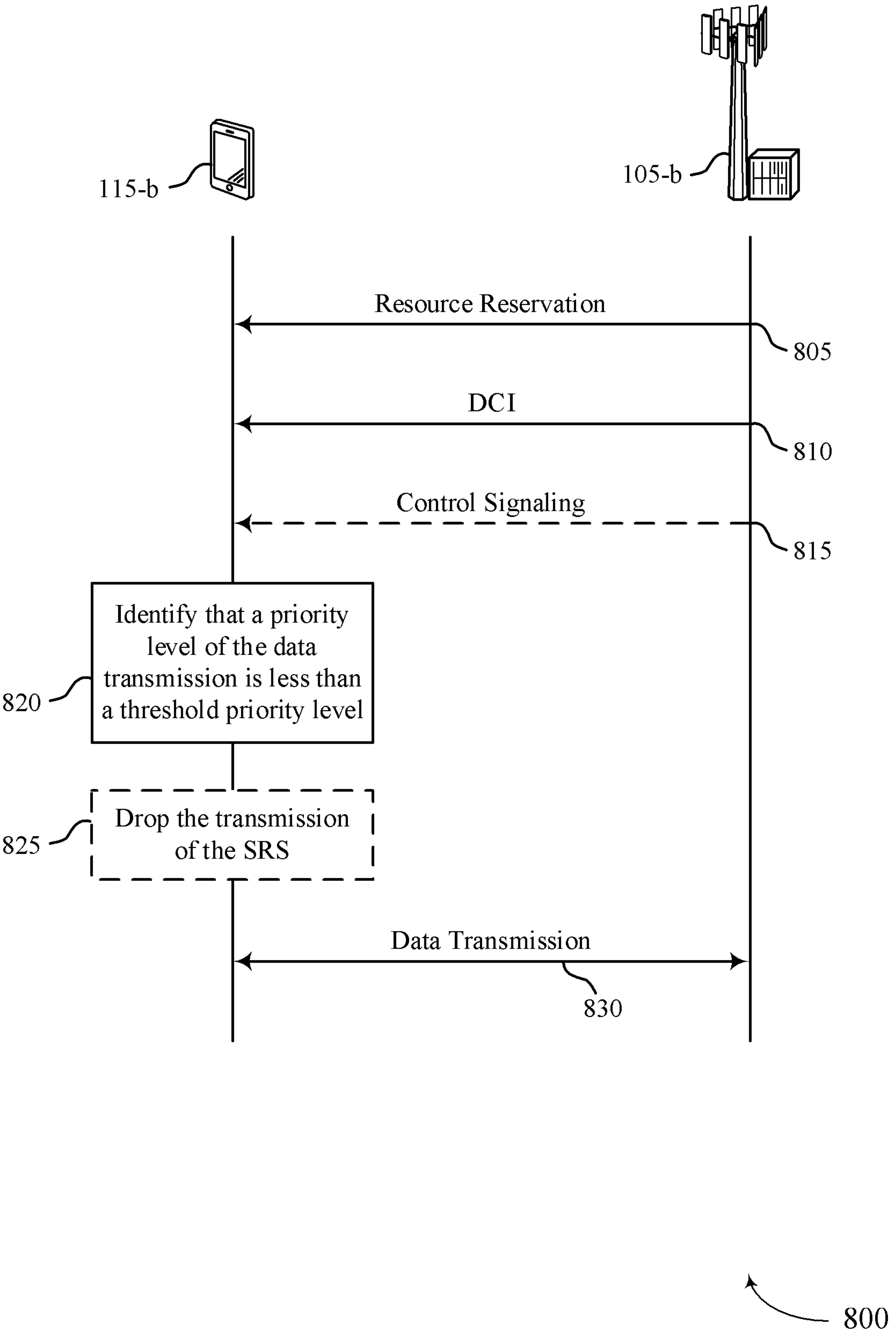
FIGS. 8 through 10 illustrate examples of process flows that support techniques for inter-UE multiplexing in half-duplex FDD operation in accordance with aspects of the present disclosure.

FIG. 8 illustrates an example of a process flow 800 that supports techniques for inter-UE multiplexing in half-duplex FDD operation in accordance with aspects of the present disclosure. The process flow 800 may implement or be implemented to realize aspects of the wireless communications system 100 or the wireless communications system 200. For example, the process flow 800 may illustrate communication between a UE 115-*b* and a base station 105-*b*, which may be examples of corresponding devices described herein, including with reference to FIGS. 1 and 2. In some examples, the UE 115-*b* and the base station 105-*b* may support a resource reservation around which the UE 115-*b* may rate-match PDSCH or PUSCH transmissions and over which the base station 105-*b* may schedule communications between the base station 105-*b* and one or more other UEs 115.

At 805, the UE 115-*b* may receive, from the base station 105-*b*, a resource reservation indicating a set of reserved resources that are reserved for communications between the base station 105-*b* and one or more other UEs 115. In some aspects, the UE 115-*b* may operate in a half-duplex FDD mode. In some examples, the UE 115-*b* may receive the resource reservation via RRC signaling or via a combination of RRC signaling and DCI. In examples in which the UE 115-*b* receives the resource reservation via a combination of RRC signaling and DCI, the RRC signaling may convey the set of reserved resources (e.g., via a bitmap) and the DCI may enable to disable the set of reserved resources for the PDSCH or PUSCH transmission scheduled by the DCI. In some aspects, the set of reserved resources may be periodically configured.

At 810, the UE 115-*b* may receive, from the base station 105-*b*, DCI scheduling a data transmission (e.g., a PDSCH transmission or a PUSCH transmission) with the base station 105-*b* over a set of resources that at least partially overlaps in time with the set of reserved resources.

At 815, the UE 115-*b* may, in some implementations, receive control signaling from the base station 105-*b* scheduling a transmission of an SRS over a second set of resources that at least partially overlaps in time with the set of reserved resources.

At 820, the UE 115-*b* may identify that a priority level of the data transmission is less than a threshold priority level. For example, the base station 105-*b* may configure the set of reserved resources for data transmissions having a relatively lower priority level index, such as a priority level index of 0 or 1.

At 825, the UE 115-*b* may, in some implementations, drop the transmission of the SRS based on the second set of resources at least partially overlapping in time with the set of reserved resources.

At 830, the UE 115-*b* may communicate with the base station 105-*b* via the data transmission over a subset of resources of the set of resources based on the resource reservation and identifying that the priority level of the data transmission is less than the threshold priority level. In some aspects, the subset of resources may include resources of the set of resources that are rate-matched around the set of reserved resources. In other words, the subset of resources may include resources of the set of resources that were allocated for the data transmission minus any overlapping time and frequency resources from the set of reserved resources. As such, the UE 115-*b* may avoid causing interference to communications between the base station 105-*b* and the one or more other UEs 115 or increase a decoding probability of the UE 115-*b* as the base station 105-*b* and the one or more other UEs 115 may communicate over resources around which the UE 115-*b* rate-matches.

Figure 9:
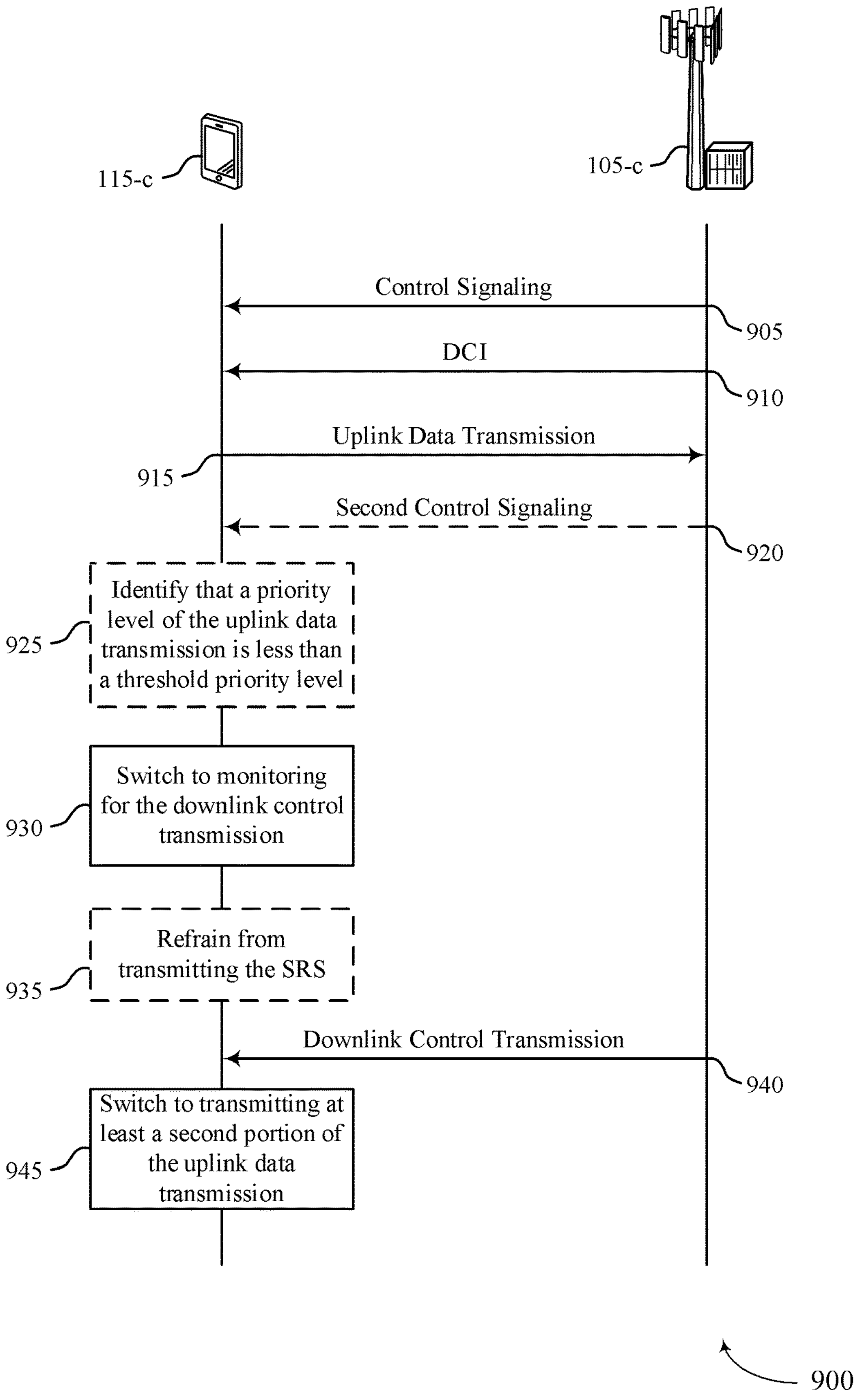

FIG. 9 illustrates an example of a process flow 900 that supports techniques for inter-UE multiplexing in half-duplex FDD operation in accordance with aspects of the present disclosure. The process flow 900 may implement or be implemented to realize aspects of the wireless communications system 100 or the wireless communications system 200. For example, the process flow 900 may illustrate communication between a UE 115-*c* and a base station 105-*c*, which may be examples of corresponding devices described herein, including with reference to FIGS. 1 and 2. In some examples, the UE 115-*c* and the base station 105-*c* may support a resource reservation over which the UE 115-*c* may monitor for downlink control transmissions, such as PDCCH transmissions, including a DLPI or a ULCI.

At 905, the UE 115-*c* may receive, from the base station 105-*c*, control signaling indicating a set of reserved resources that are reserved for communication, by the base station 105-*c*, of a downlink control transmission (e.g., a PDCCH transmission, such as group-common DCI) that includes either a DLPI or a ULCI. In some aspects, the UE 115-*c* may operate in a half-duplex FDD mode. In some examples, the UE 115-*c* may receive the control signaling via RRC signaling and the RRC signaling may configure the reserved resources as semi-persistent resources over which the UE 115-*c* may switch to monitoring the downlink between the UE 115-*c* and the base station 105-*c*.

At 910, the UE 115-*c* may receive, from the base station 105-*c*, DCI scheduling an uplink data transmission over a set of resources that at least partially overlaps in time with the set of reserved resources.

At 915, the UE 115-*c* may transmit, to the base station 105-*c*, at least a portion of the uplink data transmission over the set of resources. For example, the UE 115-*c* may transmit a portion of the uplink data transmission in a time period prior to the set of reserved resources.

At 920, the UE 115-*c* may, in some implementations, receive second control signaling from the base station 105-*c* scheduling an SRS over a second set of resources that at least partially overlaps in time with the set of reserved resources.

At 925, the UE 115-*c* may, in some implementations, identify that a priority level of the uplink data transmission is less than a threshold priority level. For example, the base station 105-*c* may configure the set of reserved resources for uplink data transmissions having a relatively lower priority level index, such as a priority level index of 0 or 1.

At 930, the UE 115-*c* may switch from transmission of the uplink data transmission to monitoring for the downlink control transmission over the set of reserved resources. For example, the UE 115-*c* may puncture or postpone a portion of the scheduled uplink data transmission that overlaps in time with the set of reserved resources and may switch from transmitting via the uplink to monitoring the downlink for the downlink control transmission (e.g., a group-common DCI including a DLPI or a ULCI).

At 935, the UE 115-*c* may, in some implementations, refrain from transmitting the SRS in a time domain overlap between the second set of resources and the set of reserved resources. For example, the UE 115-*c* may refrain from transmitting an SRS in any overlapping symbols between the second set of resources and the set of reserved resources.

At 940, the UE 115-*c* may receive, from the base station 105-*c*, the downlink control transmission that includes either the DLPI or the ULCI based on switching from the transmission of the uplink data transmission to the monitoring for the downlink control transmission over the set of reserved resources.

At 945, the UE 115-*c* may switch from the monitoring for the downlink control transmission over the set of reserved resources to transmitting at least a second portion of the uplink data transmission based on receiving the downlink control transmission at 940. As such, the UE 115-*c* may successfully receive the DLPI or the ULCI while maintaining uplink throughput.

Figure 10:
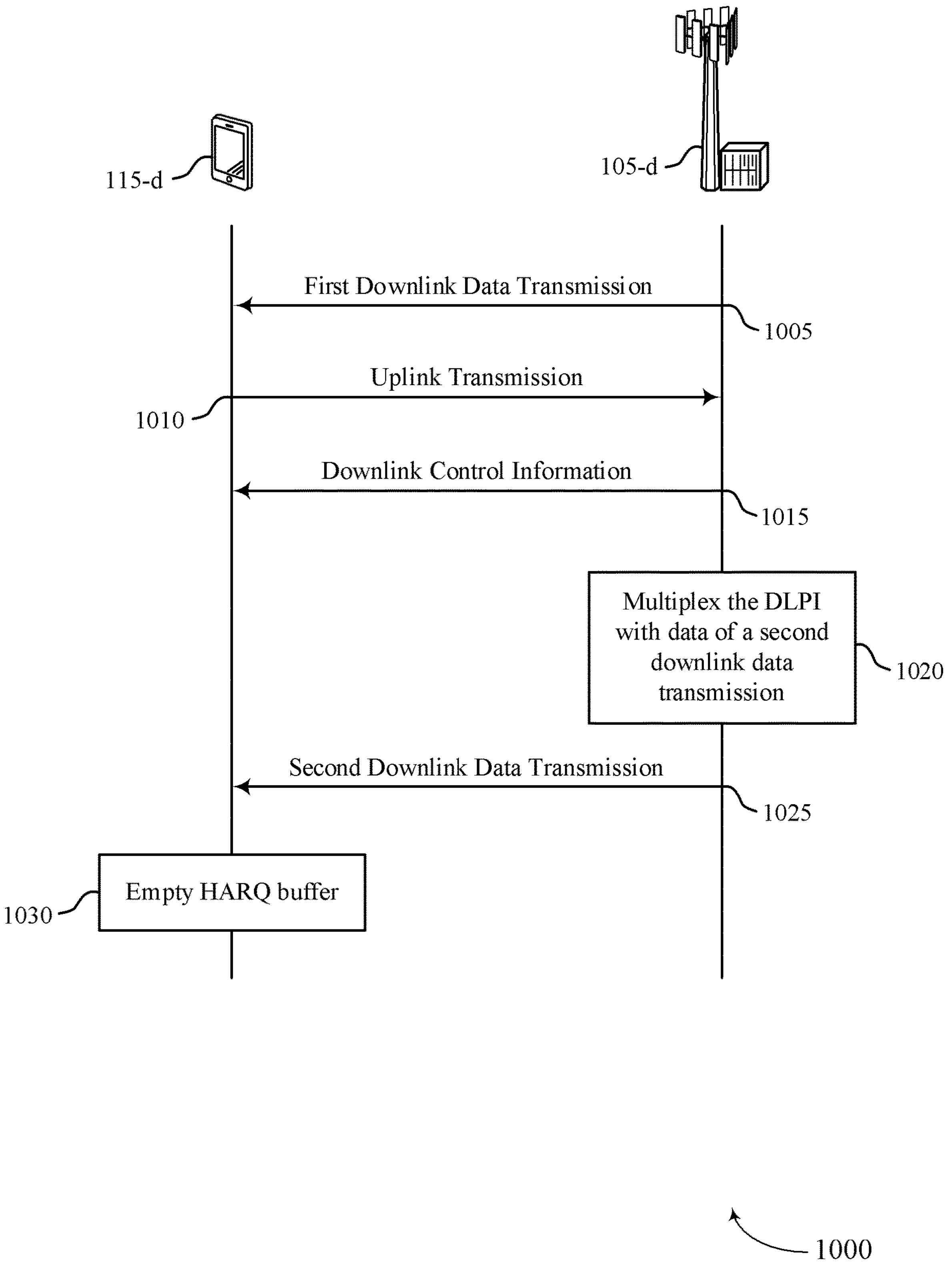

FIG. 10 illustrates an example of a process flow 1000 that supports techniques for inter-UE multiplexing in half-duplex FDD operation in accordance with aspects of the present disclosure. The process flow 1000 may implement or be implemented to realize aspects of the wireless communications system 100 or the wireless communications system 200. For example, the process flow 1000 may illustrate communication between a UE 115-*d* and a base station 105-*d*, which may be examples of corresponding devices described herein, including with reference to FIGS. 1 and 2. In some examples, the UE 115-*d* and the base station 105-*d* may support a retransmission of a DLPI in a downlink data transmission, such as a PDSCH transmission.

At 1005, the UE 115-*d* may receive a first downlink data transmission over a set of resources in a first time period. In some aspects, the UE 115-*d* may operate in a half-duplex FDD mode.

At 1010, the UE 115-*d* may transmit an uplink transmission in a third time period that at least partially overlaps in time with a monitoring occasion for DCI including an instance of the DLPI. As such, because the UE 115-*d* operates in the half-duplex FDD mode, the UE 115-*d* may miss the DCI including the instance of the DLPI and may be unaware that some resources that were allocated for the first downlink data transmission are re-purposed or pre-empted for other communications between the base station 105-*d* and one or more other UEs 115 (such as for a URLLC PUSCH transmission).

At 1015, the UE 115-*d* may receive, from the base station 105-*d*, DCI scheduling a second downlink data transmission. In some examples, the DCI may include an indication of a presence of the DLPI (e.g., a retransmission of the DLPI) in the second downlink data transmission.

At 1020, the base station 105-*d* may multiplex the DLPI with data of the second downlink data transmission. In some examples, the base station 105-*d* may multiplex the DLPI according to a QPSK multiplexing scheme. Additionally, in some examples, the base station 105-*d* may encode the DLPI separately from the data of the second downlink transmission.

At 1025, the UE 115-*d* may receive, from the base station 105-*d*, the second downlink data transmission in a second time period that is after the first time period. In some examples, the second downlink data transmission may include the DLPI referring to a subset of resources of the set of resources over which the UE 115-*d* may monitor for the first downlink data transmission. In some aspects, the second time period may be after the first time period and after the third time period such that the third time period may be intermediate to the first time period and the second time period. In some implementations, the UE 115-*d* may decode the DLPI and the data of the second downlink data transmission separately.

At 1030, the UE 115-*d* may empty a HARQ buffer associated with the subset of resources based on the DLPI received via the downlink data transmission. As such, the UE 115-*d* may experience a greater decoding probability for decoding the first downlink data transmission even in examples in which the UE 115-*d* misses the DLPI transmitted via group-common DCI.

Figure 11:
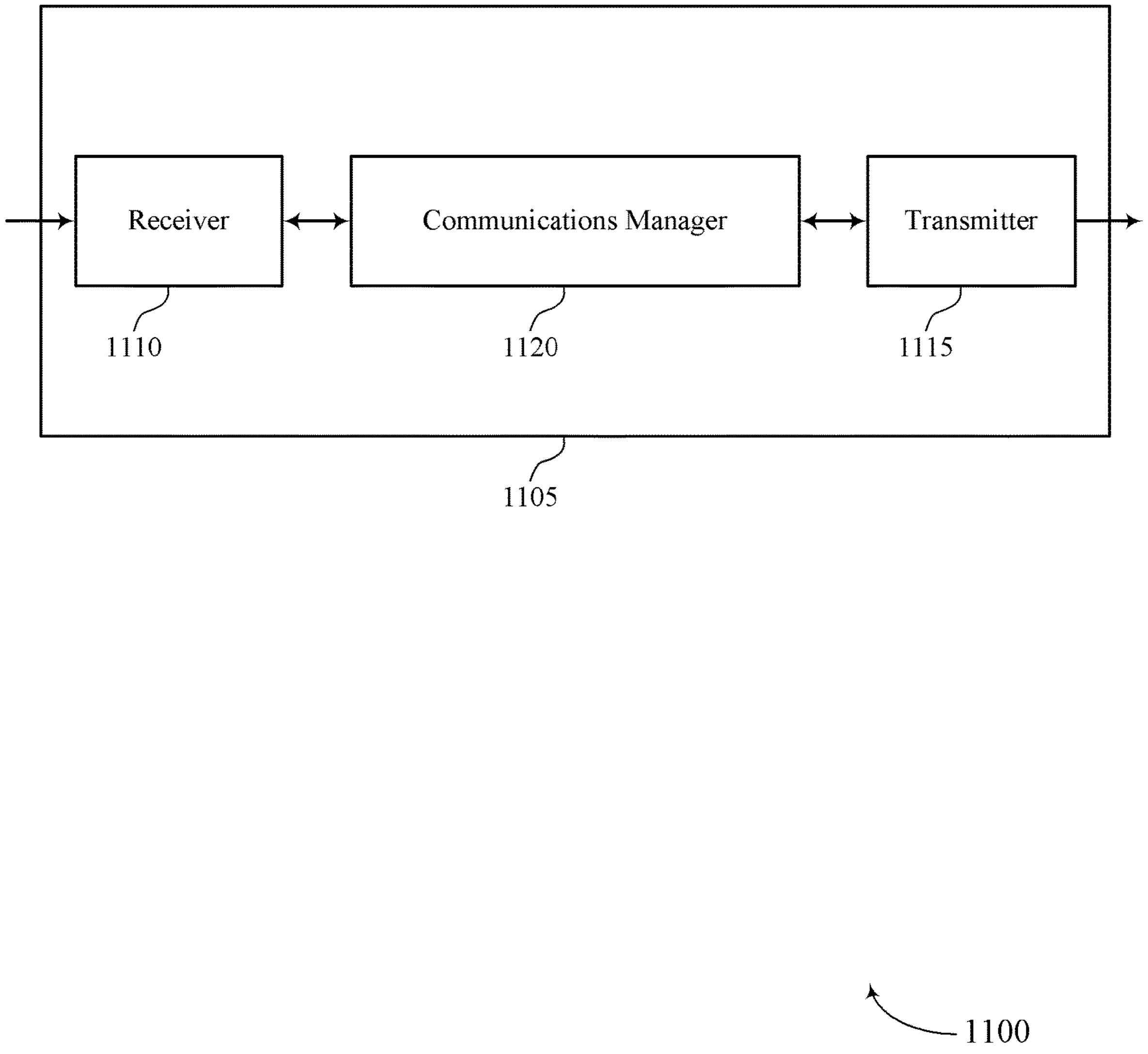
FIGS. 11 and 12 show block diagrams of devices that support techniques for inter-UE multiplexing in half-duplex FDD operation in accordance with aspects of the present disclosure.

FIG. 11 shows a block diagram 1100 of a device 1105 that supports techniques for inter-UE multiplexing in half-duplex FDD operation in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for inter-UE multiplexing in half-duplex FDD operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for inter-UE multiplexing in half-duplex FDD operation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for inter-UE multiplexing in half-duplex FDD operation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

In some examples, the communications manager 1120 or its sub-components, may be implemented in hardware, software (e.g., executed by a processor), or any combination thereof. Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first UE in accordance with examples as disclosed herein. For example, the communications manager 1120 may be configured as or otherwise support a means for receiving, from a base station, a resource reservation indicating a set of reserved resources that are reserved for communications between the base station and one or more other UEs, the first UE operating in a half-duplex FDD mode. The communications manager 1120 may be configured as or otherwise support a means for receiving, from the base station, DCI scheduling a data transmission with the base station over a set of resources that at least partially overlaps in time with the set of reserved resources. The communications manager 1120 may be configured as or otherwise support a means for identifying that a priority level of the data transmission is less than a threshold priority level. The communications manager 1120 may be configured as or otherwise support a means for communicating with the base station via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1120 may support wireless communication at a UE in accordance with examples as disclosed herein. For example, the communications manager 1120 may be configured as or otherwise support a means for receiving, from a base station, control signaling indicating a set of reserved resources that are reserved for communication, by the base station, of a downlink control transmission that includes either a DLPI or an ULCI, the UE operating in a half-duplex FDD mode. The communications manager 1120 may be configured as or otherwise support a means for receiving, from the base station, DCI scheduling an uplink data transmission over a set of resources that at least partially overlaps in time with the set of reserved resources. The communications manager 1120 may be configured as or otherwise support a means for transmitting at least a portion of the uplink data transmission over the set of resources. The communications manager 1120 may be configured as or otherwise support a means for switching from transmission of at least the portion of the uplink data transmission to monitoring for the downlink control transmission over the set of reserved resources based on receiving the control signaling indicating the set of reserved resources.

Additionally or alternatively, the communications manager 1120 may support wireless communication at a UE in accordance with examples as disclosed herein. For example, the communications manager 1120 may be configured as or otherwise support a means for receiving, from a base station, a first downlink data transmission over a set of resources in a first time period, the UE operating in a half-duplex FDD mode. The communications manager 1120 may be configured as or otherwise support a means for receiving, from the base station, a second downlink data transmission in a second time period that is after the first time period, the second downlink data transmission including a DLPI referring to a subset of resources of the set of resources. The communications manager 1120 may be configured as or otherwise support a means for emptying a HARQ buffer associated with the subset of resources based on the DLPI.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
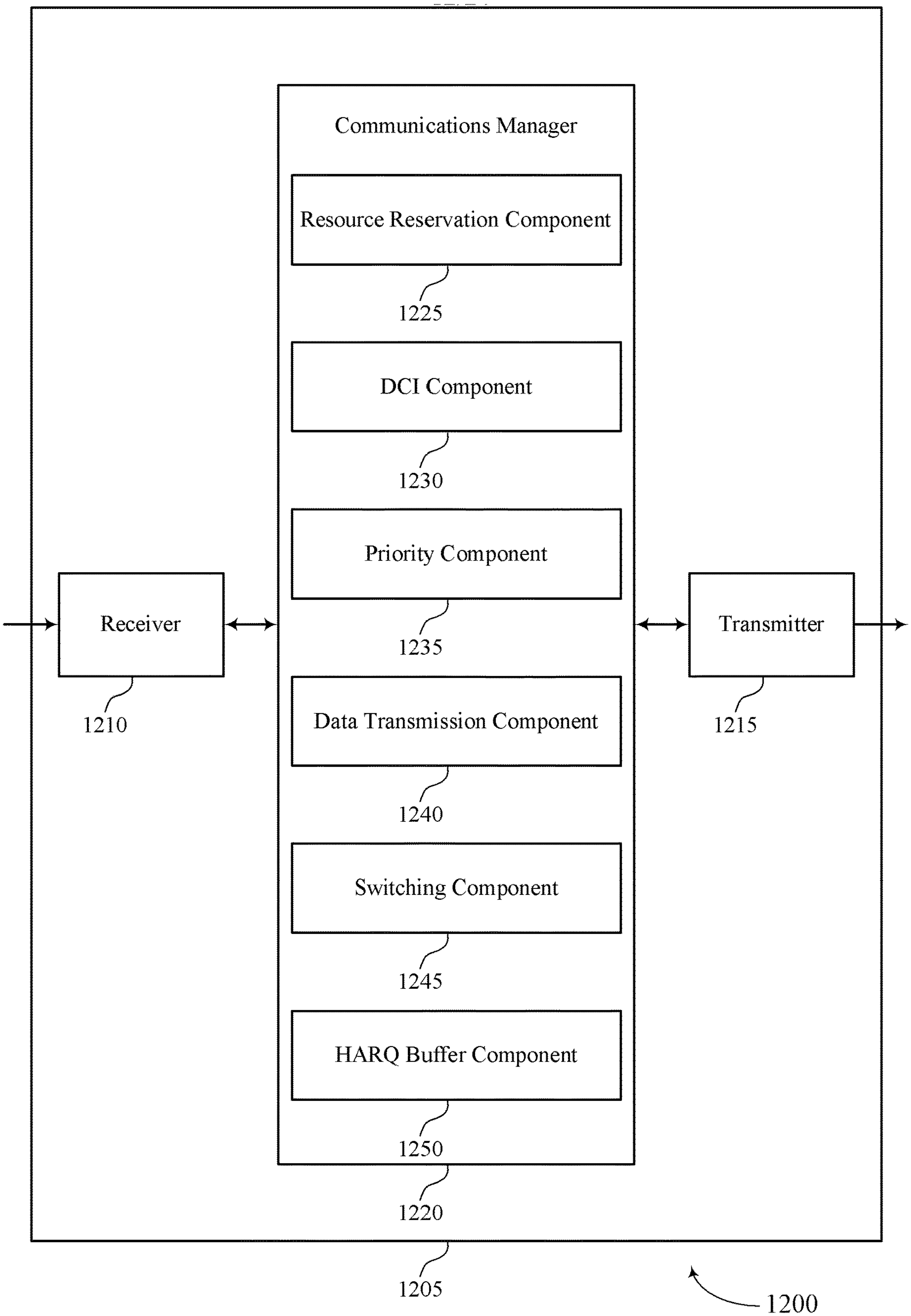

FIG. 12 shows a block diagram 1200 of a device 1205 that supports techniques for inter-UE multiplexing in half-duplex FDD operation in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for inter-UE multiplexing in half-duplex FDD operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for inter-UE multiplexing in half-duplex FDD operation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for inter-UE multiplexing in half-duplex FDD operation as described herein. For example, the communications manager 1220 may include a resource reservation component 1225, a DCI component 1230, a priority component 1235, a data transmission component 1240, a switching component 1245, an HARQ buffer component 1250, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first UE in accordance with examples as disclosed herein. The resource reservation component 1225 may be configured as or otherwise support a means for receiving, from a base station, a resource reservation indicating a set of reserved resources that are reserved for communications between the base station and one or more other UEs, the first UE operating in a half-duplex FDD mode. The DCI component 1230 may be configured as or otherwise support a means for receiving, from the base station, DCI scheduling a data transmission with the base station over a set of resources that at least partially overlaps in time with the set of reserved resources. The priority component 1235 may be configured as or otherwise support a means for identifying that a priority level of the data transmission is less than a threshold priority level. The data transmission component 1240 may be configured as or otherwise support a means for communicating with the base station via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1220 may support wireless communication at a UE in accordance with examples as disclosed herein. The resource reservation component 1225 may be configured as or otherwise support a means for receiving, from a base station, control signaling indicating a set of reserved resources that are reserved for communication, by the base station, of a downlink control transmission that includes either a DLPI or an ULCI, the UE operating in a half-duplex FDD mode. The DCI component 1230 may be configured as or otherwise support a means for receiving, from the base station, DCI scheduling an uplink data transmission over a set of resources that at least partially overlaps in time with the set of reserved resources. The data transmission component 1240 may be configured as or otherwise support a means for transmitting at least a portion of the uplink data transmission over the set of resources. The switching component 1245 may be configured as or otherwise support a means for switching from transmission of at least the portion of the uplink data transmission to monitoring for the downlink control transmission over the set of reserved resources based on receiving the control signaling indicating the set of reserved resources.

Additionally or alternatively, the communications manager 1220 may support wireless communication at a UE in accordance with examples as disclosed herein. The data transmission component 1240 may be configured as or otherwise support a means for receiving, from a base station, a first downlink data transmission over a set of resources in a first time period, the UE operating in a half-duplex FDD mode. The data transmission component 1240 may be configured as or otherwise support a means for receiving, from the base station, a second downlink data transmission in a second time period that is after the first time period, the second downlink data transmission including a DLPI referring to a subset of resources of the set of resources. The HARQ buffer component 1250 may be configured as or otherwise support a means for emptying a HARQ buffer associated with the subset of resources based on the DLPI.

Figure 13:
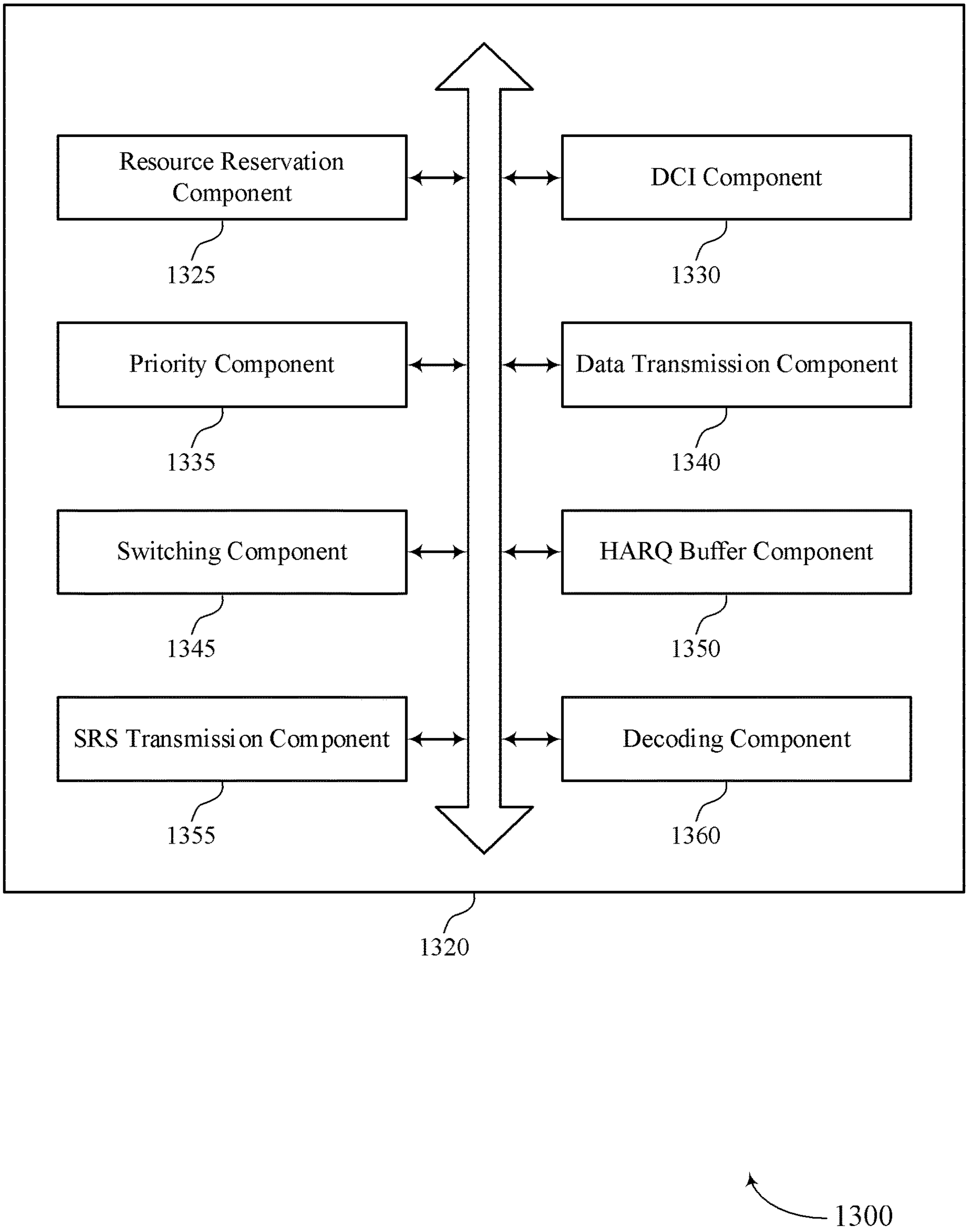
FIG. 13 shows a block diagram of a communications manager that supports techniques for inter-UE multiplexing in half-duplex FDD operation in accordance with aspects of the present disclosure.

FIG. 13 shows a block diagram 1300 of a communications manager 1320 that supports techniques for inter-UE multiplexing in half-duplex FDD operation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for inter-UE multiplexing in half-duplex FDD operation as described herein. For example, the communications manager 1320 may include a resource reservation component 1325, a DCI component 1330, a priority component 1335, a data transmission component 1340, a switching component 1345, an HARQ buffer component 1350, an SRS transmission component 1355, a decoding component 1360, or any combination thereof. Each of these components may communicate, directly or indirectly, with one another (e.g., via one or more buses).

The communications manager 1320 may support wireless communication at a first UE in accordance with examples as disclosed herein. The resource reservation component 1325 may be configured as or otherwise support a means for receiving, from a base station, a resource reservation indicating a set of reserved resources that are reserved for communications between the base station and one or more other UEs, the first UE operating in a half-duplex FDD mode. The DCI component 1330 may be configured as or otherwise support a means for receiving, from the base station, DCI scheduling a data transmission with the base station over a set of resources that at least partially overlaps in time with the set of reserved resources. The priority component 1335 may be configured as or otherwise support a means for identifying that a priority level of the data transmission is less than a threshold priority level. The data transmission component 1340 may be configured as or otherwise support a means for communicating with the base station via the data transmission over a subset of resources of the set of resources based on the resource reservation and identifying that the priority level of the data transmission is less than the threshold priority level, the subset of resources being resources that are rate-matched around the set of reserved resources.

In some examples, to support receiving the resource reservation indicating the set of reserved resources, the resource reservation component 1325 may be configured as or otherwise support a means for receiving an indication of the set of reserved resources via RRC signaling. In some examples, to support receiving the DCI scheduling the data transmission, the resource reservation component 1325 may be configured as or otherwise support a means for receiving an indication that enables the set of reserved resources for the data transmission, where communicating with the base station via the data transmission over the subset of resources is based on receiving the indication that enables the set of reserved resources for the data transmission.

In some examples, the set of reserved resources are periodically configured. In some examples, to support receiving the resource reservation indicating the set of reserved resources, the resource reservation component 1325 may be configured as or otherwise support a means for receiving a bitmap including a quantity of bits equal to a product of a first quantity of units in a time domain and a second quantity of units in a frequency domain, the bitmap indicating a time and frequency resource allocation of the set of reserved resources.

In some examples, the SRS transmission component 1355 may be configured as or otherwise support a means for receiving, from the base station, control signaling scheduling a transmission of an SRS over a second set of resources that at least partially overlaps in time with the set of reserved resources. In some examples, the SRS transmission component 1355 may be configured as or otherwise support a means for dropping the transmission of the SRS based on the second set of resources at least partially overlapping in time with the set of reserved resources. In some examples, the data transmission includes an uplink data transmission or a downlink data transmission.

Additionally or alternatively, the communications manager 1320 may support wireless communication at a UE in accordance with examples as disclosed herein. In some examples, the resource reservation component 1325 may be configured as or otherwise support a means for receiving, from a base station, control signaling indicating a set of reserved resources that are reserved for communication, by the base station, of a downlink control transmission that includes either a DLPI or an ULCI, the UE operating in a half-duplex FDD mode. In some examples, the DCI component 1330 may be configured as or otherwise support a means for receiving, from the base station, DCI scheduling an uplink data transmission over a set of resources that at least partially overlaps in time with the set of reserved resources. In some examples, the data transmission component 1340 may be configured as or otherwise support a means for transmitting at least a portion of the uplink data transmission over the set of resources. The switching component 1345 may be configured as or otherwise support a means for switching from transmission of at least the portion of the uplink data transmission to monitoring for the downlink control transmission over the set of reserved resources based on receiving the control signaling indicating the set of reserved resources.

In some examples, to support receiving the control signaling indicating the set of reserved resources, the resource reservation component 1325 may be configured as or otherwise support a means for receiving an indication of the set of reserved resources via RRC signaling, where the set of reserved resources are semi-persistently configured.

In some examples, the SRS transmission component 1355 may be configured as or otherwise support a means for receiving, from the base station, second control signaling scheduling an SRS over a second set of resources that at least partially overlaps in time with the set of reserved resources. In some examples, the SRS transmission component 1355 may be configured as or otherwise support a means for refraining from transmitting the SRS in a time domain overlap between the second set of resources and the set of reserved resources.

In some examples, the priority component 1335 may be configured as or otherwise support a means for identifying that a priority level of the uplink data transmission is less than a threshold priority level, where switching from the transmission of at least the portion of the uplink data transmission to the monitoring for the downlink control transmission over the set of reserved resources is based on identifying that the priority level of the uplink data transmission is less than the threshold priority level.

In some examples, the DCI component 1330 may be configured as or otherwise support a means for receiving the downlink control transmission that includes either the DLPI or the ULCI based on switching from the transmission of at least the portion of the uplink data transmission to the monitoring for the downlink control transmission over the set of reserved resources. In some examples, the switching component 1345 may be configured as or otherwise support a means for switching from the monitoring for the downlink control transmission over the set of reserved resources to transmitting at least a second portion of the uplink data transmission based on receiving the downlink control transmission.

Additionally or alternatively, the communications manager 1320 may support wireless communication at a UE in accordance with examples as disclosed herein. In some examples, the data transmission component 1340 may be configured as or otherwise support a means for receiving, from a base station, a first downlink data transmission over a set of resources in a first time period, the UE operating in a half-duplex FDD mode. In some examples, the data transmission component 1340 may be configured as or otherwise support a means for receiving, from the base station, a second downlink data transmission in a second time period that is after the first time period, the second downlink data transmission including a DLPI referring to a subset of resources of the set of resources. The HARQ buffer component 1350 may be configured as or otherwise support a means for emptying a HARQ buffer associated with the subset of resources based on the DLPI.

In some examples, the DLPI is multiplexed with data of the second downlink data transmission, and the decoding component 1360 may be configured as or otherwise support a means for decoding the DLPI separately from the data of the second downlink data transmission. In some examples, the DLPI includes QPSK.

In some examples, the data transmission component 1340 may be configured as or otherwise support a means for transmitting, to the base station, an uplink transmission in a third time period that at least partially overlaps in time with a monitoring occasion for DCI including an instance of the DLPI, where receiving the second downlink data transmission including the DLPI is based on transmitting the uplink transmission in the third time period that at least partially overlaps in time with the monitoring occasion for the DCI including the instance of the DLPI.

In some examples, the DCI component 1330 may be configured as or otherwise support a means for receiving, from the base station, DCI scheduling the second downlink data transmission, where the DCI includes an indication of a presence of the DLPI in the second downlink data transmission, where receiving the second downlink data transmission including the DLPI is based on receiving the indication of the presence of the DLPI in the second downlink data transmission.

Figure 14:
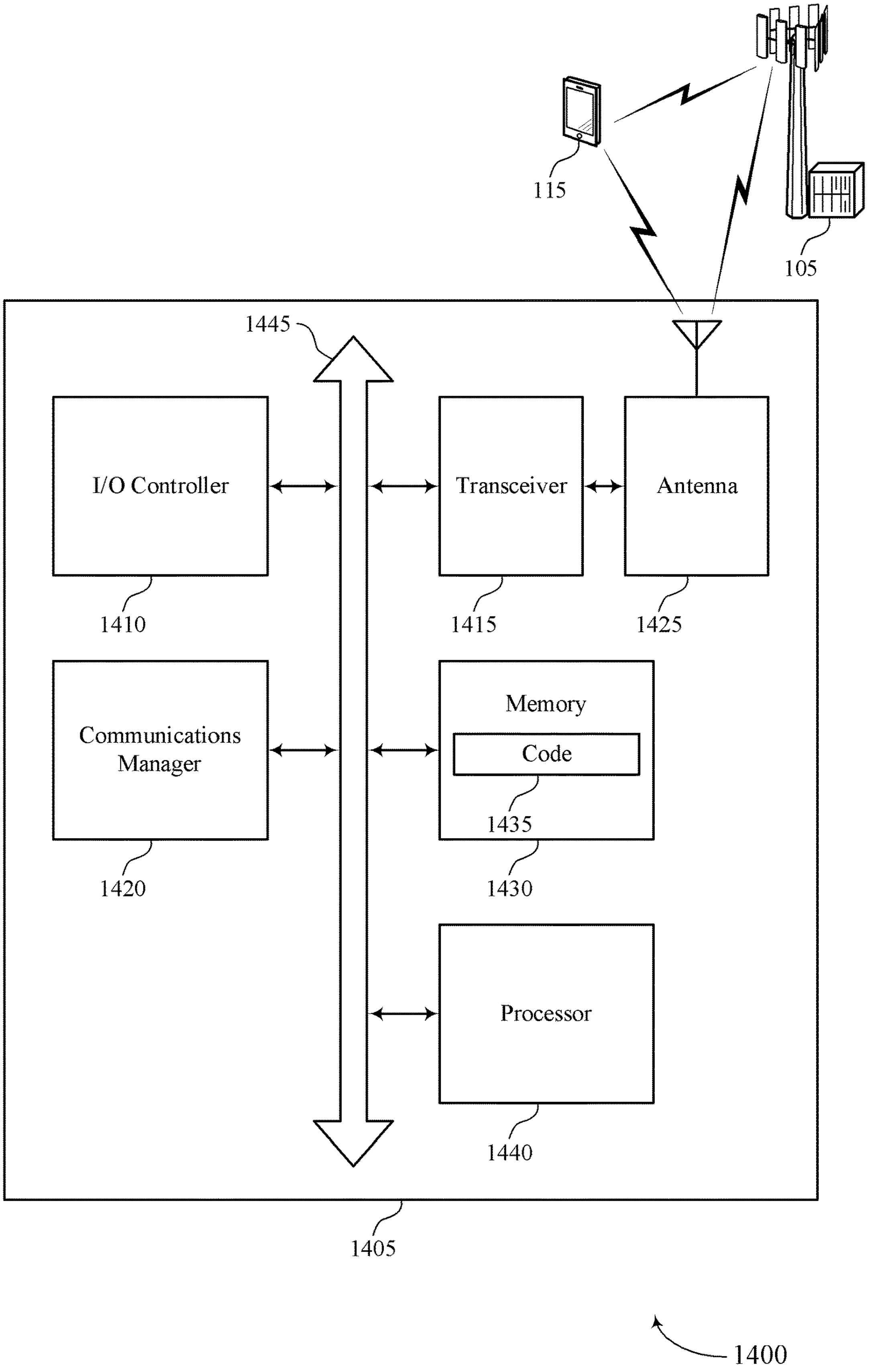
FIG. 14 shows a diagram of a system including a device that supports techniques for inter-UE multiplexing in half-duplex FDD operation in accordance with aspects of the present disclosure.

FIG. 14 shows a diagram of a system 1400 including a device 1405 that supports techniques for inter-UE multiplexing in half-duplex FDD operation in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for inter-UE multiplexing in half-duplex FDD operation). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first UE in accordance with examples as disclosed herein. For example, the communications manager 1420 may be configured as or otherwise support a means for receiving, from a base station, a resource reservation indicating a set of reserved resources that are reserved for communications between the base station and one or more other UEs, the first UE operating in a half-duplex FDD mode. The communications manager 1420 may be configured as or otherwise support a means for receiving, from the base station, DCI scheduling a data transmission with the base station over a set of resources that at least partially overlaps in time with the set of reserved resources. The communications manager 1420 may be configured as or otherwise support a means for identifying that a priority level of the data transmission is less than a threshold priority level. The communications manager 1420 may be configured as or otherwise support a means for communicating with the base station via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1420 may support wireless communication at a UE in accordance with examples as disclosed herein. For example, the communications manager 1420 may be configured as or otherwise support a means for receiving, from a base station, control signaling indicating a set of reserved resources that are reserved for communication, by the base station, of a downlink control transmission that includes either a DLPI or an ULCI, the UE operating in a half-duplex FDD mode. The communications manager 1420 may be configured as or otherwise support a means for receiving, from the base station, DCI scheduling an uplink data transmission over a set of resources that at least partially overlaps in time with the set of reserved resources. The communications manager 1420 may be configured as or otherwise support a means for transmitting at least a portion of the uplink data transmission over the set of resources. The communications manager 1420 may be configured as or otherwise support a means for switching from transmission of at least the portion of the uplink data transmission to monitoring for the downlink control transmission over the set of reserved resources based on receiving the control signaling indicating the set of reserved resources.

Additionally or alternatively, the communications manager 1420 may support wireless communication at a UE in accordance with examples as disclosed herein. For example, the communications manager 1420 may be configured as or otherwise support a means for receiving, from a base station, a first downlink data transmission over a set of resources in a first time period, the UE operating in a half-duplex FDD mode. The communications manager 1420 may be configured as or otherwise support a means for receiving, from the base station, a second downlink data transmission in a second time period that is after the first time period, the second downlink data transmission including a DLPI referring to a subset of resources of the set of resources. The communications manager 1420 may be configured as or otherwise support a means for emptying a HARQ buffer associated with the subset of resources based on the DLPI.

By including or configuring the communications manager 1420 in accordance with examples as described herein, the device 1405 may support techniques for improved communication reliability, reduced latency, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for inter-UE multiplexing in half-duplex FDD operation as described herein, or the processor 1440 and the memory 1430 may be otherwise configured to perform or support such operations.

Figure 15:
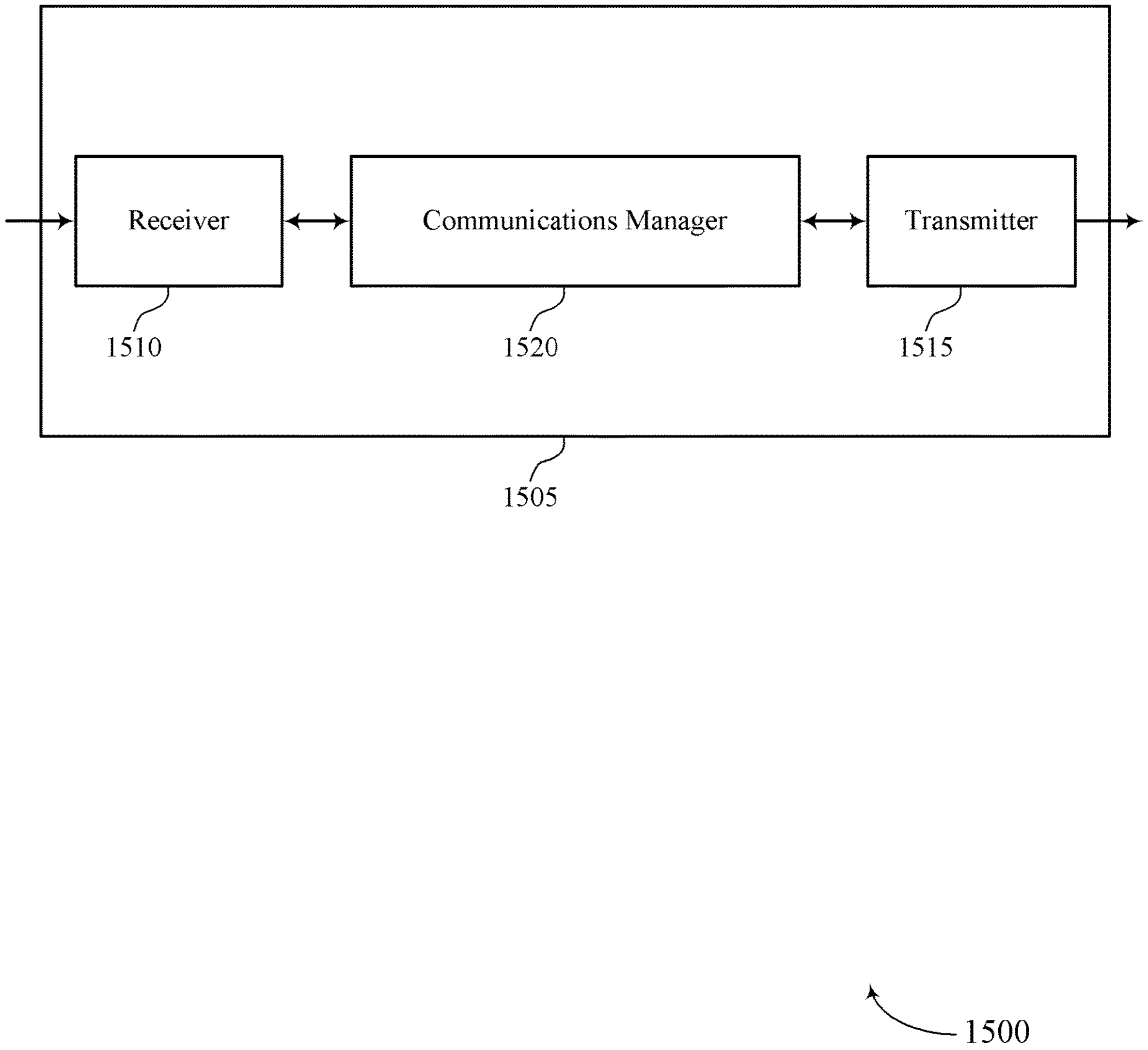
FIGS. 15 and 16 show block diagrams of devices that support techniques for inter-UE multiplexing in half-duplex FDD operation in accordance with aspects of the present disclosure.

FIG. 15 shows a block diagram 1500 of a device 1505 that supports techniques for inter-UE multiplexing in half-duplex FDD operation in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for inter-UE multiplexing in half-duplex FDD operation). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for inter-UE multiplexing in half-duplex FDD operation). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for inter-UE multiplexing in half-duplex FDD operation as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

In some examples, the communications manager 1520 or its sub-components, may be implemented in hardware, software (e.g., executed by a processor), or any combination thereof. Additionally or alternatively, in some examples, the communications manager 1520, the receiver 1510, the transmitter 1515, or various combinations or components thereof may be implemented in code (e.g., as communications management software) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a first UE, a resource reservation indicating a set of reserved resources that are reserved for communications between the base station and one or more other UEs. The communications manager 1520 may be configured as or otherwise support a means for transmitting, to the first UE, DCI scheduling a data transmission with the base station over a set of resources that at least partially overlaps in time with the set of reserved resources. The communications manager 1520 may be configured as or otherwise support a means for identifying that a priority level of the data transmission is less than a threshold priority level. The communications manager 1520 may be configured as or otherwise support a means for communicating with the first UE via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1520 may support wireless communication at a base station in accordance with examples as disclosed herein. For example, the communications manager 1520 may be configured as or otherwise support a means for transmitting, to a UE, control signaling indicating a set of reserved resources that are reserved for communication, by the base station, of a downlink control transmission that includes either a DLPI or an ULCI. The communications manager 1520 may be configured as or otherwise support a means for transmitting, to the UE, DCI scheduling an uplink data transmission over a set of resources that at least partially overlaps in time with the set of reserved resources. The communications manager 1520 may be configured as or otherwise support a means for receiving, from the UE, at least a portion of the uplink data transmission over the set of resources. The communications manager 1520 may be configured as or otherwise support a means for switching from reception of at least the portion of the uplink data transmission to transmitting the downlink control transmission over the set of reserved resources based on transmitting the control signaling indicating the set of reserved resources.

Additionally or alternatively, the communications manager 1520 may support wireless communication at a base station in accordance with examples as disclosed herein. For example, the communications manager 1520 may be configured as or otherwise support a means for transmitting, to a UE, a first downlink data transmission over a set of resources in a first time period. The communications manager 1520 may be configured as or otherwise support a means for transmitting, to the UE, a second downlink data transmission in a second time period that is after the first time period, the second downlink data transmission including a DLPI referring to a subset of resources of the set of resources.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for more efficient utilization of communication resources.

Figure 16:
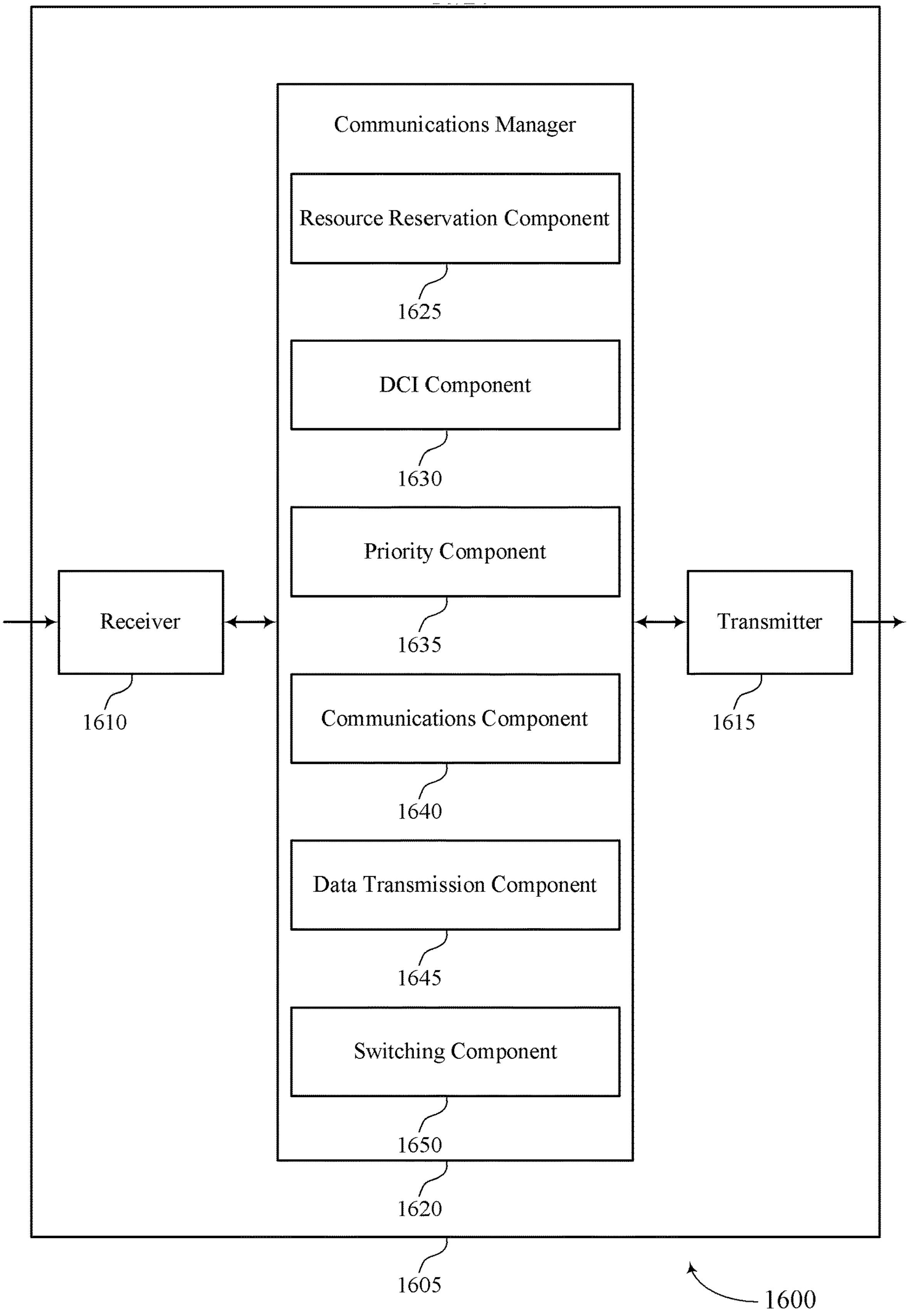

FIG. 16 shows a block diagram 1600 of a device 1605 that supports techniques for inter-UE multiplexing in half-duplex FDD operation in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for inter-UE multiplexing in half-duplex FDD operation). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for inter-UE multiplexing in half-duplex FDD operation). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for inter-UE multiplexing in half-duplex FDD operation as described herein. For example, the communications manager 1620 may include a resource reservation component 1625, a DCI component 1630, a priority component 1635, a communications component 1640, a data transmission component 1645, a switching component 1650, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The resource reservation component 1625 may be configured as or otherwise support a means for transmitting, to a first UE, a resource reservation indicating a set of reserved resources that are reserved for communications between the base station and one or more other UEs. The DCI component 1630 may be configured as or otherwise support a means for transmitting, to the first UE, DCI scheduling a data transmission with the base station over a set of resources that at least partially overlaps in time with the set of reserved resources. The priority component 1635 may be configured as or otherwise support a means for identifying that a priority level of the data transmission is less than a threshold priority level. The communications component 1640 may be configured as or otherwise support a means for communicating with the first UE via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1620 may support wireless communication at a base station in accordance with examples as disclosed herein. The resource reservation component 1625 may be configured as or otherwise support a means for transmitting, to a UE, control signaling indicating a set of reserved resources that are reserved for communication, by the base station, of a downlink control transmission that includes either a DLPI or an ULCI. The DCI component 1630 may be configured as or otherwise support a means for transmitting, to the UE, DCI scheduling an uplink data transmission over a set of resources that at least partially overlaps in time with the set of reserved resources. The data transmission component 1645 may be configured as or otherwise support a means for receiving, from the UE, at least a portion of the uplink data transmission over the set of resources. The switching component 1650 may be configured as or otherwise support a means for switching from reception of at least the portion of the uplink data transmission to transmitting the downlink control transmission over the set of reserved resources based on transmitting the control signaling indicating the set of reserved resources.

Additionally or alternatively, the communications manager 1620 may support wireless communication at a base station in accordance with examples as disclosed herein. The data transmission component 1645 may be configured as or otherwise support a means for transmitting, to a UE, a first downlink data transmission over a set of resources in a first time period. The data transmission component 1645 may be configured as or otherwise support a means for transmitting, to the UE, a second downlink data transmission in a second time period that is after the first time period, the second downlink data transmission including a DLPI referring to a subset of resources of the set of resources.

Figure 17:
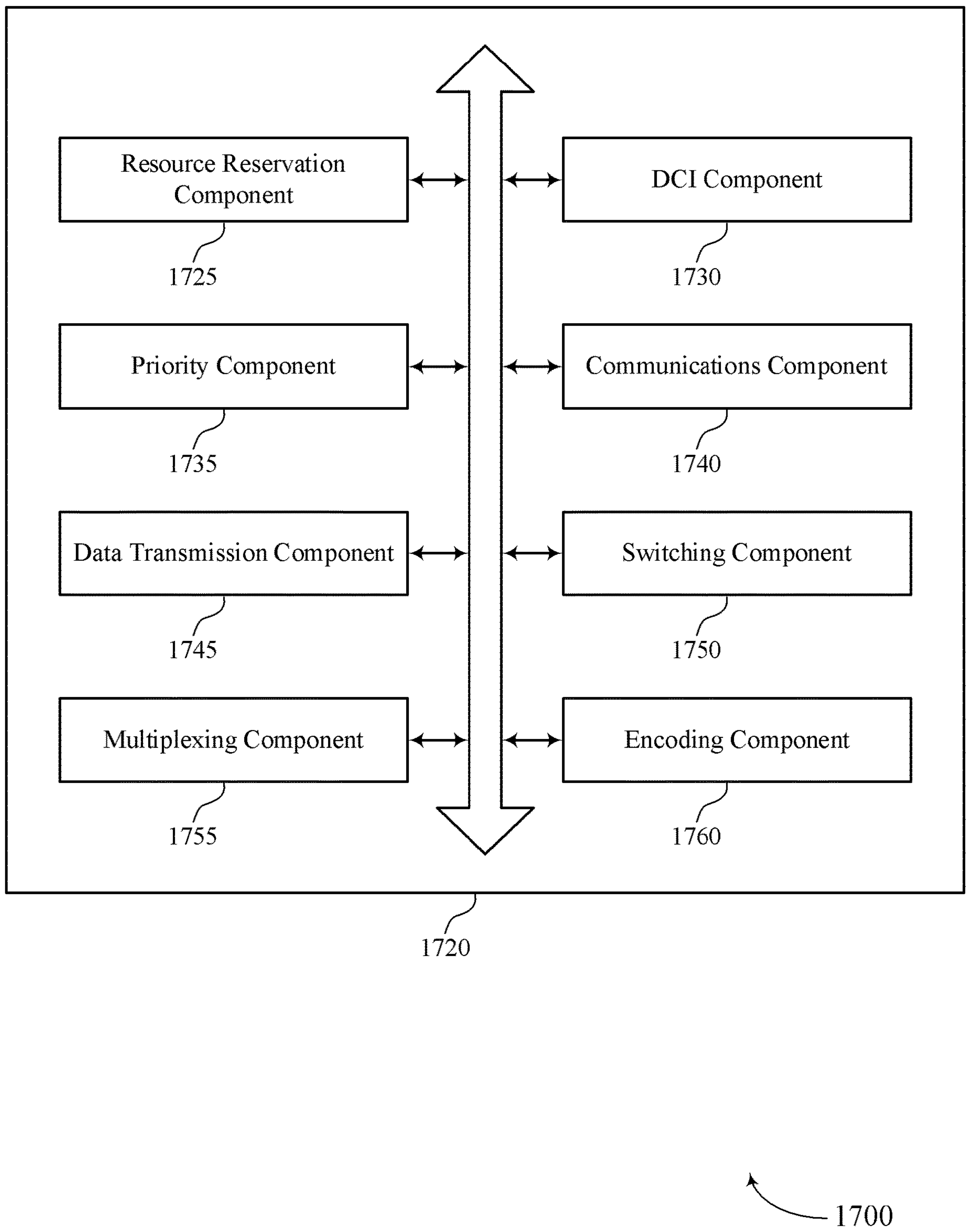
FIG. 17 shows a block diagram of a communications manager that supports techniques for inter-UE multiplexing in half-duplex FDD operation in accordance with aspects of the present disclosure.

FIG. 17 shows a block diagram 1700 of a communications manager 1720 that supports techniques for inter-UE multiplexing in half-duplex FDD operation in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for inter-UE multiplexing in half-duplex FDD operation as described herein. For example, the communications manager 1720 may include a resource reservation component 1725, a DCI component 1730, a priority component 1735, a communications component 1740, a data transmission component 1745, a switching component 1750, a multiplexing component 1755, an encoding component 1760, or any combination thereof. Each of these components may communicate, directly or indirectly, with one another (e.g., via one or more buses).

The communications manager 1720 may support wireless communication at a base station in accordance with examples as disclosed herein. The resource reservation component 1725 may be configured as or otherwise support a means for transmitting, to a first UE, a resource reservation indicating a set of reserved resources that are reserved for communications between the base station and one or more other UEs. The DCI component 1730 may be configured as or otherwise support a means for transmitting, to the first UE, DCI scheduling a data transmission with the base station over a set of resources that at least partially overlaps in time with the set of reserved resources. The priority component 1735 may be configured as or otherwise support a means for identifying that a priority level of the data transmission is less than a threshold priority level. The communications component 1740 may be configured as or otherwise support a means for communicating with the first UE via the data transmission over a subset of resources of the set of resources based on the resource reservation and identifying that the priority level of the data transmission is less than the threshold priority level, the subset of resources being resources that are rate-matched around the set of reserved resources.

In some examples, to support transmitting the resource reservation indicating the set of reserved resources, the resource reservation component 1725 may be configured as or otherwise support a means for transmitting an indication of the set of reserved resources via RRC signaling. In some examples, to support transmitting the DCI scheduling the data transmission, the resource reservation component 1725 may be configured as or otherwise support a means for transmitting an indication that enables the set of reserved resources for the data transmission, where communicating with the first UE via the data transmission over the subset of resources is based on transmitting the indication that enables the set of reserved resources for the data transmission.

In some examples, the set of reserved resources are periodically configured. In some examples, to support transmitting the resource reservation indicating the set of reserved resources, the resource reservation component 1725 may be configured as or otherwise support a means for transmitting a bitmap including a quantity of bits equal to a product of a first quantity of units in a time domain and a second quantity of units in a frequency domain, the bitmap indicating a time and frequency resource allocation of the set of reserved resources.

In some examples, the DCI component 1730 may be configured as or otherwise support a means for transmitting, to a second UE of the one or more other UEs, second DCI scheduling an uplink data transmission with the second UE over the set of reserved resources. In some examples, the data transmission component 1745 may be configured as or otherwise support a means for receiving, from the second UE, the uplink data transmission over the set of reserved resources based on transmitting the second DCI scheduling the uplink data transmission and the resource reservation. In some examples, the data transmission includes an uplink data transmission or a downlink transmission.

Additionally or alternatively, the communications manager 1720 may support wireless communication at a base station in accordance with examples as disclosed herein. In some examples, the resource reservation component 1725 may be configured as or otherwise support a means for transmitting, to a UE, control signaling indicating a set of reserved resources that are reserved for communication, by the base station, of a downlink control transmission that includes either a DLPI or an ULCI. In some examples, the DCI component 1730 may be configured as or otherwise support a means for transmitting, to the UE, DCI scheduling an uplink data transmission over a set of resources that at least partially overlaps in time with the set of reserved resources. The data transmission component 1745 may be configured as or otherwise support a means for receiving, from the UE, at least a portion of the uplink data transmission over the set of resources. The switching component 1750 may be configured as or otherwise support a means for switching from reception of at least the portion of the uplink data transmission to transmitting the downlink control transmission over the set of reserved resources based on transmitting the control signaling indicating the set of reserved resources.

In some examples, to support transmitting the control signaling indicating the set of reserved resources, the resource reservation component 1725 may be configured as or otherwise support a means for transmitting an indication of the set of reserved resources via RRC signaling, where the set of reserved resources are semi-persistently configured.

In some examples, the priority component 1735 may be configured as or otherwise support a means for identifying that a priority level of the uplink data transmission is less than a threshold priority level, where switching from the from the reception of the uplink data transmission to the transmitting of the downlink control transmission over the set of reserved resources is based on identifying that the priority level of the uplink data transmission is less than the threshold priority level.

In some examples, the DCI component 1730 may be configured as or otherwise support a means for transmitting the downlink control transmission that includes either the DLPI or the ULCI based on switching from the reception of the uplink data transmission to the transmitting of the downlink control transmission over the set of reserved resources. In some examples, the switching component 1750 may be configured as or otherwise support a means for switching from the transmitting of the downlink control transmission over the set of reserved resources to receiving, from the UE, at least a second portion of the uplink data transmission based on transmitting the downlink control transmission.

Additionally or alternatively, the communications manager 1720 may support wireless communication at a base station in accordance with examples as disclosed herein. In some examples, the data transmission component 1745 may be configured as or otherwise support a means for transmitting, to a UE, a first downlink data transmission over a set of resources in a first time period. In some examples, the data transmission component 1745 may be configured as or otherwise support a means for transmitting, to the UE, a second downlink data transmission in a second time period that is after the first time period, the second downlink data transmission including a DLPI referring to a subset of resources of the set of resources.

In some examples, the multiplexing component 1755 may be configured as or otherwise support a means for multiplexing the DLPI with data of the second downlink data transmission. In some examples, the encoding component 1760 may be configured as or otherwise support a means for encoding the DLPI separately from the data of the second downlink data transmission.

In some examples, to support multiplexing the DLPI, the multiplexing component 1755 may be configured as or otherwise support a means for multiplexing the DLPI based on QPSK.

In some examples, the data transmission component 1745 may be configured as or otherwise support a means for receiving, from the UE, an uplink data transmission over a second set of resources in a third time period that at least partially overlaps in time with a monitoring occasion for DCI including an instance of the DLPI, where transmitting the second downlink data transmission including the DLPI is based on receiving the uplink data transmission in the third time period that at least partially overlaps in time with the monitoring occasion for the DCI including the instance of the DLPI.

In some examples, the DCI component 1730 may be configured as or otherwise support a means for transmitting, to the UE, the DCI including the instance of the DLPI over a third set of resources that at least partially overlaps with the second set of resources in the third time period, where the DLPI in the second downlink data transmission includes a retransmission of the DLPI.

In some examples, the DCI component 1730 may be configured as or otherwise support a means for transmitting, to the UE, DCI scheduling the second downlink data transmission, where the DCI includes an indication of a presence of the DLPI in the second downlink data transmission, where transmitting the second downlink data transmission including the DLPI is based on transmitting the indication of the presence of the DLPI in the second downlink data transmission.

Figure 18:
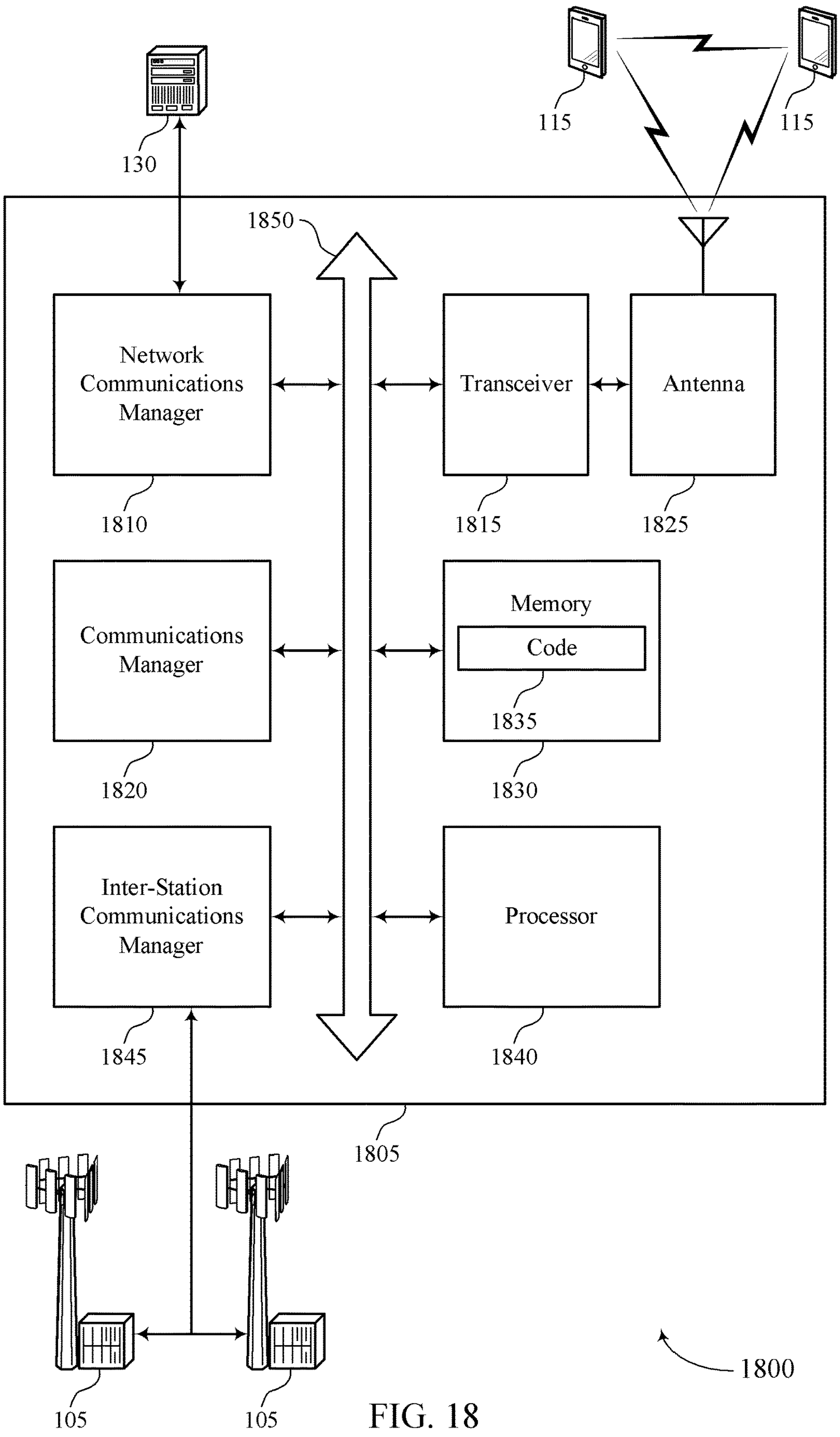
FIG. 18 shows a diagram of a system including a device that supports techniques for inter-UE multiplexing in half-duplex FDD operation in accordance with aspects of the present disclosure.

FIG. 18 shows a diagram of a system 1800 including a device 1805 that supports techniques for inter-UE multiplexing in half-duplex FDD operation in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for inter-UE multiplexing in half-duplex FDD operation). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a first UE, a resource reservation indicating a set of reserved resources that are reserved for communications between the base station and one or more other UEs. The communications manager 1820 may be configured as or otherwise support a means for transmitting, to the first UE, DCI scheduling a data transmission with the base station over a set of resources that at least partially overlaps in time with the set of reserved resources. The communications manager 1820 may be configured as or otherwise support a means for identifying that a priority level of the data transmission is less than a threshold priority level. The communications manager 1820 may be configured as or otherwise support a means for communicating with the first UE via the data transmission over a subset of resources of the set of resources based on the resource reservation and identifying that the priority level of the data transmission is less than the threshold priority level, the subset of resources being resources that are rate-matched around the set of reserved resources.

Additionally or alternatively, the communications manager 1820 may support wireless communication at a base station in accordance with examples as disclosed herein. For example, the communications manager 1820 may be configured as or otherwise support a means for transmitting, to a UE, control signaling indicating a set of reserved resources that are reserved for communication, by the base station, of a downlink control transmission that includes either a DLPI or an ULCI. The communications manager 1820 may be configured as or otherwise support a means for transmitting, to the UE, DCI scheduling an uplink data transmission over a set of resources that at least partially overlaps in time with the set of reserved resources. The communications manager 1820 may be configured as or otherwise support a means for receiving, from the UE, at least a portion of the uplink data transmission over the set of resources. The communications manager 1820 may be configured as or otherwise support a means for switching from reception of at least the portion of the uplink data transmission to transmitting the downlink control transmission over the set of reserved resources based on transmitting the control signaling indicating the set of reserved resources.

Additionally or alternatively, the communications manager 1820 may support wireless communication at a base station in accordance with examples as disclosed herein. For example, the communications manager 1820 may be configured as or otherwise support a means for transmitting, to a UE, a first downlink data transmission over a set of resources in a first time period. The communications manager 1820 may be configured as or otherwise support a means for transmitting, to the UE, a second downlink data transmission in a second time period that is after the first time period, the second downlink data transmission including a DLPI referring to a subset of resources of the set of resources.

By including or configuring the communications manager 1820 in accordance with examples as described herein, the device 1805 may support techniques for improved communication reliability, reduced latency, more efficient utilization of communication resources, improved coordination between devices, longer battery life, and improved utilization of processing capability.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for inter-UE multiplexing in half-duplex FDD operation as described herein, or the processor 1840 and the memory 1830 may be otherwise configured to perform or support such operations.

Figure 19:
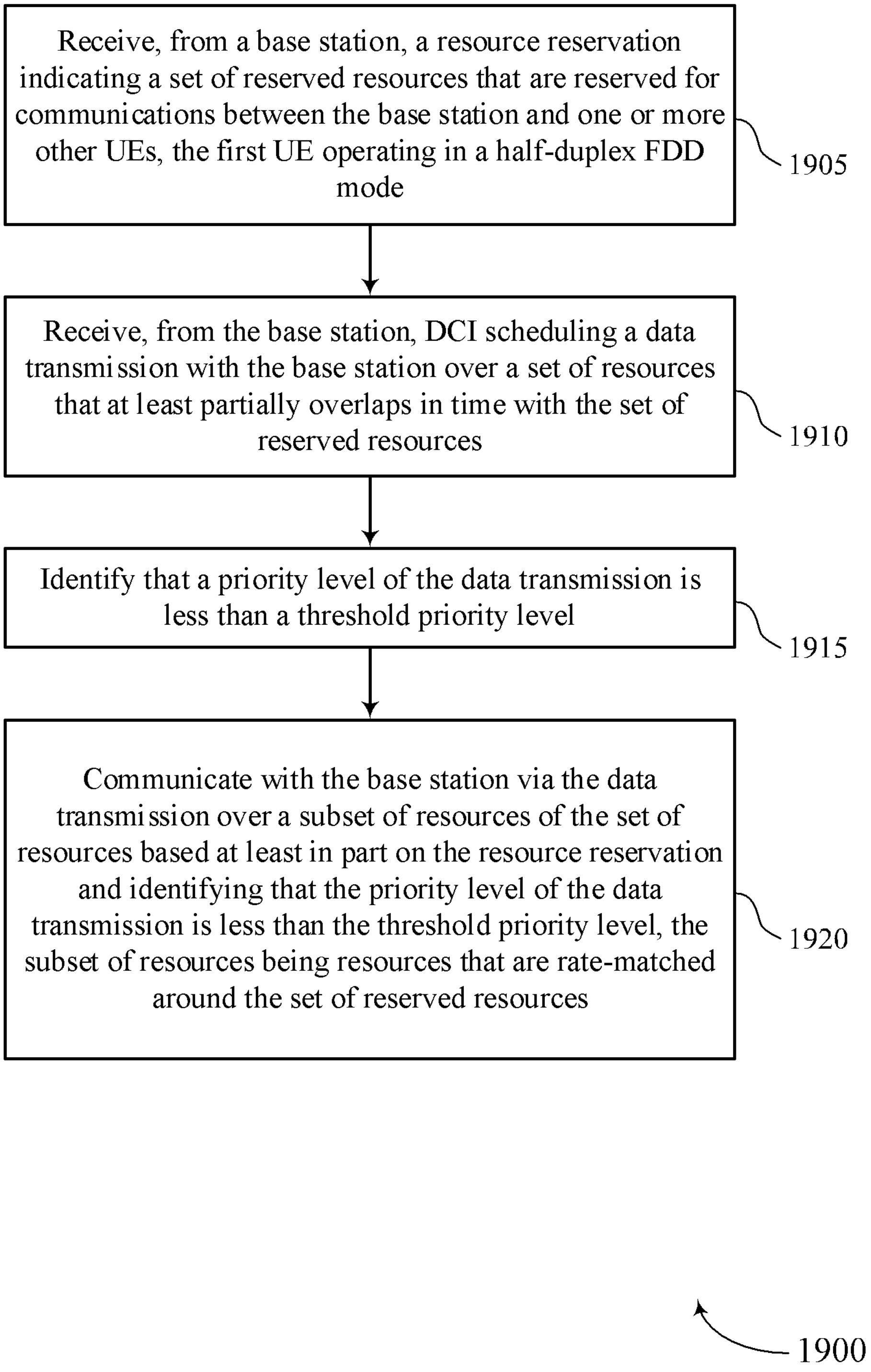
FIGS. 19 through 24 show flowcharts illustrating methods that support techniques for inter-UE multiplexing in half-duplex FDD operation in accordance with aspects of the present disclosure.

FIG. 19 shows a flowchart illustrating a method 1900 that supports techniques for inter-UE multiplexing in half-duplex FDD operation in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a resource reservation indicating a set of reserved resources that are reserved for communications between the base station and one or more other UEs, the first UE operating in a half-duplex FDD mode. The operations of 1905 may be performed in accordance with examples as disclosed herein. In some examples, aspects of the operations of 1905 may be performed by a resource reservation component 1325 as described with reference to FIG. 13.

At 1910, the method may include receiving, from the base station, DCI scheduling a data transmission with the base station over a set of resources that at least partially overlaps in time with the set of reserved resources. The operations of 1910 may be performed in accordance with examples as disclosed herein. In some examples, aspects of the operations of 1910 may be performed by a DCI component 1330 as described with reference to FIG. 13.

At 1915, the method may include identifying that a priority level of the data transmission is less than a threshold priority level. The operations of 1915 may be performed in accordance with examples as disclosed herein. In some examples, aspects of the operations of 1915 may be performed by a priority component 1335 as described with reference to FIG. 13.

At 1920, the method may include communicating with the base station via the data transmission over a subset of resources of the set of resources based at least in part on the resource reservation and identifying that the priority level of the data transmission is less than the threshold priority level, the subset of resources being resources that are rate-matched around the set of reserved resources. The operations of 1920 may be performed in accordance with examples as disclosed herein. In some examples, aspects of the operations of 1920 may be performed by a data transmission component 1340 as described with reference to FIG. 13.

Figure 20:
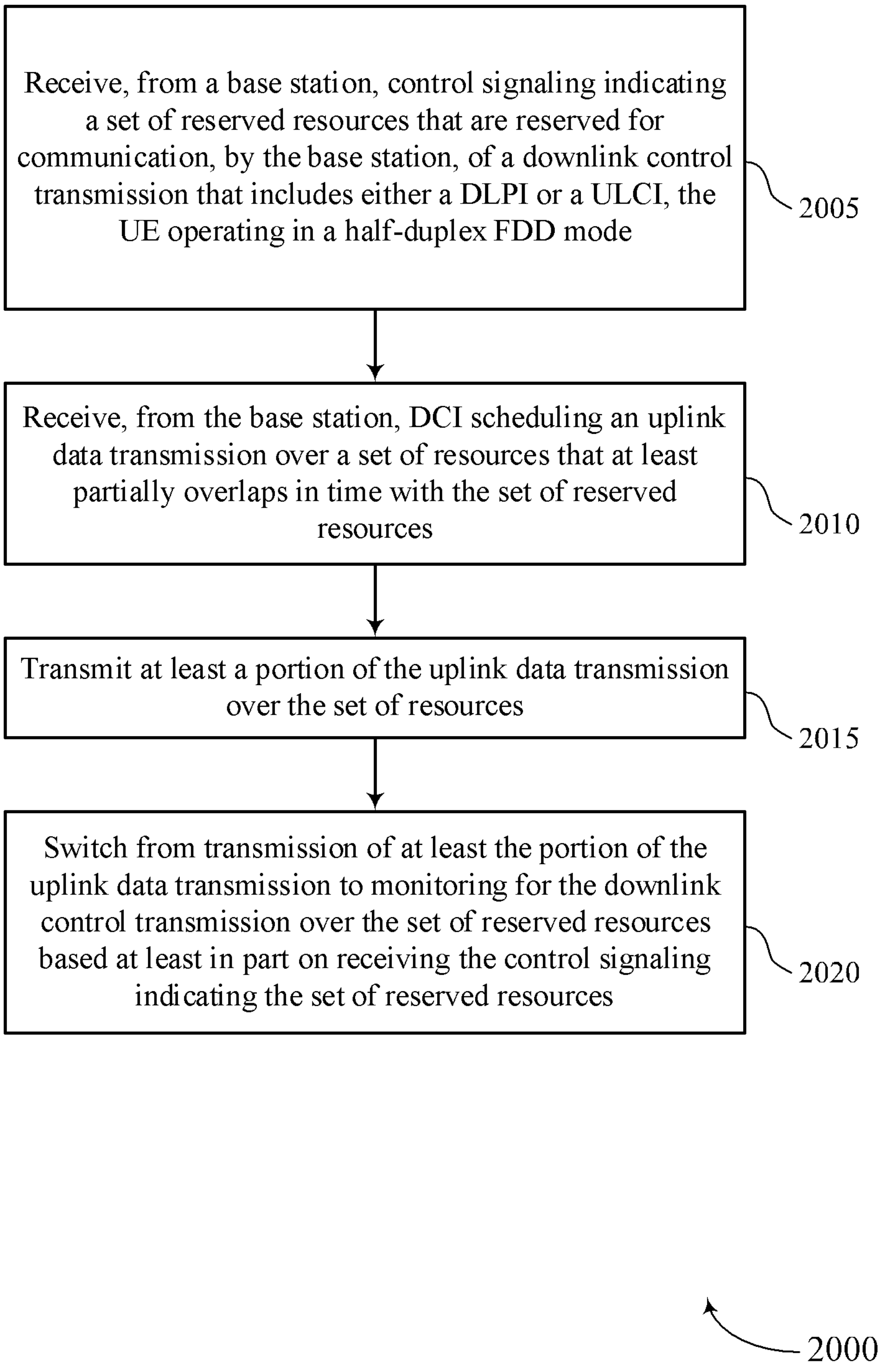

FIG. 20 shows a flowchart illustrating a method 2000 that supports techniques for inter-UE multiplexing in half-duplex FDD operation in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, control signaling indicating a set of reserved resources that are reserved for communication, by the base station, of a downlink control transmission that includes either a DLPI or an ULCI, the UE operating in a half-duplex FDD mode. The operations of 2005 may be performed in accordance with examples as disclosed herein. In some examples, aspects of the operations of 2005 may be performed by a resource reservation component 1325 as described with reference to FIG. 13.

At 2010, the method may include receiving, from the base station, DCI scheduling an uplink data transmission over a set of resources that at least partially overlaps in time with the set of reserved resources. The operations of 2010 may be performed in accordance with examples as disclosed herein. In some examples, aspects of the operations of 2010 may be performed by a DCI component 1330 as described with reference to FIG. 13.

At 2015, the method may include transmitting at least a portion of the uplink data transmission over the set of resources. The operations of 2015 may be performed in accordance with examples as disclosed herein. In some examples, aspects of the operations of 2015 may be performed by a data transmission component 1340 as described with reference to FIG. 13.

At 2020, the method may include switching from transmission of at least the portion of the uplink data transmission to monitoring for the downlink control transmission over the set of reserved resources based at least in part on receiving the control signaling indicating the set of reserved resources. The operations of 2020 may be performed in accordance with examples as disclosed herein. In some examples, aspects of the operations of 2020 may be performed by a switching component 1345 as described with reference to FIG. 13.

Figure 21:
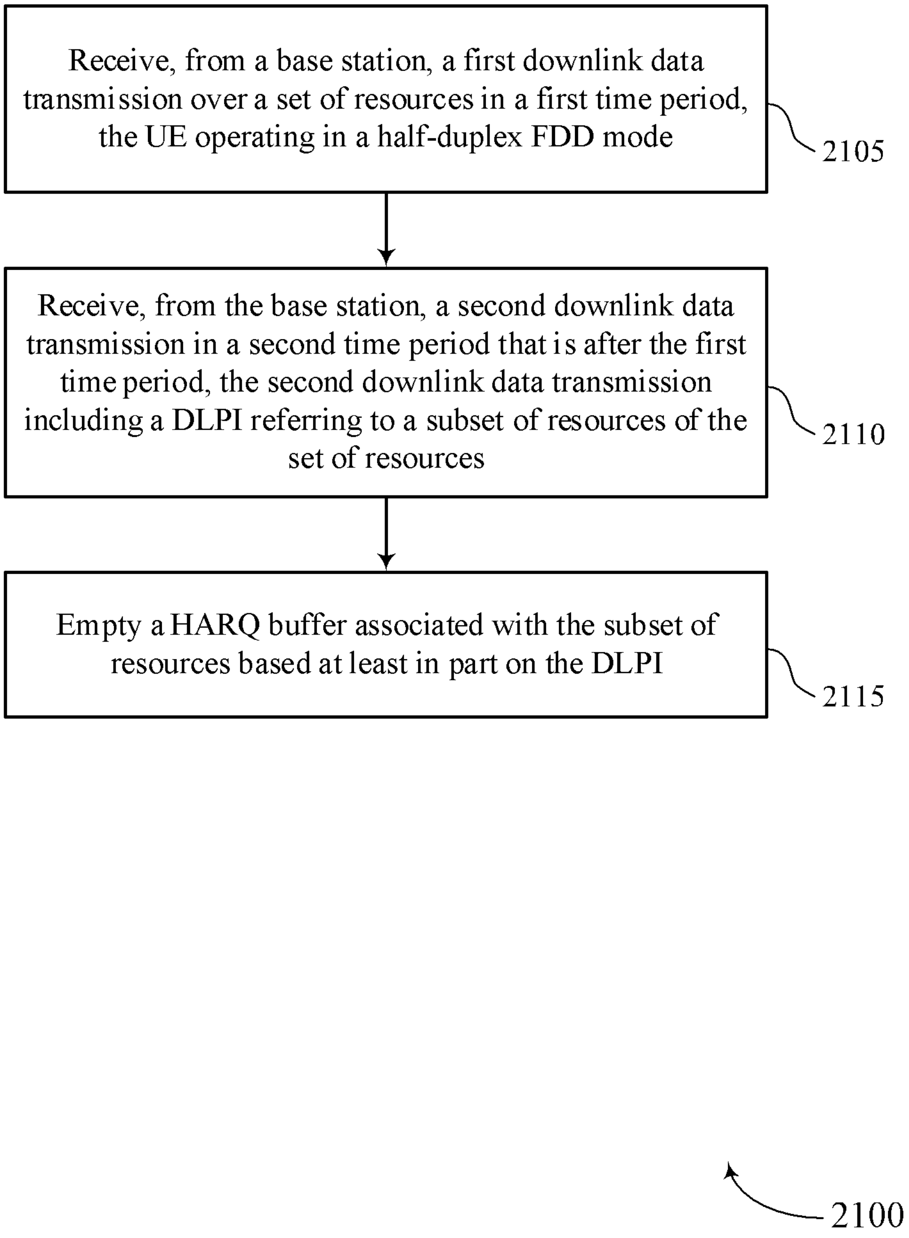

FIG. 21 shows a flowchart illustrating a method 2100 that supports techniques for inter-UE multiplexing in half-duplex FDD operation in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a first downlink data transmission over a set of resources in a first time period, the UE operating in a half-duplex FDD mode. The operations of 2105 may be performed in accordance with examples as disclosed herein. In some examples, aspects of the operations of 2105 may be performed by a data transmission component 1340 as described with reference to FIG. 13.

At 2110, the method may include receiving, from the base station, a second downlink data transmission in a second time period that is after the first time period, the second downlink data transmission including a DLPI referring to a subset of resources of the set of resources. The operations of 2110 may be performed in accordance with examples as disclosed herein. In some examples, aspects of the operations of 2110 may be performed by a data transmission component 1340 as described with reference to FIG. 13.

At 2115, the method may include emptying a HARQ buffer associated with the subset of resources based at least in part on the DLPI. The operations of 2115 may be performed in accordance with examples as disclosed herein. In some examples, aspects of the operations of 2115 may be performed by an HARQ buffer component 1350 as described with reference to FIG. 13.

Figure 22:
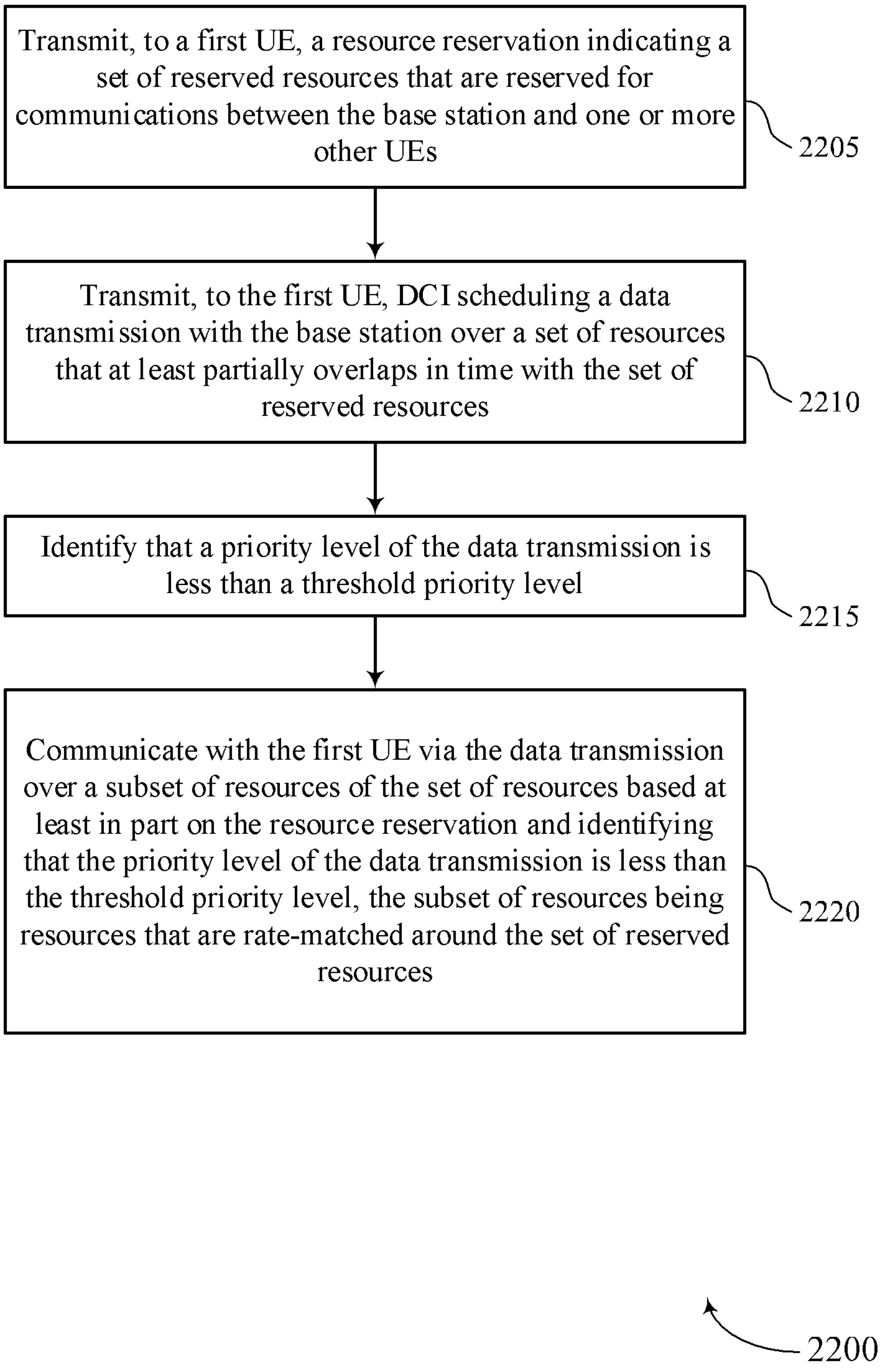

FIG. 22 shows a flowchart illustrating a method 2200 that supports techniques for inter-UE multiplexing in half-duplex FDD operation in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include transmitting, to a first UE, a resource reservation indicating a set of reserved resources that are reserved for communications between the base station and one or more other UEs. The operations of 2205 may be performed in accordance with examples as disclosed herein. In some examples, aspects of the operations of 2205 may be performed by a resource reservation component 1725 as described with reference to FIG. 17.

At 2210, the method may include transmitting, to the first UE, DCI scheduling a data transmission with the base station over a set of resources that at least partially overlaps in time with the set of reserved resources. The operations of 2210 may be performed in accordance with examples as disclosed herein. In some examples, aspects of the operations of 2210 may be performed by a DCI component 1730 as described with reference to FIG. 17.

At 2215, the method may include identifying that a priority level of the data transmission is less than a threshold priority level. The operations of 2215 may be performed in accordance with examples as disclosed herein. In some examples, aspects of the operations of 2215 may be performed by a priority component 1735 as described with reference to FIG. 17.

At 2220, the method may include communicating with the first UE via the data transmission over a subset of resources of the set of resources based at least in part on the resource reservation and identifying that the priority level of the data transmission is less than the threshold priority level, the subset of resources being resources that are rate-matched around the set of reserved resources. The operations of 2220 may be performed in accordance with examples as disclosed herein. In some examples, aspects of the operations of 2220 may be performed by a communications component 1740 as described with reference to FIG. 17.

Figure 23:
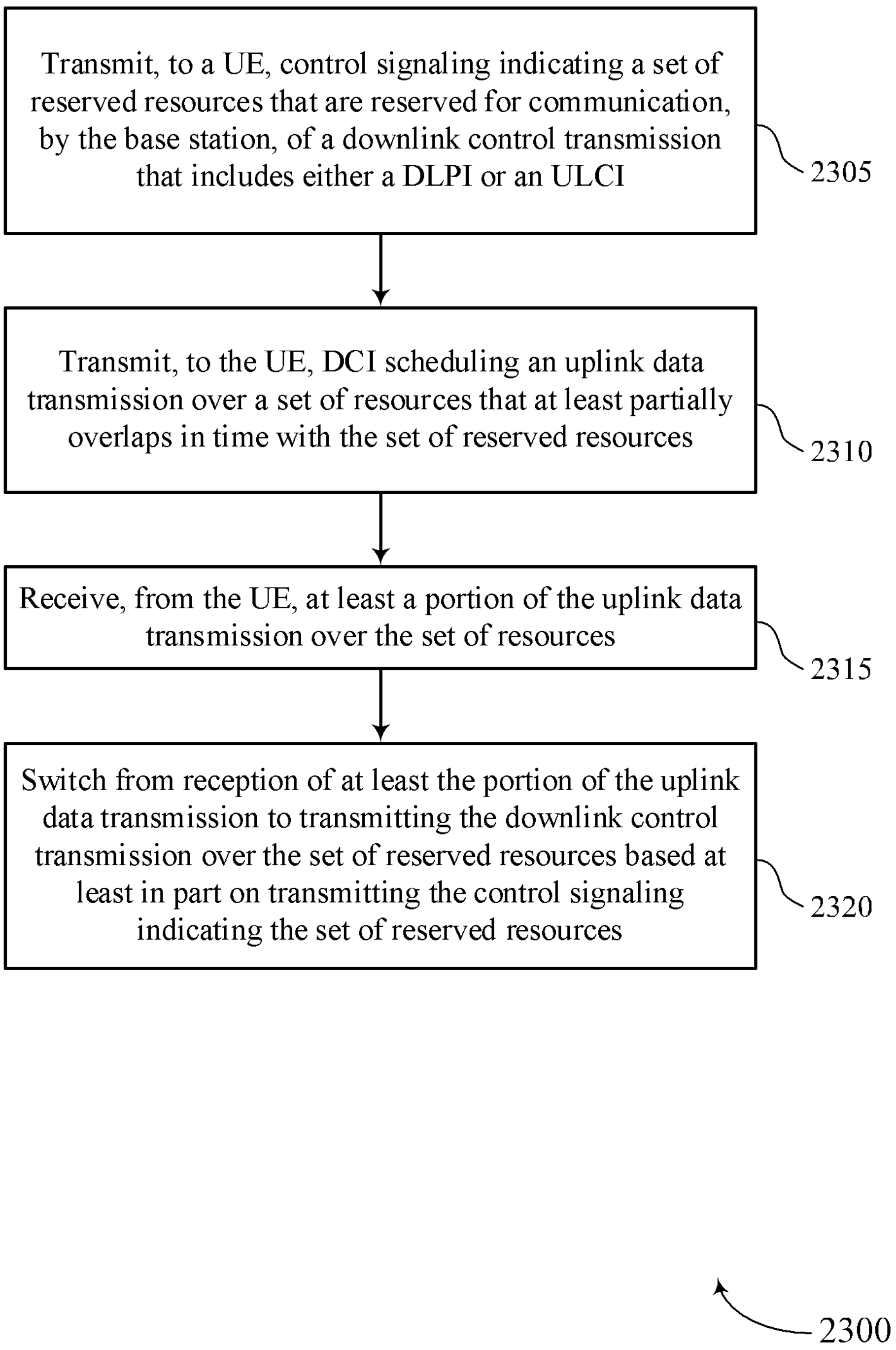

FIG. 23 shows a flowchart illustrating a method 2300 that supports techniques for inter-UE multiplexing in half-duplex FDD operation in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, control signaling indicating a set of reserved resources that are reserved for communication, by the base station, of a downlink control transmission that includes either a DLPI or an ULCI. The operations of 2305 may be performed in accordance with examples as disclosed herein. In some examples, aspects of the operations of 2305 may be performed by a resource reservation component 1725 as described with reference to FIG. 17.

At 2310, the method may include transmitting, to the UE, DCI scheduling an uplink data transmission over a set of resources that at least partially overlaps in time with the set of reserved resources. The operations of 2310 may be performed in accordance with examples as disclosed herein. In some examples, aspects of the operations of 2310 may be performed by a DCI component 1730 as described with reference to FIG. 17.

At 2315, the method may include receiving, from the UE, at least a portion of the uplink data transmission over the set of resources. The operations of 2315 may be performed in accordance with examples as disclosed herein. In some examples, aspects of the operations of 2315 may be performed by a data transmission component 1745 as described with reference to FIG. 17.

At 2320, the method may include switching from reception of at least the portion of the uplink data transmission to transmitting the downlink control transmission over the set of reserved resources based at least in part on transmitting the control signaling indicating the set of reserved resources. The operations of 2320 may be performed in accordance with examples as disclosed herein. In some examples, aspects of the operations of 2320 may be performed by a switching component 1750 as described with reference to FIG. 17.

Figure 24:
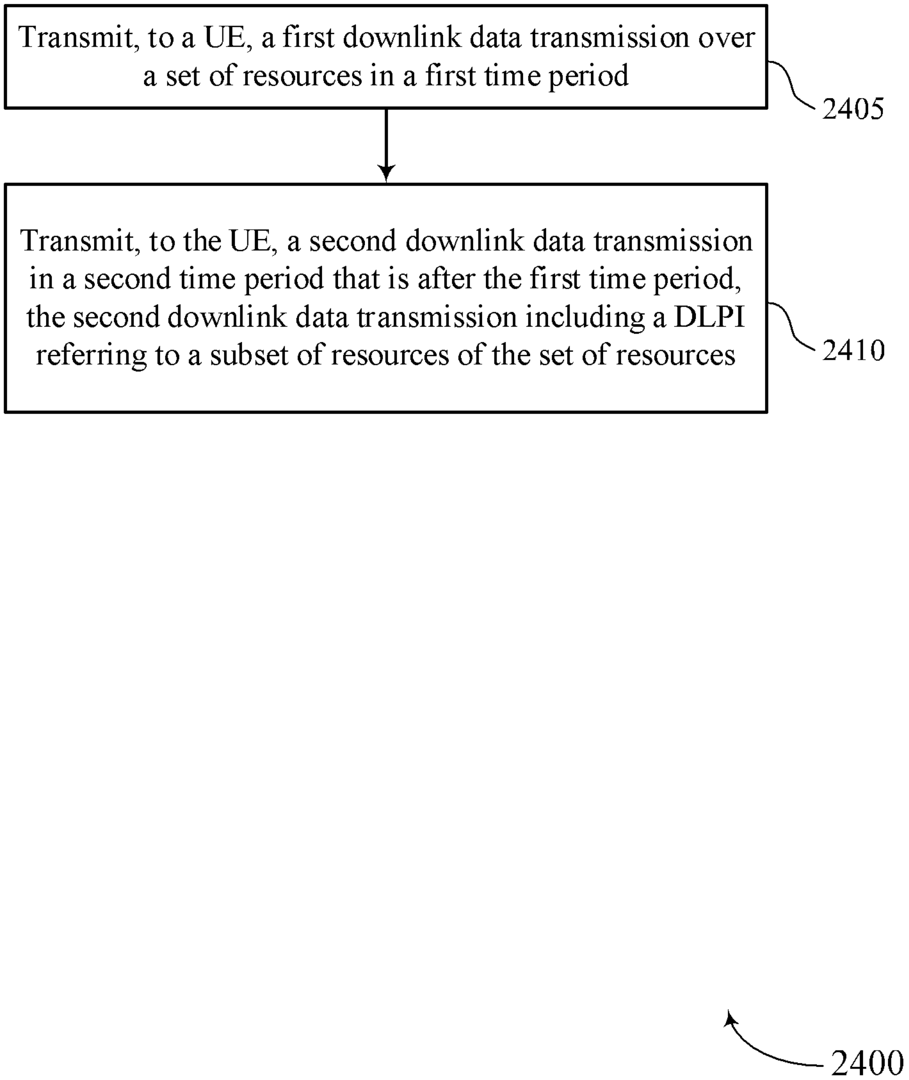

FIG. 24 shows a flowchart illustrating a method 2400 that supports techniques for inter-UE multiplexing in half-duplex FDD operation in accordance with aspects of the present disclosure. The operations of the method 2400 may be implemented by a base station or its components as described herein. For example, the operations of the method 2400 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, a first downlink data transmission over a set of resources in a first time period. The operations of 2405 may be performed in accordance with examples as disclosed herein. In some examples, aspects of the operations of 2405 may be performed by a data transmission component 1745 as described with reference to FIG. 17.

At 2410, the method may include transmitting, to the UE, a second downlink data transmission in a second time period that is after the first time period, the second downlink data transmission including a DLPI referring to a subset of resources of the set of resources. The operations of 2410 may be performed in accordance with examples as disclosed herein. In some examples, aspects of the operations of 2410 may be performed by a data transmission component 1745 as described with reference to FIG. 17.

The following provides an overview of aspects of the present disclosure:

Aspect 1: A method for wireless communication at a first UE, comprising: receiving, from a base station, a resource reservation indicating a set of reserved resources that are reserved for communications between the base station and one or more other UEs, the first UE operating in a half-duplex FDD mode; receiving, from the base station, DCI scheduling a data transmission with the base station over a set of resources that at least partially overlaps in time with the set of reserved resources; identifying that a priority level of the data transmission is less than a threshold priority level; and communicating with the base station via the data transmission over a subset of resources of the set of resources based at least in part on the resource reservation and identifying that the priority level of the data transmission is less than the threshold priority level, the subset of resources being resources that are rate-matched around the set of reserved resources.

Aspect 2: The method of aspect 1, wherein receiving the resource reservation indicating the set of reserved resources comprises: receiving an indication of the set of reserved resources via RRC signaling.

Aspect 3: The method of aspect 2, wherein receiving the DCI scheduling the data transmission comprises: receiving an indication that enables the set of reserved resources for the data transmission, wherein communicating with the base station via the data transmission over the subset of resources is based at least in part on receiving the indication that enables the set of reserved resources for the data transmission.

Aspect 4: The method of any of aspects 2 through 3, wherein the set of reserved resources are periodically configured.

Aspect 5: The method of any of aspects 1 through 4, wherein receiving the resource reservation indicating the set of reserved resources comprises: receiving a bitmap comprising a quantity of bits equal to a product of a first quantity of units in a time domain and a second quantity of units in a frequency domain, the bitmap indicating a time and frequency resource allocation of the set of reserved resources.

Aspect 6: The method of any of aspects 1 through 5, further comprising: receiving, from the base station, control signaling scheduling a transmission of an SRS over a second set of resources that at least partially overlaps in time with the set of reserved resources; and dropping the transmission of the SRS based at least in part on the second set of resources at least partially overlapping in time with the set of reserved resources.

Aspect 7: The method of any of aspects 1 through 6, wherein the data transmission comprises an uplink data transmission or a downlink data transmission.

Aspect 8: A method for wireless communication at a UE, comprising: receiving, from a base station, control signaling indicating a set of reserved resources that are reserved for communication, by the base station, of a downlink control transmission that includes either a DLPI or an ULCI, the UE operating in a half-duplex FDD mode; receiving, from the base station, DCI scheduling an uplink data transmission over a set of resources that at least partially overlaps in time with the set of reserved resources; transmitting at least a portion of the uplink data transmission over the set of resources; and switching from transmission of at least the portion of the uplink data transmission to monitoring for the downlink control transmission over the set of reserved resources based at least in part on receiving the control signaling indicating the set of reserved resources.

Aspect 9: The method of aspect 8, wherein receiving the control signaling indicating the set of reserved resources comprises: receiving an indication of the set of reserved resources via RRC signaling, wherein the set of reserved resources are semi-persistently configured.

Aspect 10: The method of any of aspects 8 through 9, further comprising: receiving, from the base station, second control signaling scheduling an SRS over a second set of resources that at least partially overlaps in time with the set of reserved resources; and refraining from transmitting the SRS in a time domain overlap between the second set of resources and the set of reserved resources.

Aspect 11: The method of any of aspects 8 through 10, further comprising: identifying that a priority level of the uplink data transmission is less than a threshold priority level, wherein switching from the transmission of at least the portion of the uplink data transmission to the monitoring for the downlink control transmission over the set of reserved resources is based at least in part on identifying that the priority level of the uplink data transmission is less than the threshold priority level.

Aspect 12: The method of any of aspects 8 through 11, further comprising: receiving the downlink control transmission that includes either the DLPI or the ULCI based at least in part on switching from the transmission of at least the portion of the uplink data transmission to the monitoring for the downlink control transmission over the set of reserved resources; and switching from the monitoring for the downlink control transmission over the set of reserved resources to transmitting at least a second portion of the uplink data transmission based at least in part on receiving the downlink control transmission.

Aspect 13: A method for wireless communication at a UE, comprising: receiving, from a base station, a first downlink data transmission over a set of resources in a first time period, the UE operating in a half-duplex FDD mode; receiving, from the base station, a second downlink data transmission in a second time period that is after the first time period, the second downlink data transmission including a DLPI referring to a subset of resources of the set of resources; and emptying a HARQ buffer associated with the subset of resources based at least in part on the DLPI.

Aspect 14: The method of aspect 13, wherein the DLPI is multiplexed with data of the second downlink data transmission, the method further comprising: decoding the DLPI separately from the data of the second downlink data transmission.

Aspect 15: The method of aspect 14, wherein the DLPI comprises QPSK.

Aspect 16: The method of any of aspects 13 through 15, further comprising: transmitting, to the base station, an uplink transmission in a third time period that at least partially overlaps in time with a monitoring occasion for DCI including an instance of the DLPI, wherein receiving the second downlink data transmission including the DLPI is based at least in part on transmitting the uplink transmission in the third time period that at least partially overlaps in time with the monitoring occasion for the DCI including the instance of the DLPI.

Aspect 17: The method of any of aspects 13 through 16, further comprising: receiving, from the base station, DCI scheduling the second downlink data transmission, wherein the DCI comprises an indication of a presence of the DLPI in the second downlink data transmission, wherein receiving the second downlink data transmission including the DLPI is based at least in part on receiving the indication of the presence of the DLPI in the second downlink data transmission.

Aspect 18: A method for wireless communication at a base station, comprising: transmitting, to a first UE, a resource reservation indicating a set of reserved resources that are reserved for communications between the base station and one or more other UEs; transmitting, to the first UE, DCI scheduling a data transmission with the base station over a set of resources that at least partially overlaps in time with the set of reserved resources; identifying that a priority level of the data transmission is less than a threshold priority level; and communicating with the first UE via the data transmission over a subset of resources of the set of resources based at least in part on the resource reservation and identifying that the priority level of the data transmission is less than the threshold priority level, the subset of resources being resources that are rate-matched around the set of reserved resources.

Aspect 19: The method of aspect 18, wherein transmitting the resource reservation indicating the set of reserved resources comprises: transmitting an indication of the set of reserved resources via RRC signaling.

Aspect 20: The method of aspect 19, wherein transmitting the DCI scheduling the data transmission comprises: transmitting an indication that enables the set of reserved resources for the data transmission, wherein communicating with the first UE via the data transmission over the subset of resources is based at least in part on transmitting the indication that enables the set of reserved resources for the data transmission.

Aspect 21: The method of any of aspects 19 through 20, wherein the set of reserved resources are periodically configured.

Aspect 22: The method of any of aspects 18 through 21, wherein transmitting the resource reservation indicating the set of reserved resources comprises: transmitting a bitmap comprising a quantity of bits equal to a product of a first quantity of units in a time domain and a second quantity of units in a frequency domain, the bitmap indicating a time and frequency resource allocation of the set of reserved resources.

Aspect 23: The method of any of aspects 18 through 22, further comprising: transmitting, to a second UE of the one or more other UEs, second DCI scheduling an uplink data transmission with the second UE over the set of reserved resources; and receiving, from the second UE, the uplink data transmission over the set of reserved resources based at least in part on transmitting the second DCI scheduling the uplink data transmission and the resource reservation.

Aspect 24: The method of any of aspects 18 through 23, wherein the data transmission comprises an uplink data transmission or a downlink transmission.

Aspect 25: A method for wireless communication at a base station, comprising: transmitting, to a UE, control signaling indicating a set of reserved resources that are reserved for communication, by the base station, of a downlink control transmission that includes either a DLPI or an ULCI; transmitting, to the UE, DCI scheduling an uplink data transmission over a set of resources that at least partially overlaps in time with the set of reserved resources; receiving, from the UE, at least a portion of the uplink data transmission over the set of resources; and switching from reception of at least the portion of the uplink data transmission to transmitting the downlink control transmission over the set of reserved resources based at least in part on transmitting the control signaling indicating the set of reserved resources.

Aspect 26: The method of aspect 25, wherein transmitting the control signaling indicating the set of reserved resources comprises: transmitting an indication of the set of reserved resources via RRC signaling, wherein the set of reserved resources are semi-persistently configured.

Aspect 27: The method of any of aspects 25 through 26, further comprising: identifying that a priority level of the uplink data transmission is less than a threshold priority level, wherein switching from the from the reception of the uplink data transmission to the transmitting of the downlink control transmission over the set of reserved resources is based at least in part on identifying that the priority level of the uplink data transmission is less than the threshold priority level.

Aspect 28: The method of any of aspects 25 through 27, further comprising: transmitting the downlink control transmission that includes either the DLPI or the ULCI based at least in part on switching from the reception of the uplink data transmission to the transmitting of the downlink control transmission over the set of reserved resources; and switching from the transmitting of the downlink control transmission over the set of reserved resources to receiving, from the UE, at least a second portion of the uplink data transmission based at least in part on transmitting the downlink control transmission.

Aspect 29: A method for wireless communication at a base station, comprising: transmitting, to a UE, a first downlink data transmission over a set of resources in a first time period; and transmitting, to the UE, a second downlink data transmission in a second time period that is after the first time period, the second downlink data transmission including a DLPI referring to a subset of resources of the set of resources.

Aspect 30: The method of aspect 29, further comprising: multiplexing the DLPI with data of the second downlink data transmission; and encoding the DLPI separately from the data of the second downlink data transmission.

Aspect 31: The method of aspect 30, wherein multiplexing the DLPI comprises: multiplexing the DLPI based at least in part on QPSK.

Aspect 32: The method of any of aspects 29 through 31, further comprising: receiving, from the UE, an uplink data transmission over a second set of resources in a third time period that at least partially overlaps in time with a monitoring occasion for DCI including an instance of the DLPI, wherein transmitting the second downlink data transmission including the DLPI is based at least in part on receiving the uplink data transmission in the third time period that at least partially overlaps in time with the monitoring occasion for the DCI including the instance of the DLPI.

Aspect 33: The method of aspect 32, further comprising: transmitting, to the UE, the DCI including the instance of the DLPI over a third set of resources that at least partially overlaps with the second set of resources in the third time period, wherein the DLPI in the second downlink data transmission comprises a retransmission of the DLPI.

Aspect 34: The method of any of aspects 29 through 33, further comprising: transmitting, to the UE, DCI scheduling the second downlink data transmission, wherein the DCI comprises an indication of a presence of the DLPI in the second downlink data transmission, wherein transmitting the second downlink data transmission including the DLPI is based at least in part on transmitting the indication of the presence of the DLPI in the second downlink data transmission.

Aspect 35: An apparatus for wireless communication at a first UE, comprising at least one processor; memory coupled with the at least one processor; and instructions stored in the memory and executable by the at least one processor to cause the apparatus to perform a method of any of aspects 1 through 7.

Aspect 36: An apparatus for wireless communication at a first UE, comprising at least one means for performing a method of any of aspects 1 through 7.

Aspect 37: A non-transitory computer-readable medium storing code for wireless communication at a first UE, the code comprising instructions executable by at least one processor to perform a method of any of aspects 1 through 7.

Aspect 38: An apparatus for wireless communication at a UE, comprising at least one processor; memory coupled with the at least one processor; and instructions stored in the memory and executable by the at least one processor to cause the apparatus to perform a method of any of aspects 8 through 12.

Aspect 39: An apparatus for wireless communication at a UE, comprising at least one means for performing a method of any of aspects 8 through 12.

Aspect 40: A non-transitory computer-readable medium storing code for wireless communication at a UE, the code comprising instructions executable by at least one processor to perform a method of any of aspects 8 through 12.

Aspect 41: An apparatus for wireless communication at a UE, comprising at least one processor; memory coupled with the at least one processor; and instructions stored in the memory and executable by the at least one processor to cause the apparatus to perform a method of any of aspects 13 through 17.

Aspect 42: An apparatus for wireless communication at a UE, comprising at least one means for performing a method of any of aspects 13 through 17.

Aspect 43: A non-transitory computer-readable medium storing code for wireless communication at a UE, the code comprising instructions executable by at least one processor to perform a method of any of aspects 13 through 17.

Aspect 44: An apparatus for wireless communication at a base station, comprising at least one processor; memory coupled with the at least one processor; and instructions stored in the memory and executable by the at least one processor to cause the apparatus to perform a method of any of aspects 18 through 24.

Aspect 45: An apparatus for wireless communication at a base station, comprising at least one means for performing a method of any of aspects 18 through 24.

Aspect 46: A non-transitory computer-readable medium storing code for wireless communication at a base station, the code comprising instructions executable by at least one processor to perform a method of any of aspects 18 through 24.

Aspect 47: An apparatus for wireless communication at a base station, comprising at least one processor; memory coupled with the at least one processor; and instructions stored in the memory and executable by the at least one processor to cause the apparatus to perform a method of any of aspects 25 through 28.

Aspect 48: An apparatus for wireless communication at a base station, comprising at least one means for performing a method of any of aspects 25 through 28.

Aspect 49: A non-transitory computer-readable medium storing code for wireless communication at a base station, the code comprising instructions executable by at least one processor to perform a method of any of aspects 25 through 28.

Aspect 50: An apparatus for wireless communication at a base station, comprising at least one processor; memory coupled with the at least one processor; and instructions stored in the memory and executable by the at least one processor to cause the apparatus to perform a method of any of aspects 29 through 34.

Aspect 51: An apparatus for wireless communication at a base station, comprising at least one means for performing a method of any of aspects 29 through 34.

Aspect 52: A non-transitory computer-readable medium storing code for wireless communication at a base station, the code comprising instructions executable by at least one processor to perform a method of any of aspects 29 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
- at least one processor; and
- memory coupled with the at least one processor, the memory storing instructions executable by the at least one processor to cause the first UE to:
  - receive, from a base station, a resource reservation indicating a set of reserved resources that are reserved for communications between the base station and one or more other UEs, the first UE operating in a half-duplex frequency division duplex mode;
  - receive, from the base station, downlink control information scheduling a data transmission with the base station over a set of resources that at least partially overlaps in time with the set of reserved resources;
  - identify that a priority level of the data transmission is less than a threshold priority level; and
  - communicate with the base station via the data transmission over a subset of resources of the set of resources based at least in part on the resource reservation and identifying that the priority level of the data transmission is less than the threshold priority level, the subset of resources being resources that are rate-matched around the set of reserved resources.

2. The apparatus of claim 1, wherein the instructions to receive the resource reservation indicating the set of reserved resources are executable by the at least one processor to cause the first UE to:
- receive an indication of the set of reserved resources via radio resource control signaling.

3. The apparatus of claim 2, wherein the instructions to receive the downlink control information scheduling the data transmission are executable by the at least one processor to cause the first UE to:
- receive an indication that enables the set of reserved resources for the data transmission, wherein communicating with the base station via the data transmission over the subset of resources is based at least in part on receiving the indication that enables the set of reserved resources for the data transmission.

4. The apparatus of claim 2, wherein:
- the set of reserved resources are periodically configured.

5. The apparatus of claim 1, wherein the instructions to receive the resource reservation indicating the set of reserved resources are executable by the at least one processor to cause the first UE to:
- receive a bitmap comprising a quantity of bits equal to a product of a first quantity of units in a time domain and a second quantity of units in a frequency domain, the bitmap indicating a time and frequency resource allocation of the set of reserved resources.

6. The apparatus of claim 1, wherein the instructions are further executable by the at least one processor to cause the first UE to:
- receive, from the base station, control signaling scheduling a transmission of a sounding reference signal over a second set of resources that at least partially overlaps in time with the set of reserved resources; and
- drop the transmission of the sounding reference signal based at least in part on the second set of resources at least partially overlapping in time with the set of reserved resources.

7. The apparatus of claim 1, wherein the data transmission comprises an uplink data transmission or a downlink data transmission.

8. An apparatus for wireless communication at a user equipment (UE), comprising:
- at least one processor; and
- memory coupled with the at least one processor, the memory storing instructions executable by the at least one processor to cause the UE to:
  - receive, from a base station, control signaling indicating a set of reserved resources that are reserved for communication, by the base station, of a downlink control transmission that includes either a downlink pre-emption indication or an uplink cancellation indication, the UE operating in a half-duplex frequency division duplex mode;
  - receive, from the base station, downlink control information scheduling an uplink data transmission over a set of resources that at least partially overlaps in time with the set of reserved resources;
  - transmit at least a portion of the uplink data transmission over the set of resources; and
  - switch from transmission of at least the portion of the uplink data transmission to monitoring for the downlink control transmission over the set of reserved resources based at least in part on receiving the control signaling indicating the set of reserved resources.

9. The apparatus of claim 8, wherein the instructions to receive the control signaling indicating the set of reserved resources are executable by the at least one processor to cause the UE to:
- receive an indication of the set of reserved resources via radio resource control signaling, wherein the set of reserved resources are semi-persistently configured.

10. The apparatus of claim 8, wherein the instructions are further executable by the at least one processor to cause the UE to:
- receive, from the base station, second control signaling scheduling a sounding reference signal over a second set of resources that at least partially overlaps in time with the set of reserved resources; and refrain from transmitting the sounding reference signal in a time domain overlap between the second set of resources and the set of reserved resources.

11. The apparatus of claim 8, wherein the instructions are further executable by the at least one processor to cause the UE to:

identify that a priority level of the uplink data transmission is less than a threshold priority level, wherein switching from the transmission of at least the portion of the uplink data transmission to the monitoring for the downlink control transmission over the set of reserved resources is based at least in part on identifying that the priority level of the uplink data transmission is less than the threshold priority level.

12. The apparatus of claim 8, wherein the instructions are further executable by the at least one processor to cause the UE to:

receive the downlink control transmission that includes either the downlink pre-emption indication or the uplink cancellation indication based at least in part on switching from the transmission of at least the portion of the uplink data transmission to the monitoring for the downlink control transmission over the set of reserved resources; and switch from the monitoring for the downlink control transmission over the set of reserved resources to transmitting at least a second portion of the uplink data transmission based at least in part on receiving the downlink control transmission.

13. An apparatus for wireless communication at a user equipment (UE), comprising:

at least one processor; and memory coupled with the at least one processor, the memory storing instructions executable by the at least one processor to cause the UE to:

receive, from a base station, a first downlink data transmission over a set of resources in a first time period, the UE operating in a half-duplex frequency division duplex mode;

receive, from the base station, a second downlink data transmission in a second time period that is after the first time period, the second downlink data transmission including a downlink pre-emption indication referring to a subset of resources of the set of resources; and empty a hybrid automatic repeat request buffer associated with the subset of resources based at least in part on the downlink pre-emption indication.

14. The apparatus of claim 13, wherein the downlink pre-emption indication is multiplexed with data of the second downlink data transmission, and the instructions are further executable by the at least one processor to cause the UE to:

decode the downlink pre-emption indication separately from the data of the second downlink data transmission.

15. The apparatus of claim 14, wherein:

the downlink pre-emption indication comprises quadrature phase shift keying.

16. The apparatus of claim 13, wherein the instructions are further executable by the at least one processor to cause the UE to:

transmit, to the base station, an uplink transmission in a third time period that at least partially overlaps in time with a monitoring occasion for downlink control information including an instance of the downlink pre-emption indication, wherein receiving the second downlink data transmission including the downlink pre-emption indication is based at least in part on transmitting the uplink transmission in the third time period that at least partially overlaps in time with the monitoring occasion for the downlink control information including the instance of the downlink pre-emption indication.

17. The apparatus of claim 13, wherein the instructions are further executable by the at least one processor to cause the UE to:

receive, from the base station, downlink control information scheduling the second downlink data transmission, wherein the downlink control information comprises an indication of a presence of the downlink pre-emption indication in the second downlink data transmission, wherein receiving the second downlink data transmission including the downlink pre-emption indication is based at least in part on receiving the indication of the presence of the downlink pre-emption indication in the second downlink data transmission.

18. An apparatus for wireless communication at a base station, comprising:

at least one processor; and memory coupled with the at least one processor, the memory storing instructions executable by the at least one processor to cause the base station to:

transmit, to a user equipment (UE), a first downlink data transmission over a set of resources in a first time period;

transmit, to the UE, a second downlink data transmission in a second time period that is after the first time period, the second downlink data transmission including a downlink pre-emption indication referring to a subset of resources of the set of resources; and receive, from the UE, an uplink data transmission over a second set of resources in a third time period that at least partially overlaps in time with a monitoring occasion for downlink control information including an instance of the downlink pre-emption indication, wherein transmitting the second downlink data transmission including the downlink pre-emption indication is based at least in part on receiving the uplink data transmission in the third time period that at least partially overlaps in time with the monitoring occasion for the downlink control information including the instance of the downlink pre-emption indication.

19. The apparatus of claim 18, wherein the instructions are further executable by the at least one processor to cause the base station to:

multiplex the downlink pre-emption indication with data of the second downlink data transmission; and encode the downlink pre-emption indication separately from the data of the second downlink data transmission.

20. The apparatus of claim 19, wherein the instructions to multiplex the downlink pre-emption indication are executable by the at least one processor to cause the base station to:

multiplex the downlink pre-emption indication based at least in part on quadrature phase shift keying.

21. The apparatus of claim 18, wherein the instructions are further executable by the at least one processor to cause the base station to:

transmit, to the UE, the downlink control information including the instance of the downlink pre-emption indication over a third set of resources that at least partially overlaps with the second set of resources in the third time period, wherein the downlink pre-emption indication in the second downlink data transmission comprises a retransmission of the downlink pre-emption indication.

22. The apparatus of claim 18, wherein the instructions are further executable by the at least one processor to cause the base station to:

transmit, to the UE, downlink control information scheduling the second downlink data transmission, wherein the downlink control information scheduling the second downlink data transmission comprises an indication of a presence of the downlink pre-emption indication in the second downlink data transmission, wherein transmitting the second downlink data transmission including the downlink pre-emption indication is based at least in part on transmitting the indication of the presence of the downlink pre-emption indication in the second downlink data transmission.

* * * * *